US012595077B2

(12) United States Patent
Mukae

(10) Patent No.: US 12,595,077 B2
(45) Date of Patent: Apr. 7, 2026

(54) SPACE TRAFFIC MANAGEMENT SYSTEM, SPACE TRAFFIC MANAGEMENT DEVICE, GROUND FACILITY AND OPERATION METHOD FOR AVOIDING COLLISION DURING ORBITAL DESCENT

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 599 days.

(21) Appl. No.: 17/416,520

(22) PCT Filed: Jan. 21, 2020

(86) PCT No.: PCT/JP2020/001901

§ 371 (c)(1),
(2) Date: Jun. 21, 2021

(87) PCT Pub. No.: WO2020/158505

PCT Pub. Date: Aug. 6, 2020

(65) Prior Publication Data

US 2022/0081132 A1 Mar. 17, 2022

(30) Foreign Application Priority Data

Jan. 28, 2019 (WO) .................. PCT/JP2019/002794
Apr. 25, 2019 (WO) .................. PCT/JP2019/017635

(51) Int. Cl.
B64G 1/10 (2006.01)
B64G 1/24 (2006.01)
B64G 3/00 (2006.01)

(52) U.S. Cl.
CPC ......... *B64G 1/1085* (2013.01); *B64G 1/2429* (2023.08); *B64G 3/00* (2013.01)

(58) Field of Classification Search
CPC ...... B64G 1/1081; B64G 1/085; B64G 1/242; B64G 3/00; B64G 1/64
See application file for complete search history.

(56) References Cited

U.S. PATENT DOCUMENTS 4,652,884 A 3/1987 Starker
5,421,540 A * 6/1995 Ting ..................... B64G 1/1078
244/158.1

(Continued)

FOREIGN PATENT DOCUMENTS

CN 107871047 A 4/2018
EP 3156335 A1 4/2017

(Continued)

OTHER PUBLICATIONS

Jones et al, Analysis of the Effects of Mean Loval Node-Crossing Time on the Ecolution of Sun Synchronous Orbits, 1993.*

(Continued)

*Primary Examiner* — Philip J Bonzell
(74) *Attorney, Agent, or Firm* — XSENSUS LLP

(57) ABSTRACT
A satellite constellation forming system (100) forms a satellite constellation (20). The satellite constellation (20) is composed of a satellite group (300). In the satellite constellation (20), the satellite group (300) provides a service cooperatively. The satellite constellation (20) has a plurality of orbital planes in which a plurality of satellites (30) fly at the same orbital altitude in each orbital plane (21). A satellite constellation forming unit (110) forms the satellite constellation (20) in which orbital altitudes of the plurality of orbital planes (21) are mutually different.

14 Claims, 35 Drawing Sheets

(56)                  References Cited

U.S. PATENT DOCUMENTS

| | | | | |
|---|---|---|---|---|
| 5,511,748 | A * | 4/1996 | Scott | B64G 1/1078 244/172.5 |
| 5,803,407 | A * | 9/1998 | Scott | B64G 1/242 244/164 |
| 5,806,802 | A * | 9/1998 | Scott | B64G 1/242 701/13 |
| 5,813,634 | A * | 9/1998 | Pizzicaroli | H04B 7/18519 455/12.1 |
| 5,906,337 | A | 5/1999 | Williams et al. | |
| 5,971,324 | A | 10/1999 | Williams et al. | |
| 5,979,832 | A | 11/1999 | Draim | |
| 6,017,000 | A * | 1/2000 | Scott | B64G 1/24 244/158.6 |
| 6,330,987 | B1 * | 12/2001 | Scott | B64G 1/24 244/164 |
| 6,484,973 | B1 * | 11/2002 | Scott | B64G 1/646 701/13 |
| 6,655,637 | B1 * | 12/2003 | Robinson | B64G 1/242 244/172.4 |
| 6,757,612 | B1 * | 6/2004 | Talent | B64G 99/00 702/3 |
| 7,720,604 | B1 | 5/2010 | Cichan et al. | |
| 8,052,092 | B2 * | 11/2011 | Atmur | B64G 1/66 244/172.6 |
| 9,617,017 | B1 * | 4/2017 | Kaplan | B64G 1/242 |
| 9,647,749 | B2 | 5/2017 | Krebs | |
| 9,714,101 | B1 * | 7/2017 | Kaplan | B64G 1/26 |
| 9,944,412 | B2 * | 4/2018 | Szabo | B64G 1/646 |
| 10,611,504 | B2 * | 4/2020 | Halsband | B64G 4/00 |
| 10,640,239 | B2 * | 5/2020 | Reed | B64G 1/62 |
| 2010/0193640 | A1 * | 8/2010 | Atmur | B64G 1/242 244/158.2 |
| 2014/0158830 | A1 | 6/2014 | Rossettini et al. | |
| 2015/0097084 | A1 * | 4/2015 | Szabo | B64G 1/26 244/171.1 |
| 2015/0346336 | A1 | 12/2015 | Di Giorgio et al. | |
| 2016/0376032 | A1 | 12/2016 | Mori et al. | |
| 2017/0081047 | A1 | 3/2017 | Rossettini et al. | |
| 2017/0313447 | A1 * | 11/2017 | Reed | B64G 1/242 |
| 2018/0022474 | A1 | 1/2018 | Meek | |
| 2018/0148197 | A1 * | 5/2018 | Halsband | B64G 1/26 |
| 2018/0155065 | A1 | 6/2018 | Silva et al. | |
| 2018/0251240 | A1 * | 9/2018 | Reitman | B64G 1/2429 |
| 2018/0290769 | A1 | 10/2018 | Mori et al. | |
| 2018/0297721 | A1 | 10/2018 | Silva et al. | |
| 2018/0370658 | A1 | 12/2018 | Amimoto et al. | |

FOREIGN PATENT DOCUMENTS

| | | | |
|---|---|---|---|
| JP | 61-40578 | A | 2/1986 |
| JP | 5-270498 | A | 10/1993 |
| JP | 9-130317 | A | 5/1997 |
| JP | 2000-341191 | A | 12/2000 |
| JP | 2001-335000 | A | 12/2001 |
| JP | 2014-520724 | A | 8/2014 |
| JP | 2016-210353 | A | 12/2016 |
| JP | 2017-114159 | A | 6/2017 |
| JP | 6253664 | B2 | 12/2017 |
| JP | 2018-127198 | A | 8/2018 |
| WO | 2015/190527 | A1 | 12/2015 |
| WO | 2017/110105 | A1 | 6/2017 |

OTHER PUBLICATIONS

International Search Report and Written Opinion mailed on Apr. 14, 2020, received for PCT Application PCT/JP2020/001901, Filed on Jan. 21, 2020, 18 pages including English Translation.

Murakami et al., "Space Traffic Management with a NASA UAS Traffic Management (UTM) Inspired Architecture", AIAA Scitech Forum, Available Online At: URL: https://utm.arc.nasa.gov/docs/2019_Murakami_SciTech_2019.pdf., Jan. 7-11, 2019, pp. 1-27.

International Search Report and Written Opinion mailed on Apr. 16, 2019, received for PCT Application PCT/JP2019/002794, Filed on Jan. 28, 2019, 10 pages including English Translation.

International Search Report and Written Opinion mailed on Aug. 6, 2019, received for PCT Application PCT/JP2019/017635, Filed on Apr. 25, 2019, 18 pages including English Translation.

Japanese Office Action issued Jan. 10, 2023, in corresponding Japanese Patent Application 2022-086954, 5 pp.

Japanese Office Action issued Jan. 10, 2023, in corresponding Japanese Patent Application 2022-086955, 6 pp.

* cited by examiner

Fig. 1

20: SATELLITE CONSTELLATION

70: EARTH

300: SATELLITE GROUP

Fig. 2

20: SATELLITE CONSTELLATION

300: SATELLITE GROUP

70: EARTH

20: SATELLITE CONSTELLATION

21: ORBITAL PLANES

70: EARTH

Fig. 5

30: SATELLITE

21: ORBITAL PLANE

70: EARTH

300: SATELLITE GROUP

Fig. 6

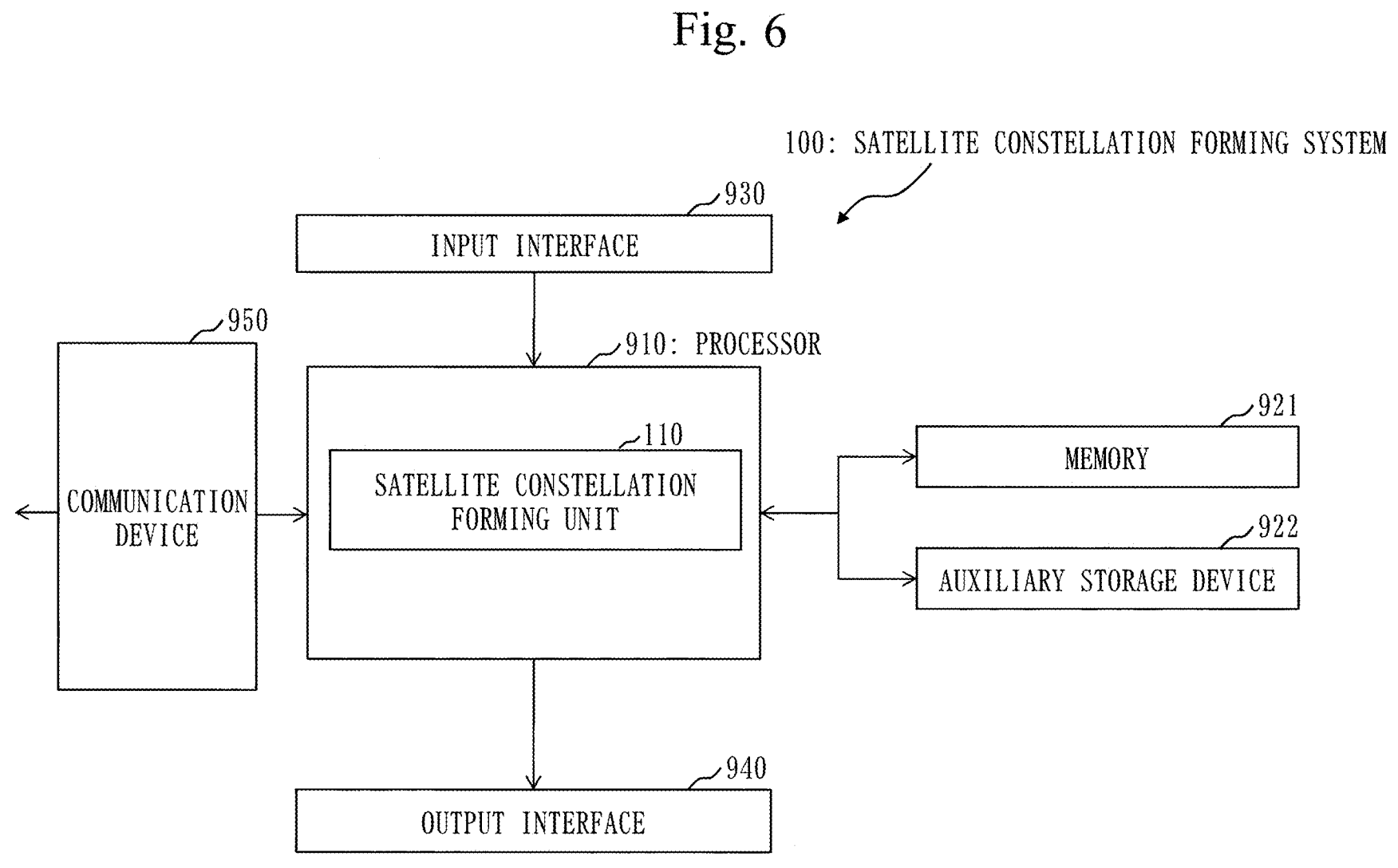

100: SATELLITE CONSTELLATION FORMING SYSTEM

930 INPUT INTERFACE

910: PROCESSOR

110 SATELLITE CONSTELLATION FORMING UNIT

921 MEMORY

922 AUXILIARY STORAGE DEVICE

940 OUTPUT INTERFACE

950 COMMUNICATION DEVICE

Fig. 8

ORBITAL PLANE

| ALTITUDE | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 1 |  |  |  |  | ▨ |  |  |  |  |  |  |  |  |  |  |  |  |
| 2 |  |  |  | ▤ |  |  |  |  |  |  |  |  |  |  |  |  |  |
| 3 |  |  | ▤ |  |  |  |  |  |  |  |  |  |  |  |  |  |  |
| 4 |  | ▤ |  |  |  |  |  |  |  |  |  |  |  |  |  |  |  |
| 5 |  |  |  |  |  | ▤ |  |  |  |  |  |  |  |  |  |  |  |
| 6 | ▤ |  |  |  |  |  |  |  |  |  |  |  |  |  |  |  |  |
| 7 |  |  |  |  |  |  | ▤ |  |  |  |  |  |  |  |  |  |  |
| 8 |  |  |  |  |  |  |  | ▤ |  |  |  |  |  |  |  |  |  |
| 9 |  |  |  |  |  |  |  |  | ▤ |  |  |  |  |  |  |  |  |
| 10 |  |  |  |  |  |  |  |  |  | ▤ |  |  |  |  |  |  |  |
| 11 |  |  |  |  |  |  |  |  |  |  | ▤ |  |  |  |  |  |  |
| 12 |  |  |  |  |  |  |  |  |  |  |  | ▤ |  |  |  |  |  |
| 13 |  |  |  |  |  |  |  |  |  |  |  |  | ▤ |  |  |  |  |
| 14 |  |  |  |  |  |  |  |  |  |  |  |  |  | ▤ |  |  |  |
| 15 |  |  |  |  |  |  |  |  |  |  |  |  |  |  | ▤ |  |  |
| 16 |  |  |  |  |  |  |  |  |  |  |  |  |  |  |  | ▤ |  |
| 17 |  |  |  |  |  |  |  |  |  |  |  |  |  |  |  |  | ▤ |

Fig. 11

ALWAYS PASS OBSERVATION AREA AT SAME TIME

RELATIONSHIP BETWEEN ORBIT AND SUN

WINTER

AUTUMN

SUN

SUMMER

SPRING

Fig. 13

21: ORBITAL PLANES

70: EARTH

Fig. 15

21: ORBITAL PLANE

30: SATELLITE

20: SATELLITE CONSTELLATION

300: SATELLITE GROUP

Fig.19

DECREASE IN ALTITUDE

REVOLUTION OF ORBITAL PLANE

REVOLUTION OF ORBITAL PLANE

Fig. 20

21: ORBITAL PLANES

70: EARTH

Figure 23:
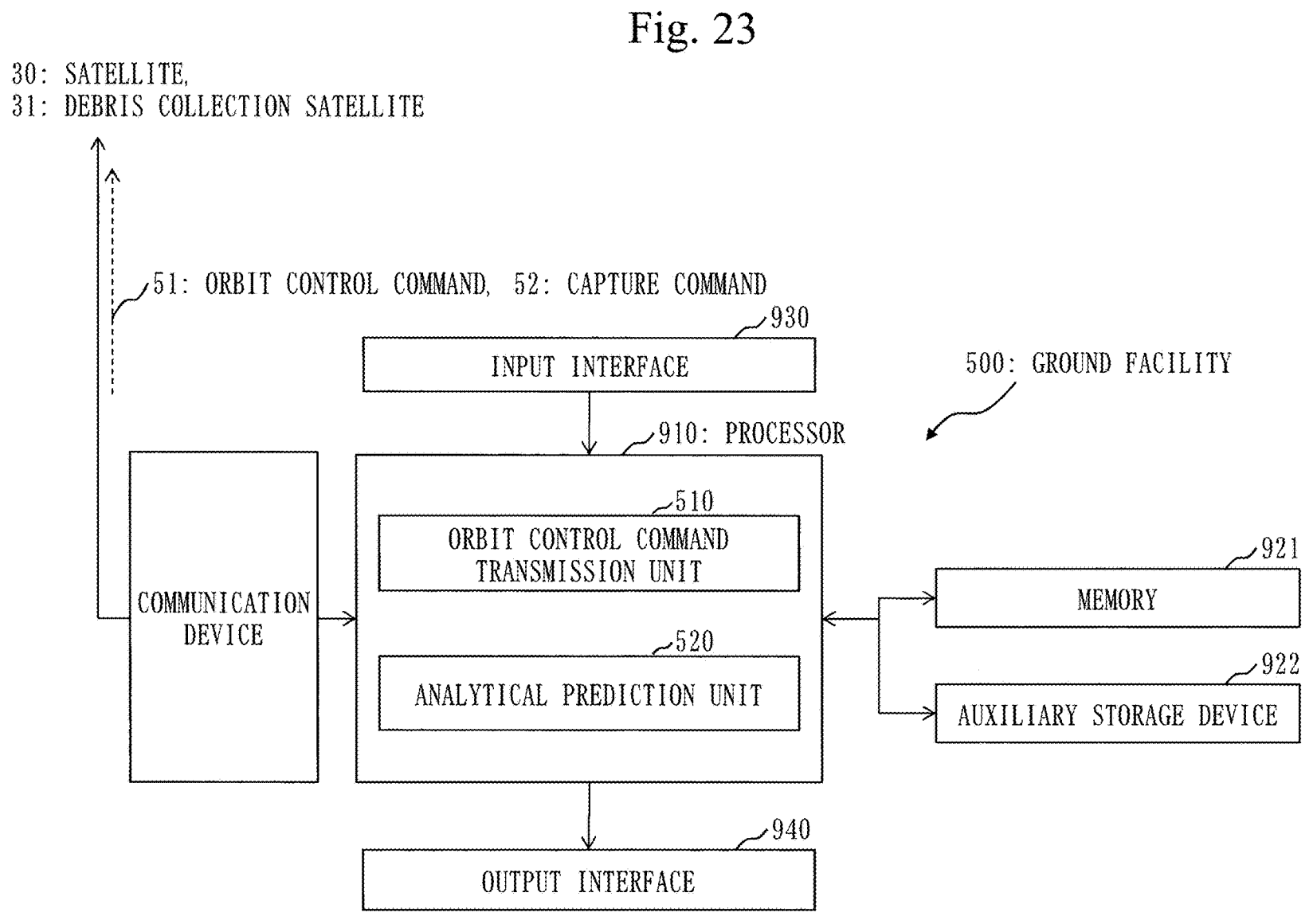

30: SATELLITE,
31: DEBRIS COLLECTION SATELLITE

51: ORBIT CONTROL COMMAND, 52: CAPTURE COMMAND

500: GROUND FACILITY

MEMORY                          921

AUXILIARY STORAGE DEVICE        922

930    INPUT INTERFACE

910: PROCESSOR

510    ORBIT CONTROL COMMAND TRANSMISSION UNIT

520    ANALYTICAL PREDICTION UNIT

940    OUTPUT INTERFACE

COMMUNICATION DEVICE

Fig. 24

20: SATELLITE CONSTELLATION

POLAR REGION

300: SATELLITE GROUP

Fig.27

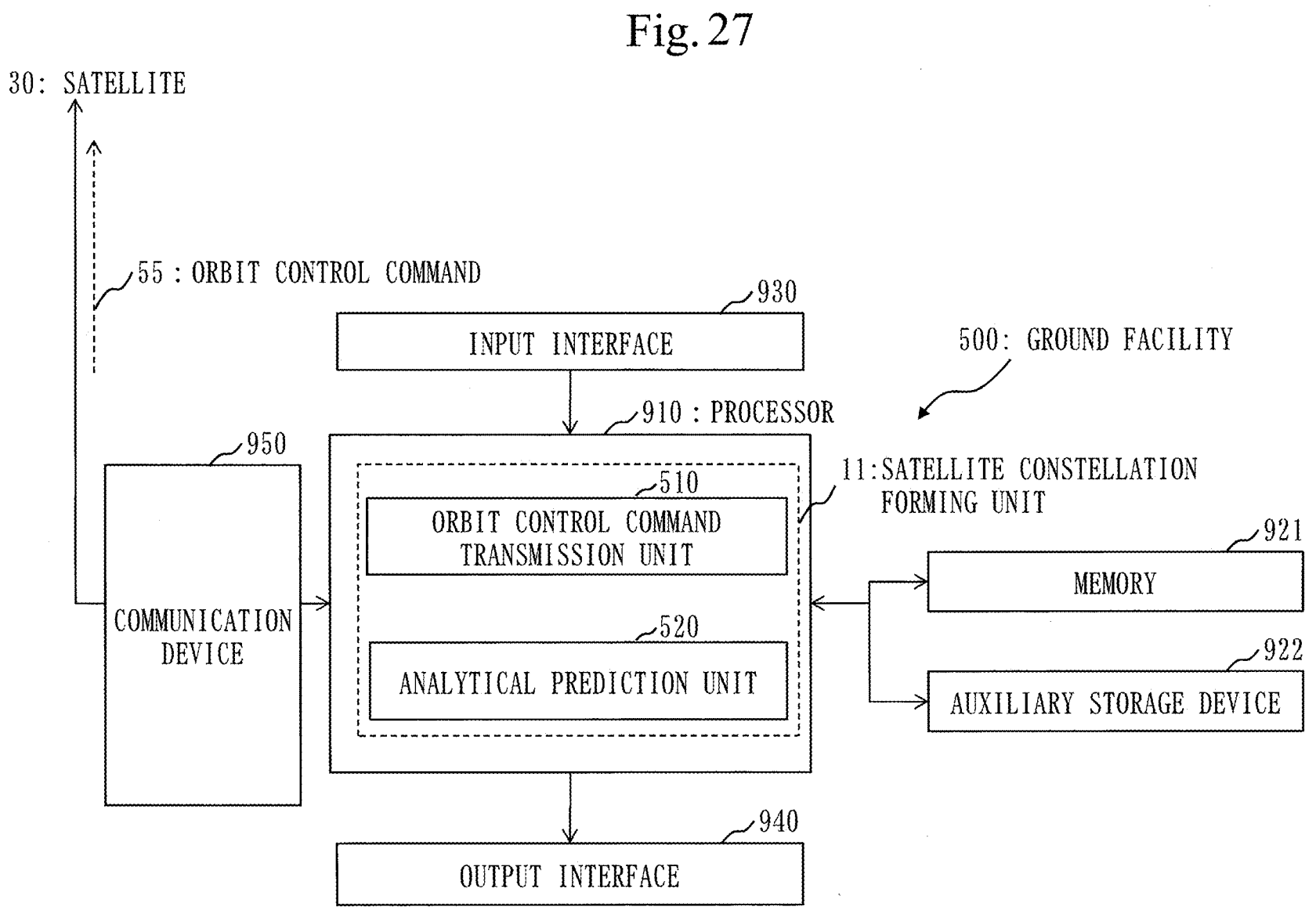

500: GROUND FACILITY

11: SATELLITE CONSTELLATION FORMING UNIT

MEMORY — 921

AUXILIARY STORAGE DEVICE — 922

INPUT INTERFACE — 930

910 : PROCESSOR

ORBIT CONTROL COMMAND TRANSMISSION UNIT — 510

ANALYTICAL PREDICTION UNIT — 520

OUTPUT INTERFACE — 940

COMMUNICATION DEVICE — 950

55 : ORBIT CONTROL COMMAND

30: SATELLITE

ELIMINATION OF CONGESTED HAZARDOUS AREA BY EQUALLY SPACED PHASES

70: EARTH

Fig. 33

SATELLITES WITH
DIFFERENT ORBITAL ALTITUDES

70: EARTH

SPACE TRAFFIC MANAGEMENT SYSTEM, SPACE TRAFFIC MANAGEMENT DEVICE, GROUND FACILITY AND OPERATION METHOD FOR AVOIDING COLLISION DURING ORBITAL DESCENT

CROSS-REFERENCE TO RELATED APPLICATIONS

The present application is based on PCT filing PCT/JP2020/001901, filed Jan. 21, 2020, which claims priority to JP PCT/JP2019/002794, filed Jan. 28, 2019 and JP PCT/JP2019/017635, filed Apr. 25, 2019, the entire contents of each are incorporated herein by reference.

TECHNICAL FIELD

The present invention relates to a satellite constellation forming system, a satellite constellation forming method, a debris removal scheme, a satellite constellation construction scheme, a ground facility, a space traffic management system, a space object management unit, and an operation method for avoiding collision during orbital descent. In particular, the present invention relates to a satellite constellation forming system, a satellite constellation forming method, a debris removal scheme, a satellite constellation construction scheme, a ground facility, a space traffic management system, a space object management unit, and an operation method for avoiding collision during orbital descent for avoiding a satellite collision risk.

BACKGROUND ART

In recent years, a large-scale satellite constellation of several hundred to several thousand satellites has been proposed. In space traffic management (STM), there is an increasing need to create international rules for avoiding collision risks due to coexistence of a plurality of satellite constellations.

Patent Literature 1 discloses a technology for forming a satellite constellation composed of a plurality of satellites in the same circular orbit.

CITATION LIST

Patent Literature

Patent Literature 1: JP 2017-114159 A

SUMMARY OF INVENTION

Technical Problem

In a satellite constellation, it is generally arranged that different orbital planes all have the same orbital altitude. Therefore, there is a risk that satellites flying at the same orbital altitude in different orbital planes may collide with each other. A problem is that collision risks increase as the number of orbital planes and the number of satellites in an orbital plane increase.

It is an object of the present invention to avoid a collision risk in a satellite constellation.

Solution to Problem

A satellite constellation forming system according to the present invention forms a satellite constellation having a plurality of orbital planes in which a plurality of satellites fly at a same orbital altitude in each orbital plane, and the satellite constellation forming system includes a satellite constellation forming unit to form the satellite constellation in which orbital altitudes of the plurality of orbital planes are mutually different.

Advantageous Effects of Invention

In a satellite constellation forming system according to the present invention, a satellite constellation forming unit forms a satellite constellation in which orbital altitudes of a plurality of orbital planes are mutually different. There is no possibility of collision between satellites flying in the same orbital plane. Therefore, according to the satellite constellation forming system of the present invention, a plurality of orbital planes have mutually different orbital altitudes, so that there is an effect that a collision risk can be avoided for all satellites in a satellite constellation.

BRIEF DESCRIPTION OF DRAWINGS

FIG. 1 is an example in which a plurality of satellites realize a communication service to the ground over the entire globe of Earth;

FIG. 2 is an example in which a plurality of satellites in a single orbital plane realize an Earth observation service;

FIG. 5 is an example of a plurality of satellites flying in an orbital plane of a satellite constellation according to Embodiment 1;

FIG. 6 is a configuration diagram of a satellite constellation forming system according to Embodiment 1;

FIG. 8 is a diagram illustrating relative altitude differences in a plurality of orbital planes according to Embodiment 2;

FIG. 11 is a diagram illustrating an orbital plane that satisfies conditions for a sun-synchronous orbit according to Embodiment 4;

FIG. 13 is a schematic diagram illustrating an example of conditions for collisions in a satellite constellation;

FIG. 15 is an example of a satellite constellation formed by the satellite constellation forming system according to Embodiment 6;

FIG. 19 is a diagram illustrating a concept of deorbit by free fall;

FIG. 20 is a diagram illustrating collision risks when satellites located above a satellite constellation deorbit;

FIG. 21 is a diagram illustrating changes in orbital altitude by acceleration and deceleration of a satellite;

FIG. 23 is a diagram illustrating a configuration of a ground facility according to Embodiment 10;

FIG. 24 is an example of a satellite constellation formed by the satellite constellation forming system according to Embodiment 6;

FIG. 27 is an example of a configuration of a ground facility included in the satellite constellation forming system;

FIG. 30 is an example of a configuration of a space traffic management device according to Embodiment 12;

FIG. 32 is a diagram illustrating an arrangement of satellites in an orbital plane in Example 2 of the space traffic management process according to Embodiment 12;

FIG. 33 is a diagram illustrating a plurality of orbital planes having the same normal vector and different orbital altitudes;

DESCRIPTION OF EMBODIMENTS

Figure 3:
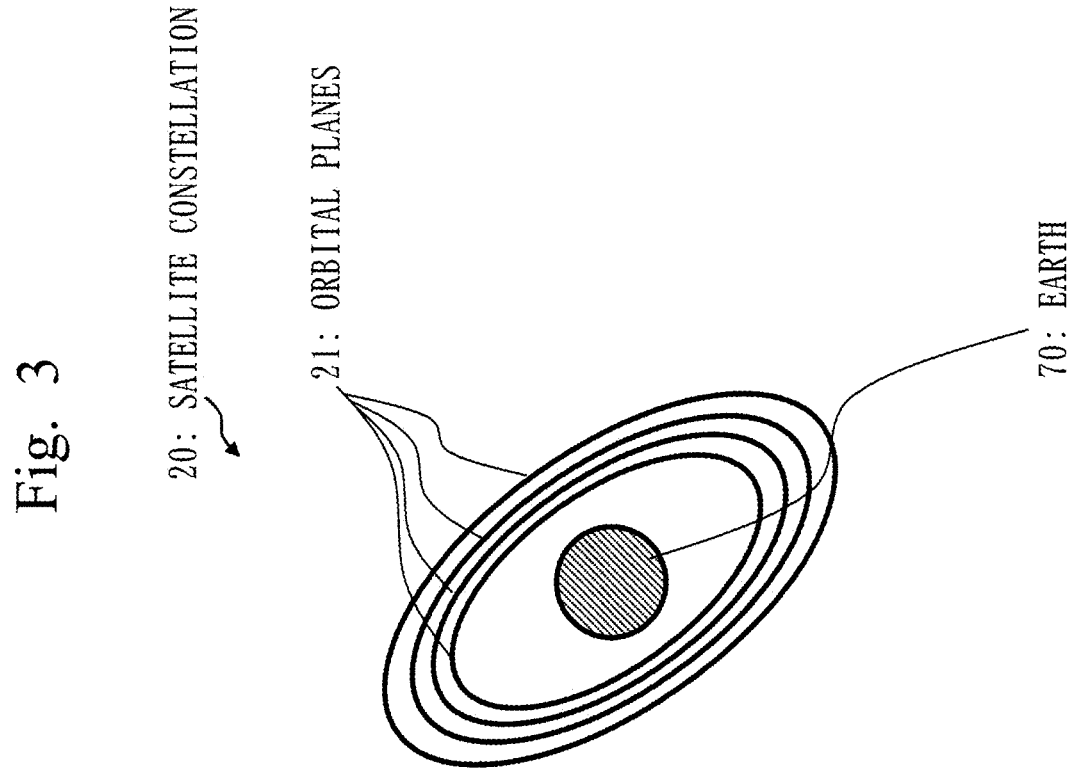
FIG. 3 is a schematic diagram illustrating an example of a plurality of orbital planes of a satellite constellation according to Embodiment 1.

Embodiments of the present invention will be described hereinafter with reference to the drawings. Throughout the drawings, the same or corresponding parts are denoted by the same reference signs. In the description of the embodiments, description of the same or corresponding parts will be suitably omitted or simplified. In the drawings hereinafter, the relative sizes of components may be different from actual ones. In the description of the embodiments, directions or positions such as "up", "down", "left", "right", "front", "rear", "top side", and "back side" may be indicated. These terms are used only for convenience of description, and are not intended to limit the placement and orientation of components such as devices, equipment, or parts.

Embodiment 1

Figure 1:
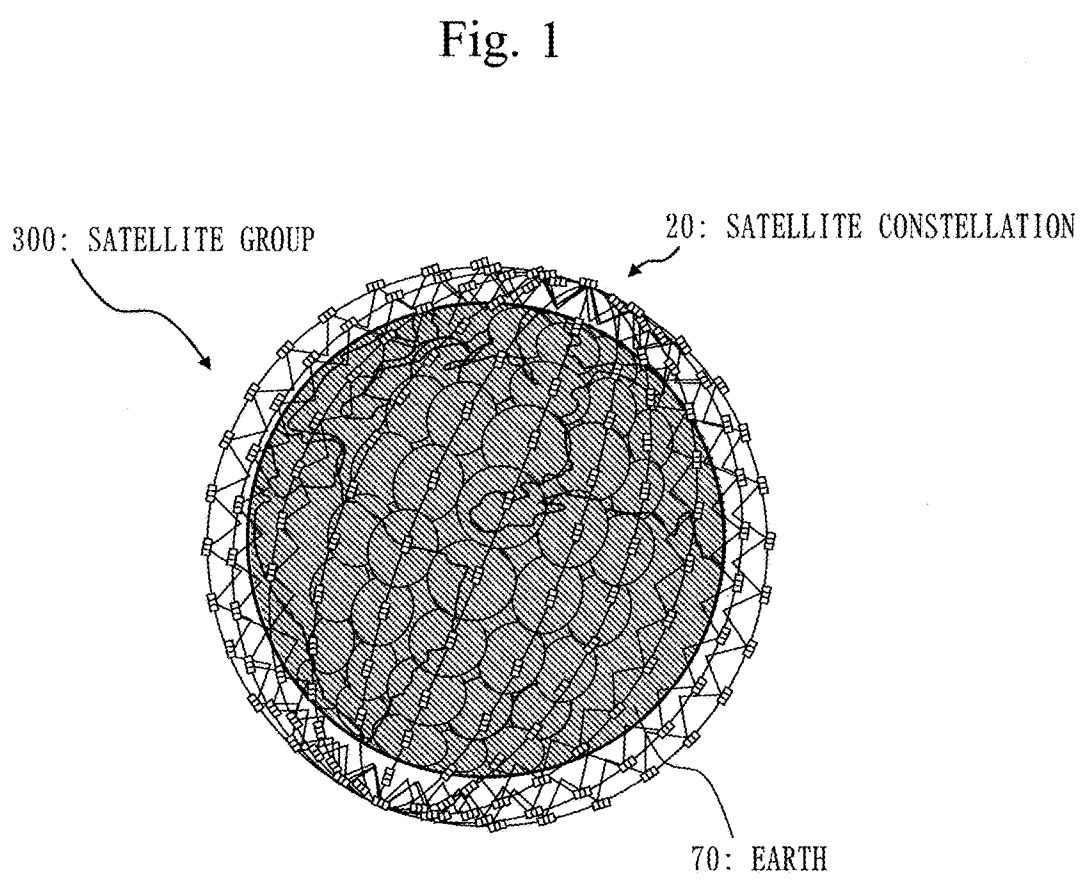

FIG. 1 is a diagram illustrating an example in which a plurality of satellites cooperatively realize a communication service to the ground over the entire globe of Earth 70.

FIG. 1 illustrates a satellite constellation 20 that realizes a communication service over the entire globe.

The ground communication service range of each satellite of a plurality of satellites flying at the same altitude in the same orbital plane overlaps the communication service range of a following satellite. Therefore, with such satellites, the satellites in the same orbital plane can provide a communication service to a specific point on the ground in turn in a time-division manner.

However, a communication service can be provided with a single orbital plane only to an area directly below the orbit of satellites. Thus, another orbital plane rotated in the east-west direction with respect to Earth is placed adjacently, and a communication service is concurrently provided by a plurality of satellites in this orbital plane. By providing adjacent orbital planes in this way, communication services can be provided to the ground with widespread coverage across the adjacent orbits. Similarly, by placing a large number of orbital planes at approximately equal intervals around Earth, a communication service to the ground can be provided over the entire globe. When seen from a specific point on the ground, each satellite flies away in a short period of time. However, if satellites in orbit provide a communication service in turn in a time-division manner, a communication service can be provided continuously to any point on the ground. In this case, in order to share the communication service with a following satellite, each satellite provides and accepts necessary signals and information, using an inter-satellite communication method.

When a communication service is realized by a satellite constellation orbiting in low Earth orbit, the service areas of all satellites cover the entire globe, and a communication service for any given ground user is shared and continued by satellites flying above the user in turns while passing on signals and information. As a result, the communication service can be provided continuously to the ground user. By providing each satellite with the communication function between the satellite and the ground and also the inter-satellite communication function, signals and information can be transferred between satellites orbiting in proximity to each other. The transfer of signals and information that contributes to cooperation in a communication service mission will hereinafter be referred to as handover.

In a satellite constellation, it is generally arranged that different orbital planes all have the same orbital altitude. Since the ground speeds of satellites flying at the same orbital altitude are similar, the ground service ranges move according to the ground speeds of the satellites with the relative positional relationship of the service ranges of the individual satellites being maintained. If the service ranges of successive satellites in the same orbital plane or the service ranges of satellites in an adjacent orbital plane exhaustively cover the ground surface, the service range will always be maintained when seen from any given point on the ground.

Figure 2:
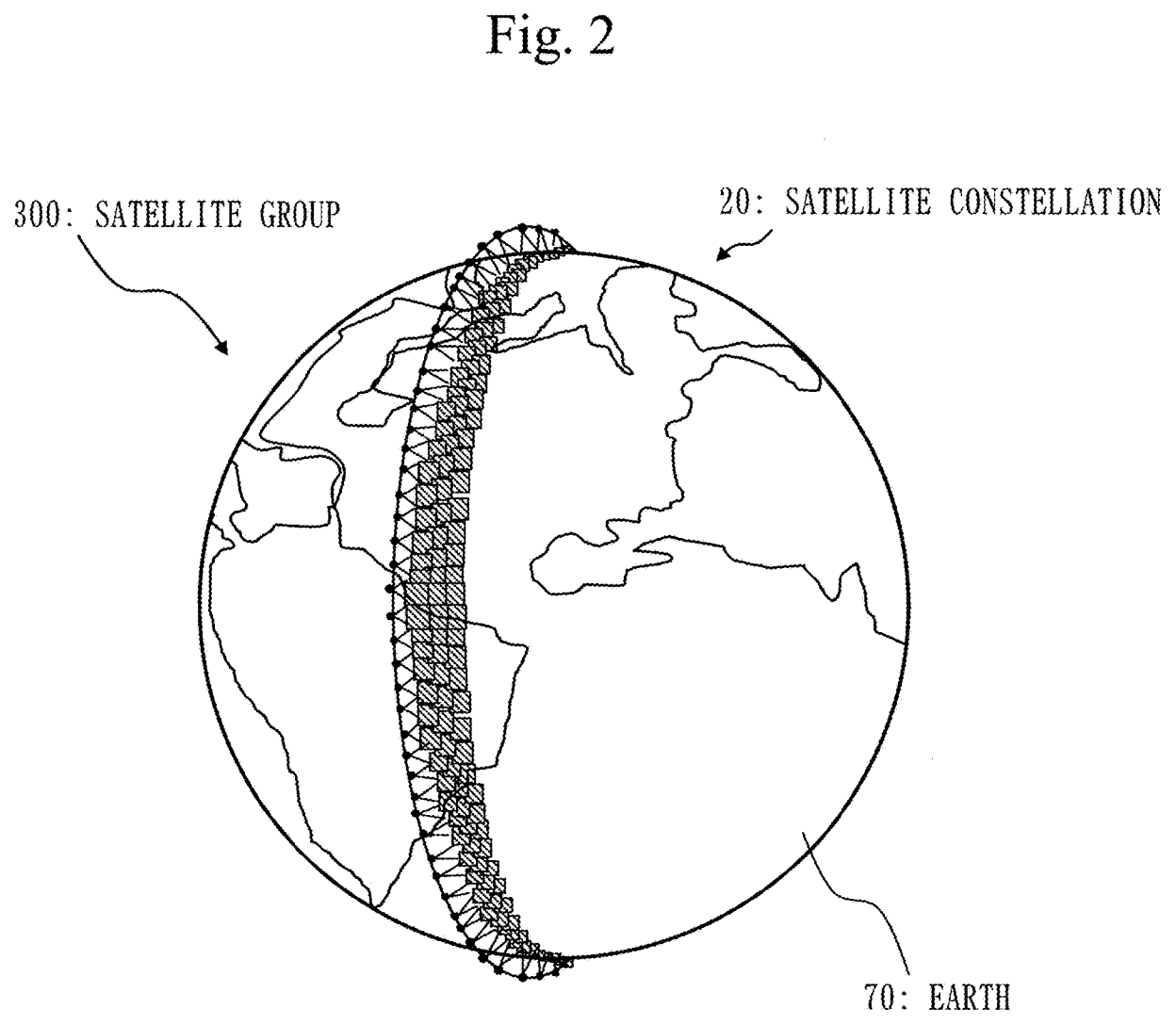

FIG. 2 is a diagram illustrating an example in which an Earth observation service is realized by a plurality of satellites in a single orbital plane.

FIG. 2 illustrates a satellite constellation 20 that realizes an Earth observation service. In the satellite constellation of FIG. 2, satellites each equipped with an Earth observation device, which is an optical sensor or a radio sensor such as synthetic-aperture radar, fly at the same altitude in the same orbital plane. In this way, in a satellite group in which the ground imaging ranges of successive satellites overlap in a time-delay manner, a plurality of satellites in orbit provide an Earth observation service by capturing ground images in turn in a time-division manner. However, with the single orbital plane, a service can be provided only to the vicinity of an area directly below the orbit of the satellites. In contrast to this, if another orbital plane rotated in the east-west direction with respect to Earth is placed adjacently and a service by a plurality of satellites is similarly conducted concurrently, a ground service with widespread coverage between the adjacent orbits is possible. Similarly, by placing a large number of orbital planes at approximately equal intervals around Earth, an Earth observation service can be provided exhaustively over the entire globe. When seen from a specific point on the ground, each satellite flies away in a short period of time. However, if a plurality of satellites in orbit provide a service in turn in a time-division manner, an Earth observation service can always be provided to any given point on the ground.

Description of Configuration

A satellite constellation forming system 100 according to this embodiment forms a satellite constellation 20 having a plurality of orbital planes 21. In each orbital plane 21 of the plurality of orbital planes 21, a plurality of satellites 30 fly at the same orbital altitude.

The satellite constellation 20 formed by the satellite constellation forming system 100 according to this embodiment will be briefly described.

The satellite constellation 20 according to this embodiment is composed of a satellite group 300 made up of a plurality of satellites 30 in each orbital plane 21. In the satellite constellation 20 according to this embodiment, the satellite group 300 provides a service cooperatively. Specifically, the satellite constellation 20 refers to a satellite constellation composed of one satellite group provided by a communications service company as illustrated in FIG. 1. Specifically, the satellite constellation 20 refers to a satellite constellation composed of one satellite group provided by an observation service company as illustrated in FIG. 2.

FIG. 3 is a schematic diagram illustrating an example of the orbital planes 21 of the satellite constellation 20 according to this embodiment.

In FIG. 3, the orbital planes 21 in the satellite constellation 20 exist on approximately the same planes. As an example, 20 or more satellites may fly as a plurality of satellites in each of the orbital planes 21.

Figure 4:
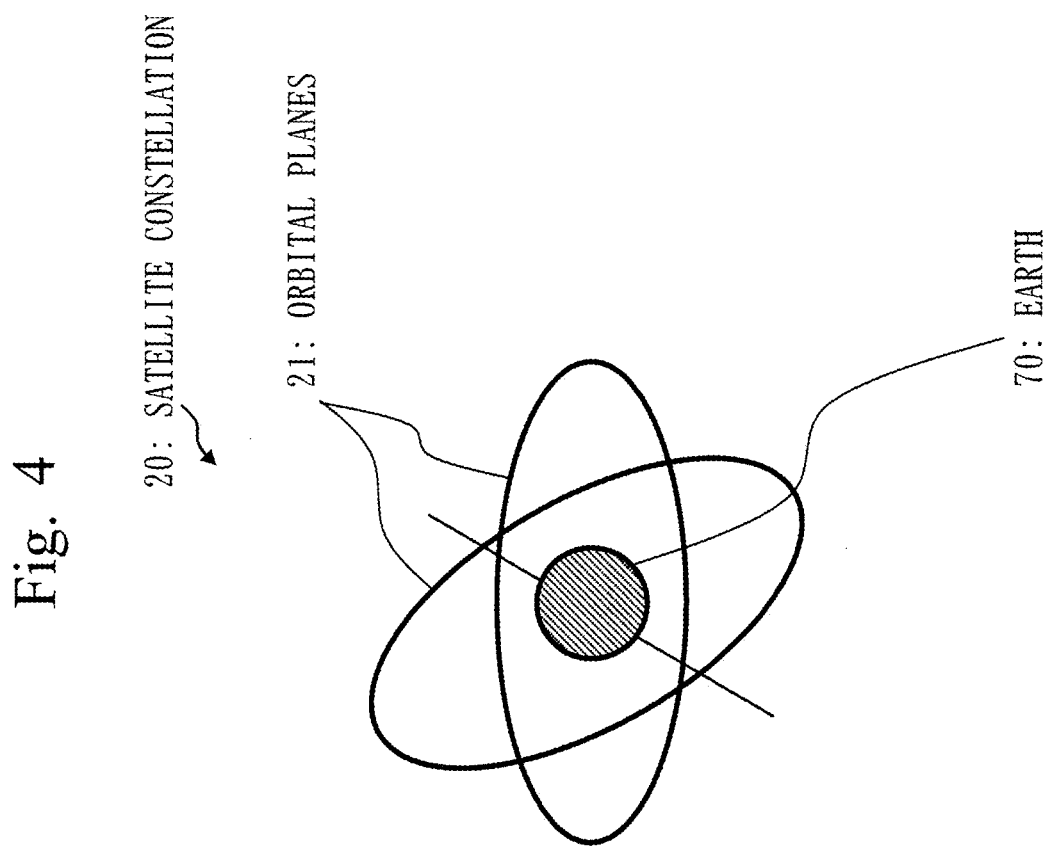
FIG. 4 is a schematic diagram illustrating another example of a plurality of orbital planes of a satellite constellation according to Embodiment 1.

FIG. 4 is a diagram illustrating another example of the orbital planes 21 of the satellite constellation 20 according to this embodiment.

In FIG. 4, the orbital planes 21 in the satellite constellation 20 exist on mutually different planes. In FIG. 4, the orbital inclination of each of the orbital planes 21 is approximately 90 degrees, but the orbital planes do not coincide with each other. That is, the orbital planes 21 intersect with each other. As an example, 20 or more satellites may fly as a plurality of satellites in each of the orbital planes 21. As an example, the satellite constellation 20 of FIG. 4 may have 20 or more orbital planes 21.

Figure 5:
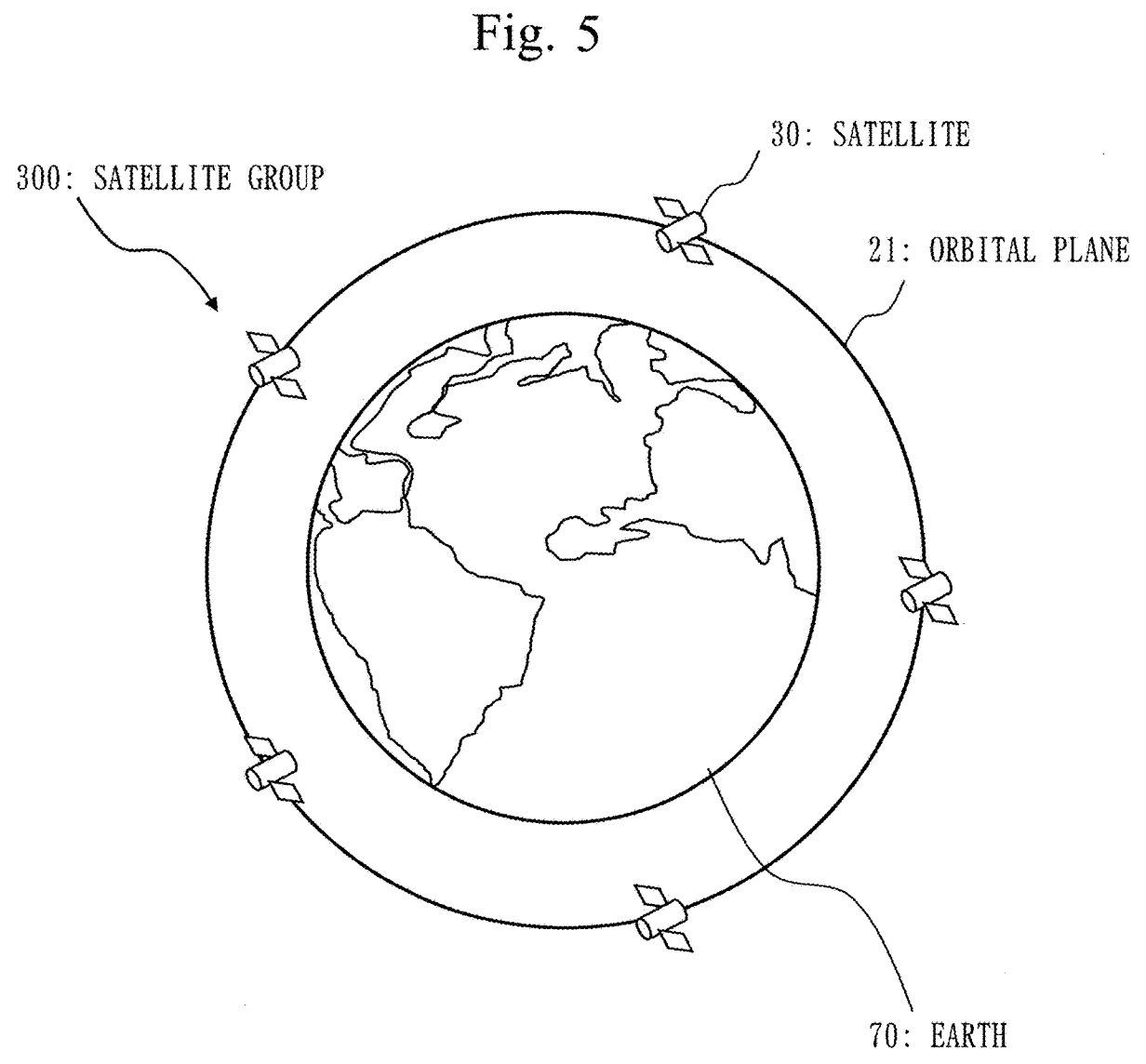

FIG. 5 is an example of the satellites 30 flying in one of the orbital planes 21 of the satellite constellation 20 according to this embodiment.

The satellites 30 flying at the same altitude in the same orbital plane fly at relatively the same speeds while maintaining the relative phases in the orbital plane. Therefore, the satellites 30 flying at the same altitude in the same orbital plane will not collide with each other.

Referring to FIG. 6, a configuration of the satellite constellation forming system 100 according to this embodiment will be described.

The satellite constellation forming system 100 includes a computer. FIG. 6 illustrates the configuration with one computer. In actuality, a computer is included in each of the satellites 30 constituting the satellite constellation 20 and each ground facility that communicates with the satellites 30. The computers provided in each of the satellites 30 and each ground facility that communicates with the satellites 30 cooperatively realize the functions of the satellite constellation forming system 100 according to this embodiment. An example of a configuration of the computer that realizes the functions of the satellite constellation forming system 100 will be described below.

The satellite constellation forming system 100 includes a processor 910, and also includes other hardware components such as a memory 921, an auxiliary storage device 922, an input interface 930, an output interface 940, and a communication device 950. The processor 910 is connected with other hardware components via signal lines and controls the other hardware components.

The satellite constellation forming system 100 includes a satellite constellation forming unit 110 as a functional element. The functions of the satellite constellation forming unit 110 are realized by hardware or software.

The processor 910 is a device that executes a satellite constellation forming program. The satellite constellation forming program is a program for realizing the functions of the satellite constellation forming unit 110.

The processor 910 is an integrated circuit (IC) that performs operational processing. Specific examples of the processor 910 are a CPU, a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium, such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device, such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of an output device, such as a display, is to be connected. Specifically, the output interface 940 is a USB terminal or a High Definition Multimedia Interface (HDMI, registered trademark) terminal. Specifically, the display is a liquid crystal display (LCD).

The communication device 950 has a receiver and a transmitter. Specifically, the communication device 950 is a communication chip or a network interface card (NIC). In the satellite constellation forming system 100, communication between a ground facility and a satellite and communication between satellites are performed via the communication device 950.

The satellite constellation forming program is read into the processor 910 and executed by the processor 910. The memory 921 stores not only the satellite constellation forming program but also an operating system (OS). The processor 910 executes the satellite constellation forming program while executing the OS. The satellite constellation forming program and the OS may be stored in the auxiliary storage device. The satellite constellation forming program and the OS that are stored in the auxiliary storage device are loaded into the memory 921 and executed by the processor 910. Part or the entirety of the satellite constellation forming program may be embedded in the OS.

The satellite constellation forming system 100 may include a plurality of processors as an alternative to the processor 910. These processors share the execution of the satellite constellation forming program. Each of the processors is, like the processor 910, a device that executes the satellite constellation forming program.

Data, information, signal values, and variable values that are used, processed, or output by the satellite constellation forming program are stored in the memory 921 or the auxiliary storage device 922, or stored in a register or a cache memory in the processor 910.

"Unit" of the satellite constellation forming unit 110 may be interpreted as "process", "procedure", or "step". "Process" of the satellite constellation formation process may be interpreted as "program", "program product", or "computer readable storage medium recording a program".

The satellite constellation forming program causes a computer to execute each process, each procedure, or each step, where "unit" of the above satellite constellation forming unit is interpreted as "process", "procedure", or "step". A satellite constellation forming method is a method performed by execution of the satellite constellation forming program by the satellite constellation forming system 100.

The satellite constellation forming program may be stored and provided in a computer readable recording medium or storage medium. Alternatively, the satellite constellation forming program may be provided as a program product.

Description of Operation

Figure 7:
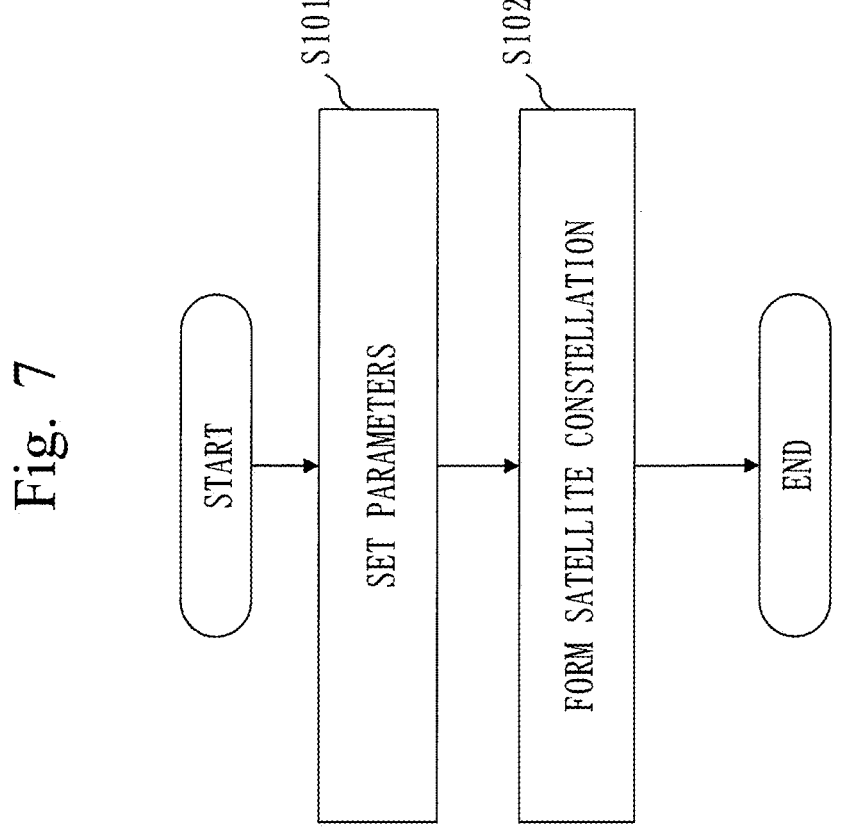
FIG. 7 is a diagram illustrating operation of the satellite constellation forming system according to Embodiment 1.

Referring to FIG. 7, operation of the satellite constellation forming system 100 according to this embodiment will be described.

In step S101, parameters are set in the satellite constellation forming system 100 so that the orbital planes 21 in the satellite constellation 20 have mutually different orbital altitudes.

In step S102, the satellite constellation forming unit 110 forms the satellite constellation 20 in which the orbital planes 21 have mutually different orbital altitudes. Using the preset parameters, the satellite constellation forming unit 110 forms the satellite constellation 20 in which the orbital planes 21 have mutually different orbital altitudes. As an example, 20 or more satellites may fly as a plurality of satellites in each of the orbital planes 21. As an example, the satellite constellation 20 of FIG. 4 may have 20 or more orbital planes 21.

The case in which the satellite constellation forming unit 110 forms the satellite constellation 20 in which the orbital planes 21 exist on mutually different planes (see FIG. 4) will be described in more detail. As described above, the satellites 30 of the satellite constellation 20 of FIG. 4 provide a service to a point on the ground in turn in a time-division manner.

In order to prevent a collision by making two objects fly at different orbital altitudes, consideration needs to be given to the sizes and shapes of the two objects and also to the positioning accuracy when tracking control is performed on the ground. For example, when the sizes of the objects are about 1 m, if their accurate positions are known, a collision can be avoided by maintaining an altitude difference of 3 m or more. However, if errors are included in four elements, position coordinates and time (x, y, z, t), a possibility of collision remains.

A satellite constellation operator is considered to be capable of maintaining a positioning accuracy of about 100 m at any time point for its own satellites. Therefore, by setting the altitude difference between different orbital planes to 200 m or more, it is possible to form the satellite constellation 20 having the orbital planes 21 with mutually different orbital altitudes according to this embodiment. Alternatively, the satellite constellation 20 having the orbital planes 21 with mutually different orbital altitudes according to this embodiment may be formed by setting the altitude difference between different orbital planes to 300 m or more with a margin. If the number of orbital planes in the satellite constellation 20 is about 20 planes, the satellite constellation forming unit 110 can construct the satellite constellation 20 in the range of an altitude difference of about 6 km.

When a satellite operator not having means for improving satellite positioning is to prevent a collision based on public information, the positioning accuracy at any time point is expected to deteriorate to about 500 m to 1 km. Therefore, the satellite constellation 20 having the orbital planes 21 with mutually different orbital altitudes according to this embodiment can be formed by setting the altitude difference between different orbital planes to 2 km or more. Alternatively, the satellite constellation 20 having the orbital planes 21 with mutually different orbital altitudes according to this embodiment may be formed by setting the altitude difference between different orbital planes to 3 km or more with a margin. If the number of orbital planes in the satellite constellation 20 is about 20 planes, the satellite constellation forming unit 110 can construct the satellite constellation 20 in the range of an altitude difference of about 60 km.

In recent years, an orbital object surveillance technology called space situation awareness (SSA) has been attracting attention. If surveillance accuracy improvement called a space fence concept is realized by this, even a satellite operator not having a satellite positioning improvement technique can realize a satellite constellation with a reduced altitude difference.

Next, the case in which the satellite constellation forming unit 110 forms the satellite constellation 20 in which the orbital planes 21 exist on the same plane (see FIG. 3) will be described in more detail. As described above, the satellites 30 of the satellite constellation 20 of FIG. 3 provide a service to a point on the ground in turn in a time-division manner.

In an Earth observation service realized by the satellite constellation 20 of FIG. 3, it is not always necessary to continue the service constantly, unlike a communication service. On the other hand, an Earth observation service is required to "allow any point to be imaged whenever the need arises". For this reason, it is desirable to form the satellite constellation 20 with satellites each provided with an Earth observation device equipped with a device to change the line of sight to a cross-track direction perpendicular to at least a traveling direction of the satellite. By providing the satellites with the function of changing the line of sight so as to cover the distance between adjacent orbits above the equator, any point in the entire globe can be imaged at any time anywhere. This has the effect of allowing the satellite constellation to be constructed with a smaller number of orbital planes when compared with a satellite constellation using Earth observation devices having individually fixed lines of sight, so that system construction costs can be reduced.

In addition, with respect to the traveling direction of the satellite, it is also not always necessary to exhaustively cover the range of the line of sight in which imaging is possible, and if a succeeding satellite or a satellite in an adjacent orbital plane can capture images by changing the line of sight, the number of satellites in the same orbital plane can be reduced. If the range in which the line of sight can be changed is about 2000 km in terms of the ground surface, the entire globe may be covered using only two or three satellites per orbital plane.

Other Configurations

In this embodiment, the functions of the satellite constellation forming unit 110 are realized by software. As a variation, the functions of the satellite constellation forming unit 110 may be realized by hardware.

The satellite constellation forming system 100 includes an electronic circuit in place of the processor 910.

The electronic circuit is a dedicated electronic circuit that realizes the functions of the satellite constellation forming unit 110.

Specifically, the electronic circuit is a single circuit, a composite circuit, a programmed processor, a parallel-programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array.

The functions of the satellite constellation forming unit 110 may be realized by one electronic circuit, or may be distributed among and realized by a plurality of electronic circuits.

As another variation, some of the functions of the satellite constellation forming unit 110 may be realized by the electronic circuit, and the rest of the functions may be realized by software.

Each of the processor and the electronic circuit is referred to also as processing circuitry. That is, in the satellite constellation forming system 100, the functions of the satellite constellation forming unit 110 are realized by the processing circuitry.

Description of Effects of this Embodiment

In the satellite constellation forming system according to this embodiment, a plurality of satellites in orbit provide a service in a specific point on the ground in turn in a time-division manner. On any given orbital plane, a plurality of satellites flying at the same altitude fly at approximately equal intervals. In addition, a satellite constellation composed of a plurality of orbital planes with mutually different orbital altitudes is formed.

In the satellite constellation forming system according to this embodiment, satellites flying in the same orbital plane at the same altitude fly at relatively the same speeds while maintaining the relative phases in the orbital plane, so they will not collide with each other. In different orbital planes, although a collision may occur on an intersection line between two planes, satellites flying at mutually different orbital altitudes will not collide with each other. In this way, when different orbital planes have mutually different orbital altitudes, there is an effect that a collision risk can be avoided for all satellites in the satellite constellation.

That satellites flying in the same orbital plane at different orbital altitudes will not collide with each other, as in the satellite constellation according to this embodiment, also holds between satellite constellations. Therefore, the basic concept according to this embodiment is also effective for avoiding a collision in a plurality of satellite constellations. In STM, where the need to create international rules in congested outer space has been emphasized in recent years, this has the effect of being able to provide a scheme for allowing satellites to coexist while avoiding a collision. That is, according to the satellite constellation of this embodiment, there is an effect that a collision between satellites can be avoided even when a vast number of satellites, such as several thousand satellites, are congested at altitudes in proximity to each other.

Embodiment 2

In this embodiment, differences from or additions to Embodiment 1 will be mainly described. Components that are substantially the same as those in Embodiment 1 are denoted by the same reference signs, and description thereof may be omitted.

In this embodiment, an aspect in which the satellite constellation forming unit 110 forms a satellite constellation 20 in which relative altitude differences between adjacent orbital planes in a plurality of orbital planes are arranged to be sinusoidal will be described.

Figure 8:
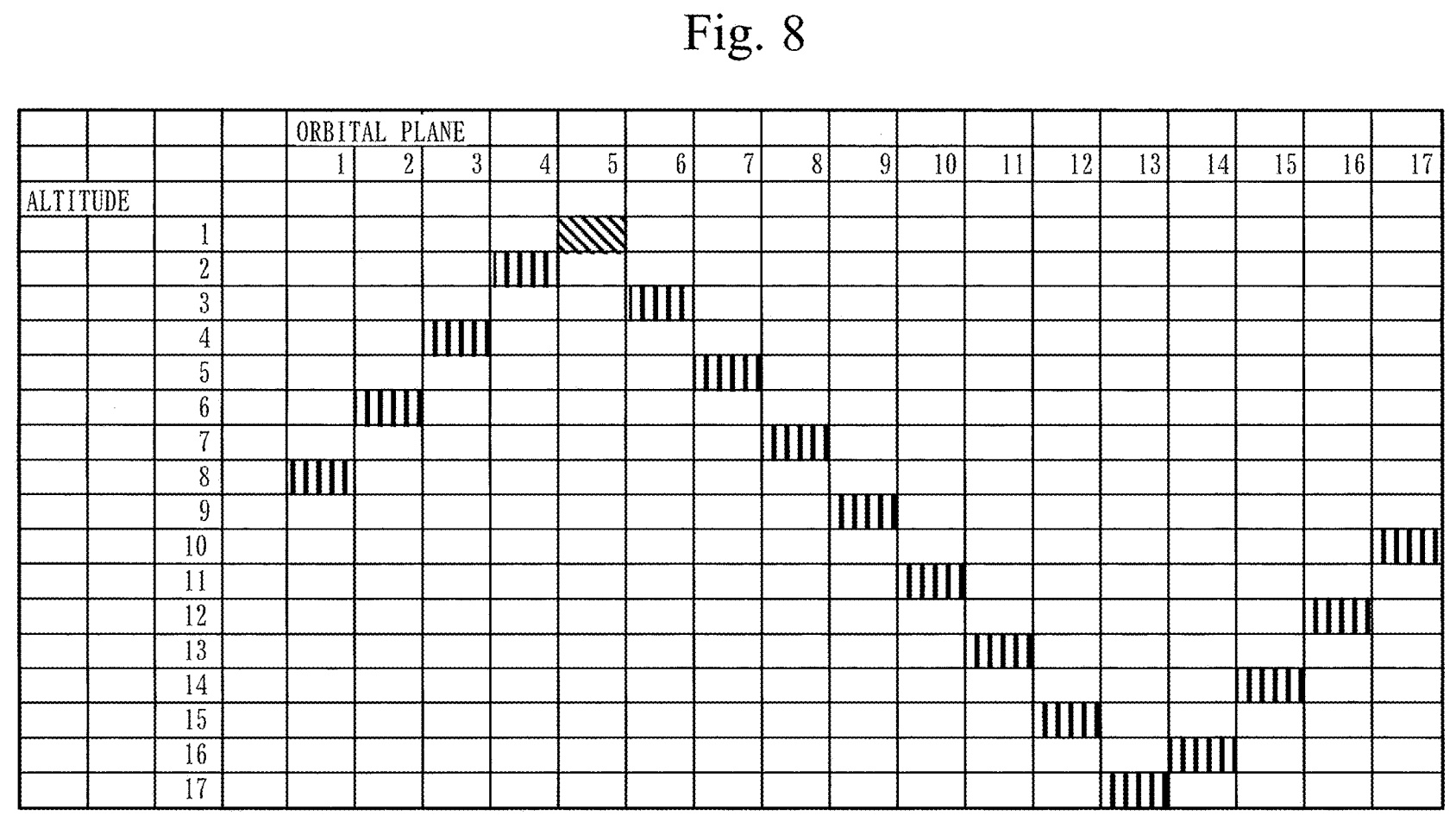

FIG. 8 is a diagram illustrating relative altitude differences in a plurality of orbital planes according to this embodiment.

FIG. 8 illustrates relative altitude differences in orbital planes in a satellite constellation 20 having 17 orbital planes. The vertical axis indicates that the altitude of orbital plane 1 is highest, and the altitude becomes lower in descending order, and does not indicate the distance. FIG. 8 indicates that when orbital plane 1 is used as a reference plane and differences between adjacent planes are plotted, such as a difference in orbital altitude between orbital plane 1 and orbital plane 2 and a difference in orbital altitude between orbital plane 2 and orbital plane 3, this results in a sinusoidal shape.

If the altitudes of adjacent orbital planes are significantly different, the distance of handover by inter-satellite communication will be long and the drive angle range for mutually matching communication antennas will be wide, which are disadvantages. In contrast to this, in the satellite constellation 20 according to this embodiment, the altitude differences between adjacent orbits are constrained, so that the relative differences change gradually. Therefore, handover that contributes to mission cooperation with a nearby satellite is facilitated.

In an Earth observation satellite, the image quality of an optical sensor, for example, depends on the satellite altitude. Thus, by arranging the altitude difference between adjacent orbits to be small, there is an effect that high-quality images with no inconsistency between image scenes can be obtained.

With a satellite constellation equipped with optical sensors that capture images of the ground surface and are capable of imaging in an area wider than the distance between adjacent orbits above the equator, images of the entire globe can be captured exhaustively. Since the resolution and observation width of an optical sensor depend on the orbital altitude, in the case of a satellite constellation employing optical sensors of the same specifications, the resolution is highest and the observation width is smallest when images are captured under the lowest orbital altitude condition. Therefore, if the observation width of an optical sensor under the lowest orbital altitude condition is greater than the distance between adjacent orbits above the equator, images of the ground surface can be captured exhaustively, including above the equator.

If the altitudes of adjacent orbits are significantly different, discontinuities involving different resolutions are likely to appear at joints of images. However, in the satellite constellation forming system according to this embodiment, the altitude differences between adjacent orbits are constrained, so that there is an effect that image data of the entire globe with good image quality without noticeable joints of images can be obtained. Also note that the greater the difference in satellite altitude, the faster the relative movement speeds of the ground service ranges. Thus, in the satellite constellation forming system according to this embodiment, the relative movement amounts of adjacent service areas can be minimized, so that there is an effect that the transfer of data to a following satellite, called handover, in communication is facilitated and errors can be readily reduced.

Embodiment 3

In this embodiment, differences from or additions to Embodiments 1 and 2 will be mainly described. Components that are substantially the same as those in Embodiments 1 and 2 are denoted by the same reference signs, and description thereof may be omitted.

In this embodiment, the satellite constellation forming unit 110 forms a satellite constellation 20 in which the radius of the ground service range per satellite is approximately $\sqrt{2}/2$ or more of the distance between adjacent orbits above the equator. Specifically, in this satellite constellation 20, the radius of the ground service range per satellite in an orbital plane with the lowest orbital altitude secures coverage of approximately $\sqrt{2}/2$ or more of the distance between adjacent orbits above the equator.

Figure 9:
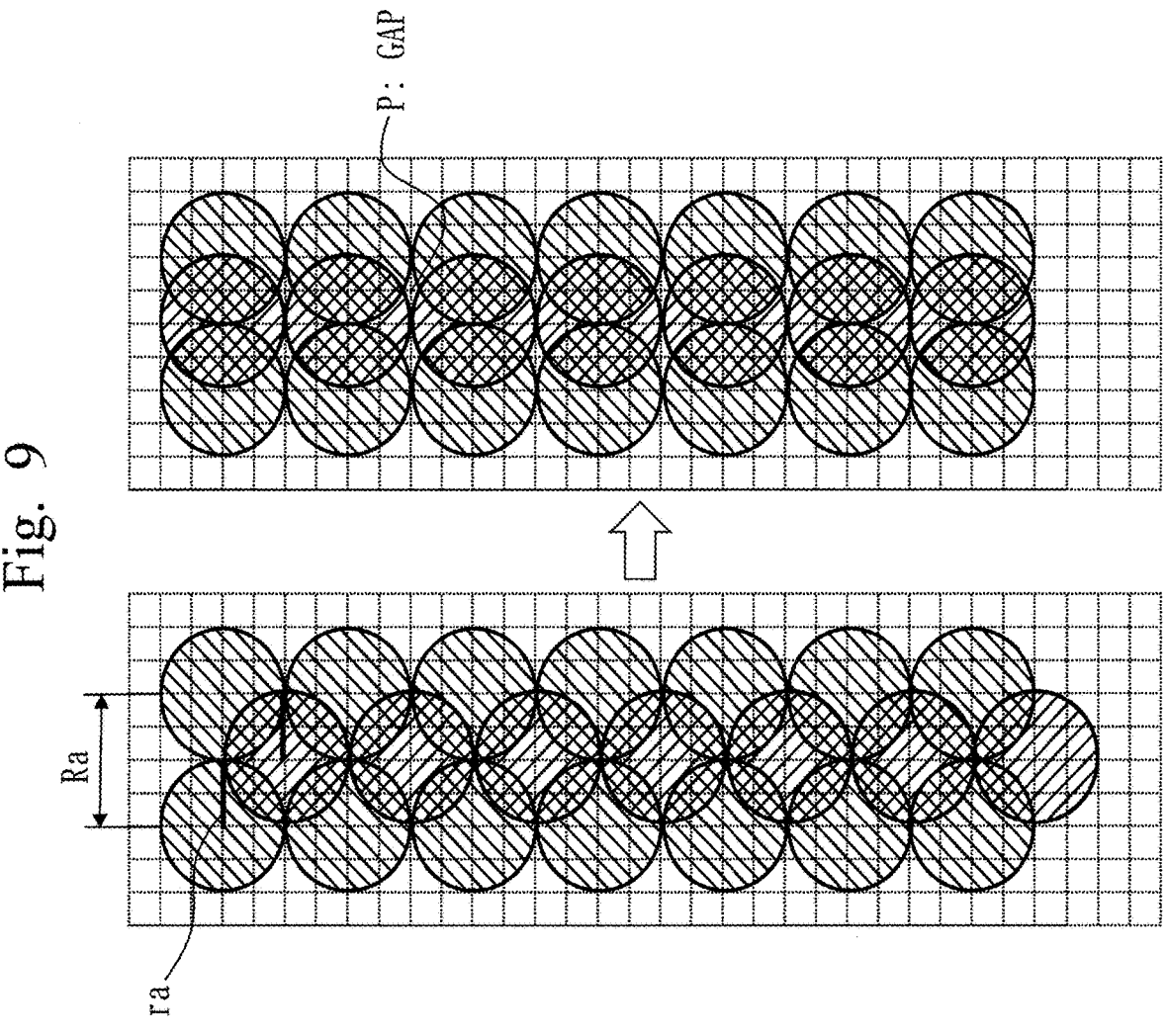
FIG. 9 is a diagram illustrating ground service ranges of a comparison example.

FIG. 9 is a diagram illustrating the ground service ranges of a comparison example.

When the relative positions of satellites are in an optimum state, the service ranges can cover the entire globe if the radius of each ground service range is secured comparably to the distance between adjacent orbits above the equator. If the altitudes of satellites are the same in all orbital planes, the relative relationship of service areas is maintained, so that a service can always be continuously provided covering the entire globe. However, in orbital planes with different orbital altitudes, the traveling speeds of satellites vary depending on the altitudes of the satellites. Thus, if the service areas secured exhaustively when the relative positions of the satellites are in the optimum state move relatively, gaps P, that is, areas that cannot be serviced may occur.

FIG. 9 illustrates the ground service ranges of three orbital planes. The radius ra of the ground service range is one-half of the distance Ra between adjacent orbits above the equator. In this case, as indicated in FIG. 9, if the ground service range of the middle orbital plane shifts forward by 45 degrees, areas that cannot be serviced (gaps) will occur.

Figure 10:
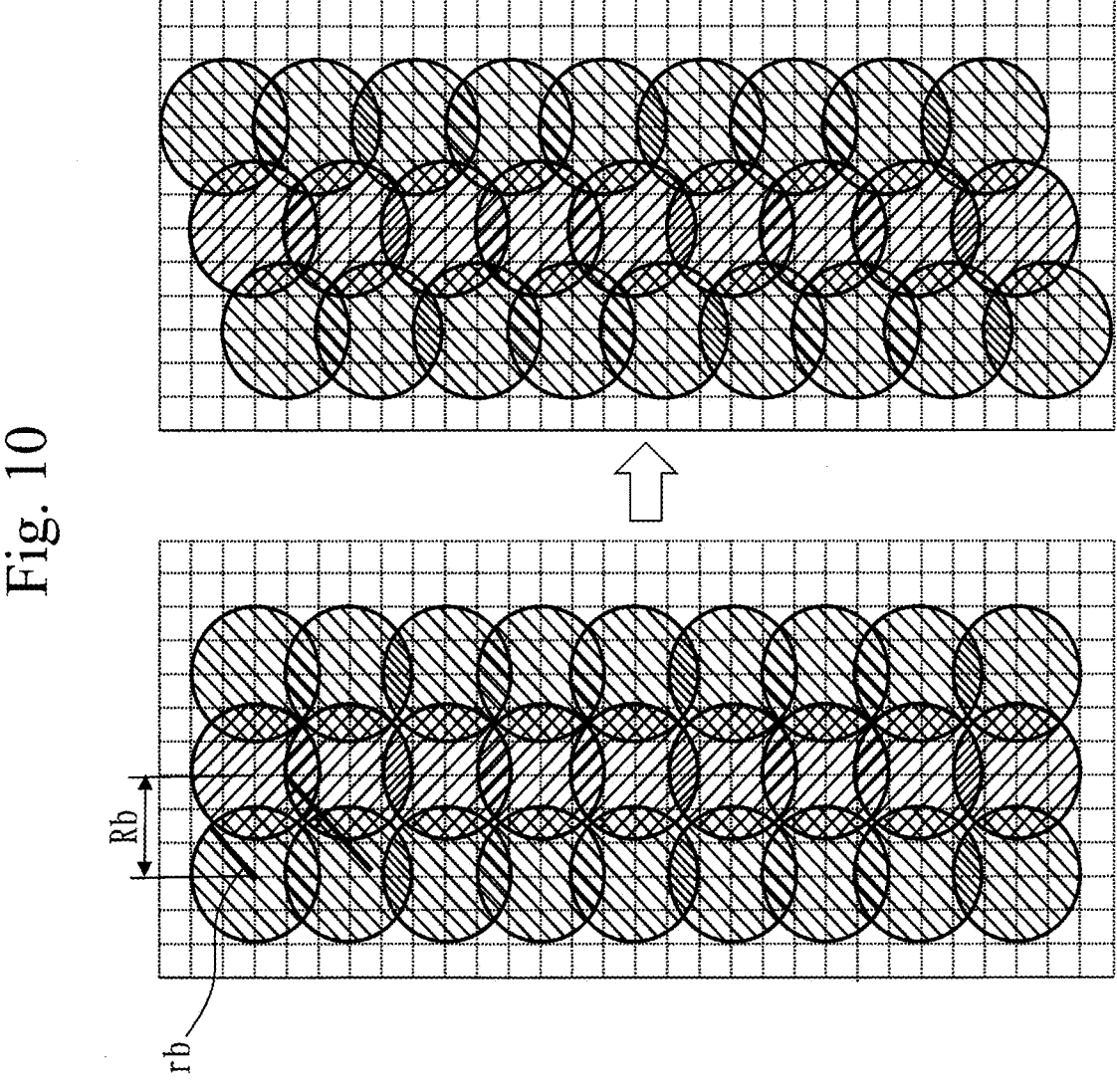
FIG. 10 is a diagram illustrating ground service ranges according to Embodiment 3.

FIG. 10 is a diagram illustrating the ground service ranges according to this embodiment.

In FIG. 10, the radius rb of the ground service range is $\sqrt{2}/2$ of the distance Rb between adjacent orbits above the equator. In this case, as indicated in FIG. 10, even if the ground service range of each orbital plane shifts by 45 degrees, areas in which service is not available (gaps) will not occur.

As described above, with the satellite constellation forming system according to this embodiment, even when the relative positions of satellites are in the worst state, that is, the service range of an adjacent orbit is located approximately 45 degrees forward, no gaps occur in the service ranges. Therefore, with the satellite constellation forming system according to this embodiment, there is an effect that a service can be continued exhaustively over the entire globe without interruption even if the service range of an adjacent orbit moves relatively in the satellite traveling direction.

Embodiment 4

In this embodiment, differences from and additions to Embodiments 1 to 3 will be mainly described. Components that are substantially the same as those in Embodiments 1 to 3 are denoted by the same reference signs, and description thereof may be omitted.

In this embodiment, an aspect in which the satellite constellation forming unit 110 forms a satellite constellation 20 in which the orbital altitude of each of a plurality of orbital planes satisfies conditions for a sun-synchronous orbit will be described. In addition, an aspect in which the satellite constellation forming unit 110 forms a satellite constellation 20 in which the orbital altitudes of a plurality of orbital planes consist of only sun-synchronous sub-recurrent orbits will be described.

Figure 11:
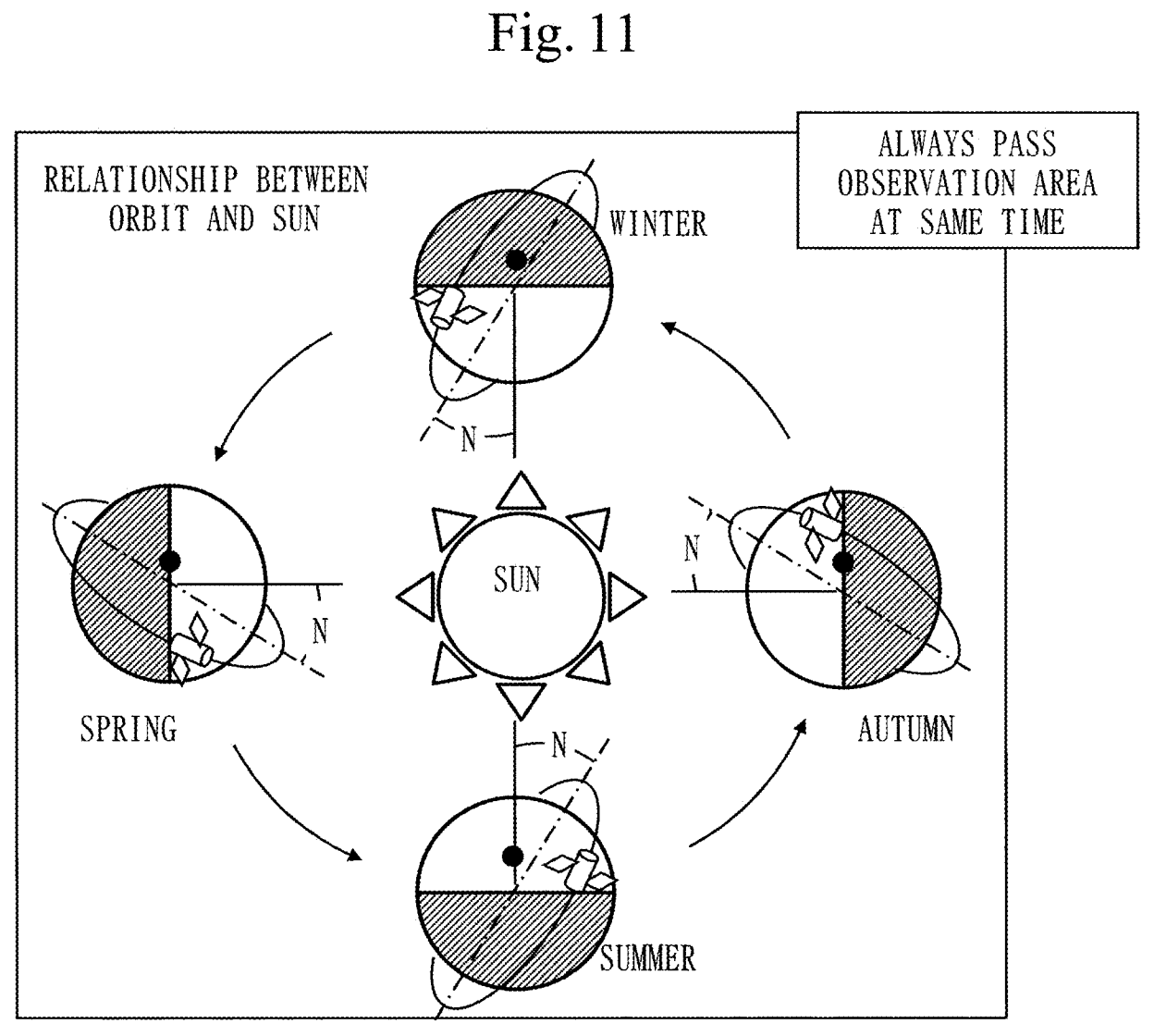

FIG. 11 is a diagram illustrating an orbital plane that satisfies conditions for a sun-synchronous orbit.

In an optical satellite of an Earth observation satellite, it is desirable to continue observation under approximately the same sunlight incidence angle condition. For this reason, an orbit of a satellite called a sun-synchronous satellite is often used. The orbit of a sun-synchronous satellite is such that the angle between the normal to the orbital plane, around which the orbital plane makes one revolution each year in synchronization with the revolution of Earth, and the direction of the sun is generally constant. The orbit of a sun-synchronous satellite is an orbit in which the local sun time (LST) of Earth is the same throughout the year.

Orbital altitudes that satisfy the conditions for a sun-synchronous orbit exist intermittently. In this embodiment, a satellite constellation 20 in which orbital planes have only orbital altitudes that satisfy the conditions for a sun-synchronous orbit is formed. With the satellite constellation 20 like this, it is possible to realize the satellite constellation in which each orbital plane continues a service with desired LST and there is no collision risk.

With an optical sensor, the brightness and S/N characteristic of an image change depending on the sunlight incidence angle. For this reason, in many cases, an Earth observation service is provided continuously using a sun-synchronous orbit under the condition that the sunlight incidence angle with respect to the orbital plane is constant. Furthermore, orbital planes of LST 10:00 to 11:00 are often used because a sufficient amount of light can be secured and there is no direct sea surface reflection. However, imaging is not possible "anytime, anywhere" with only a satellite group of LST 10:30 or thereabout. Therefore, it is effective to improve the imaging frequency by combining satellite groups having orbital planes of different LSTs.

For example, orbital planes of LST 9:00 and LST 12:00 are added in addition to LST 10:30. In this case, it may be possible to capture images roughly every 90 minutes, and if the time required for a low Earth orbit satellite to complete one orbit around Earth is about 90 to 100 minutes, there is an effect that the imaging frequency at any point can be improved, including imaging opportunities in the next round. Furthermore, if the number of satellites in the same orbital plane increases, widespread coverage is also possible. If LSTs are arranged at equal intervals similarly, imaging is possible "anytime, anywhere" in principle.

An optical sensor that can capture only visible images cannot capture images at night, but an infrared sensor or a radio sensor can capture images at any time including at night.

With a satellite constellation equipped with optical sensors that capture images of the ground surface and are capable of capturing images in a wider area than the distance between adjacent orbits above the equator, images of the entire globe can be captured exhaustively. Since the resolution and observation width of an optical sensor depend on the orbital altitude, in the case of a satellite constellation using optical sensors with the same specifications, the resolution is highest and the observation width is smallest when images are captured under the lowest orbital altitude condition. Therefore, if the observation width of an optical sensor under the lowest orbital altitude condition is greater than the distance between adjacent orbits above the equator, images of the ground surface can be captured exhaustively, including above the equator. If the altitudes of adjacent orbits are significantly different, discontinuities involving different resolutions are likely to appear at joints of images. However, also in this embodiment, when the satellite constellation according to Embodiment 2 is adopted, there is an effect that the altitude differences between adjacent orbits are constrained and image data of the entire globe with good image quality without noticeable joints of images can be obtained.

Variation of this Embodiment

As a variation of this embodiment, an aspect in which the satellite constellation forming unit 110 forms a satellite constellation 20 in which the orbital altitudes of a plurality of orbital planes consist of only sun-synchronous sub-recurrent orbits will be described.

A sun-synchronous sub-recurrent orbit is an orbit such that the ground projection line of a satellite's orbit is retraced after making several orbits, and is often used by an Earth observation satellite. Orbital altitudes that conform to the conditions for a sun-synchronous sub-recurrent orbit is a subset of orbital altitudes that conform to a sun-synchronous orbit.

The satellite constellation 20 in which the orbital altitudes of a plurality of orbital planes consist of only sun-synchronous sub-recurrent orbits facilitates operation planning, imaging planning, and data processing for performing steady-state observation of the same ground point by an Earth observation satellite repeatedly over a long period of time. Moreover, there is an effect that a satellite constellation without collision risks can be realized.

If there is no particular requirement for the recurrence period, the orbital altitudes of sun-synchronous sub-recurrent orbits can be composed of, for example, orbital altitudes of about 540 km (recurrence in 15 days), about 539 km (recurrence in 14 days), about 537 km (recurrence in 13 days), about 535 km (recurrence in 12 days), about 533 km (recurrence in 11 days), and about 530 km (recurrence in 10 days). With these six orbital planes, the satellite constellation 20 can be realized with altitude differences within about 10 km maximum.

For example, in a case in which only orbits with the recurrence period of 13 days are to be used, if six orbital planes of about 537 km, about 514 km, about 491 km, about 467 kin, about 445 km, and about 422 km are used, the satellite constellation 20 can be realized with altitude differences within about 115 km maximum.

Embodiment 5

In this embodiment, differences from or addition to Embodiment 1 will be mainly described. Components that are substantially the same as those in Embodiment 1 are denoted by the same reference signs, and description thereof may be omitted.

Figure 12:
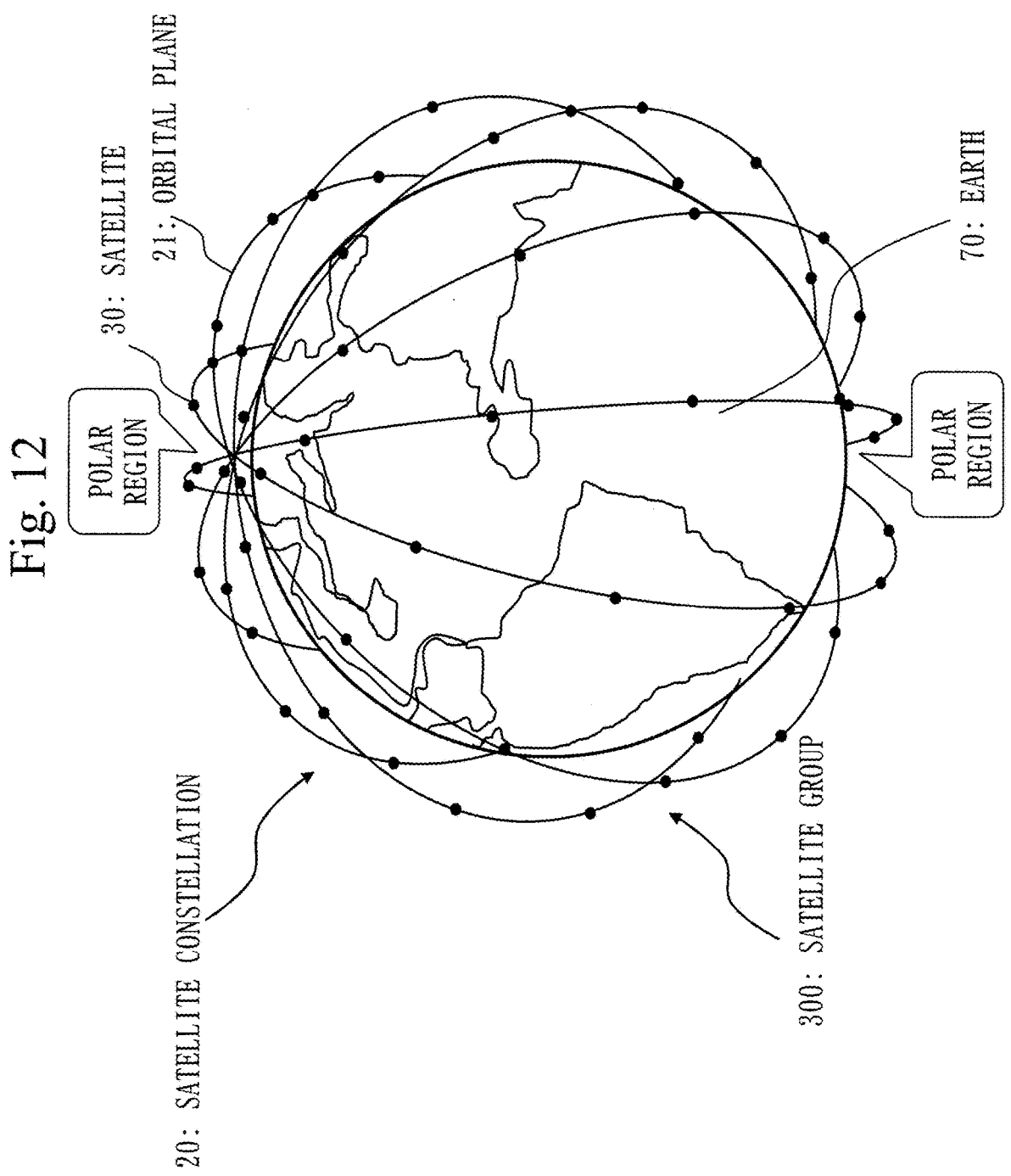
FIG. 12 is an example of a satellite constellation formed by the satellite constellation forming system according to Embodiment 5.

FIG. 12 is a diagram illustrating an example of a satellite constellation 20 formed by the satellite constellation forming system 100 according to this embodiment.

The satellite constellation 20 according to this embodiment is composed of a satellite group 300. In the satellite constellation 20, the satellite group 300 provides a service cooperatively. The satellite constellation 20 has a plurality of orbital planes 21 in which a plurality of satellites 30 fly at the same orbital altitude in each orbital plane 21.

In the satellite constellation 20 according to this embodiment, the orbital altitudes of the orbital planes 21 are the same and the orbital planes 21 exist on mutually different planes.

In the satellite constellation 20 illustrated in FIG. 12, the orbital inclination of each of the orbital planes 21 is about 90 degrees, and the orbital planes 21 exist on mutually different planes. Therefore, in the satellite constellation 20 illustrated in FIG. 12, the orbital planes 21 intersect in the polar regions.

Figure 13:
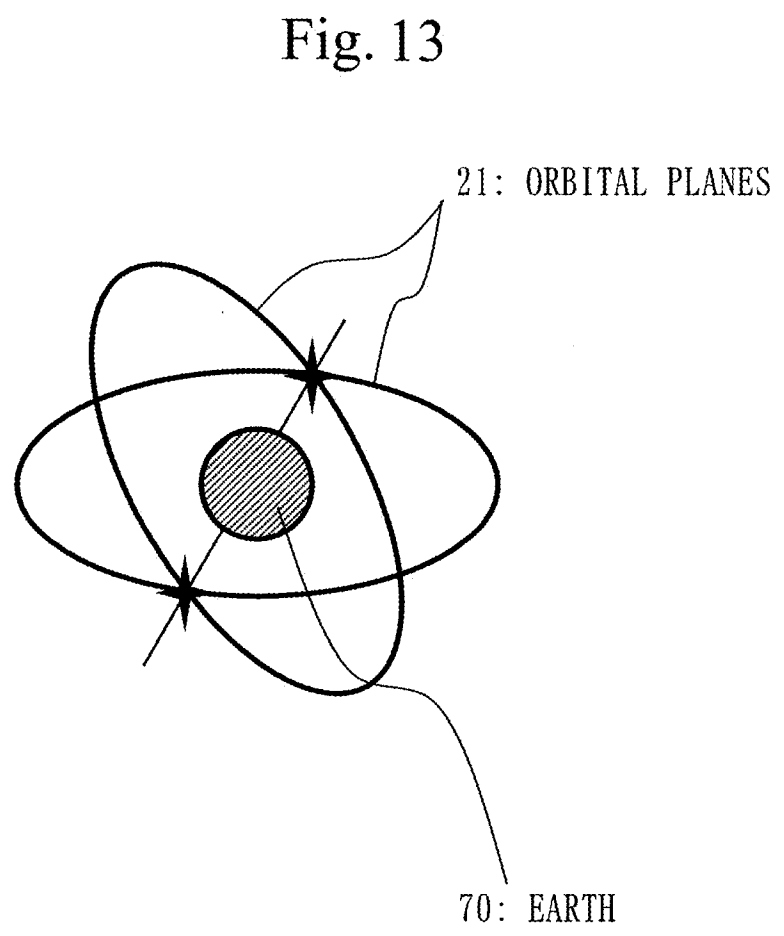
Figure 14:
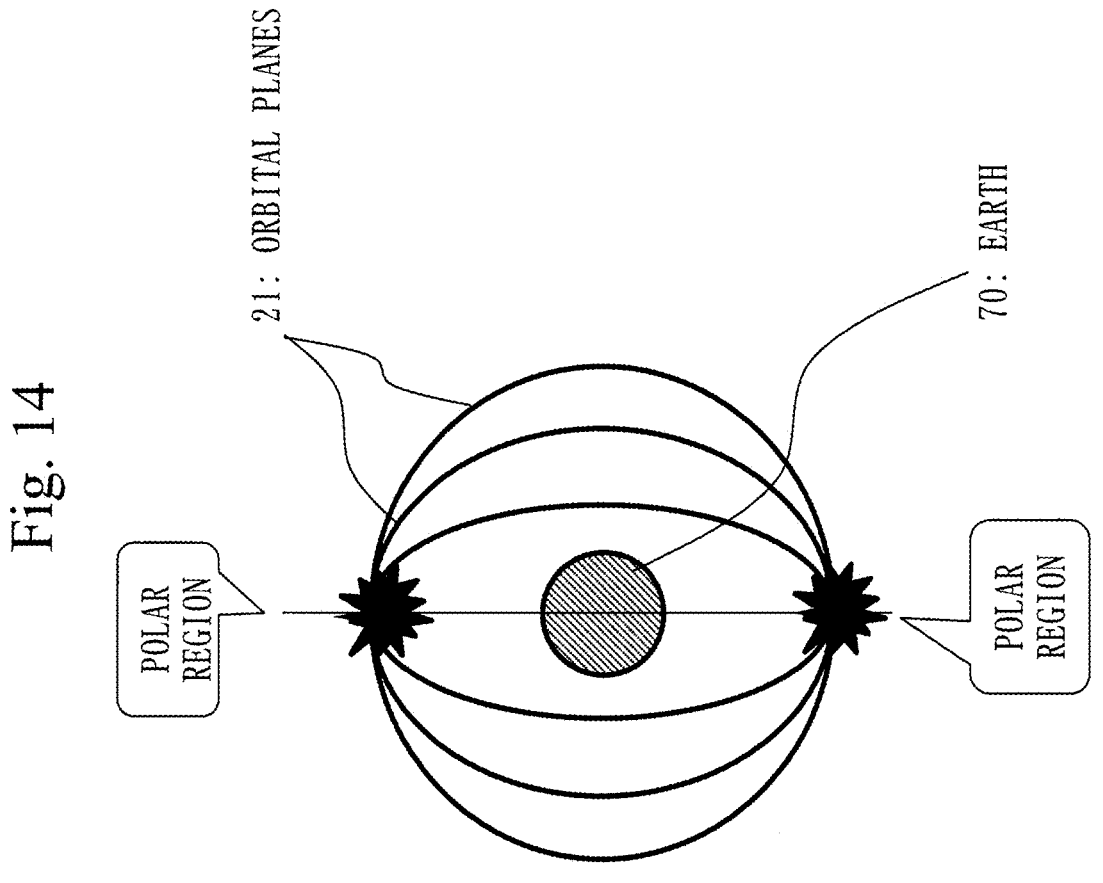
FIG. 14 is a schematic diagram illustrating an example of conditions for collisions in a satellite constellation.

FIGS. 13 and 14 are schematic diagrams illustrating examples of conditions for collisions in a satellite constellation.

Satellites flying at the same altitude in the same orbital plane fly at relatively the same speeds while maintaining the relative phases in the orbital plane, so that they will not collide with each other. However, satellites flying at the same orbital altitude in different orbital planes may collide with each other at an intersection point at which the orbital altitudes coincide on an intersection line between the orbital planes, as indicated in FIGS. 13 and 14. In particular, as indicated in FIG. 14, with low Earth orbiting satellites flying at altitudes of about 100 km to 2000 km and having an orbital inclination of about 90 degrees, intersection points exist around the polar regions, so that there are collision risks around the polar regions of the North and South Poles.

However, if satellites always pass an intersection point at mutually different timings, two objects will never collide. The satellite constellation forming unit 110 forms a satellite constellation 20 in which two objects will never collide. Specifically, the satellite constellation 20 is formed such that a time point at which a satellite flying in each of mutually different orbital planes passes an intersection point between these orbital planes is a multiple of "wait time T1 until arrival of a next satellite/the number of orbital planes" in the same orbital plane, and no coincidence of satellite passage time points occurs at any intersection point between any two orbital planes.

The satellite constellation 20 illustrated in FIG. 12 has a plurality of mutually different orbital planes having an orbital inclination of about 90 degrees. In this satellite constellation 20, all satellites in all the orbital planes pass the vicinity of the pole regions. Therefore, the satellite constellation forming unit 110 causes the satellites to fly such that the time point at which each satellite passes the polar region occurs at intervals of "wait time T1 until arrival of a next satellite/the number of orbital planes", so as to separate the time points at which the satellites pass the polar regions in the orbital planes.

Specifically, assuming that the time required for a low Earth orbiting satellite to complete one orbit is about 100 minutes, if 20 satellites fly per orbital plane, it takes about five minutes after a satellite passes a specific point for a following satellite to arrive at the specific point. Assuming that there are 20 orbital planes, the satellite constellation 20 according to this embodiment can be realized by shifting by 15 seconds, which is calculated by dividing 300 seconds into approximately equal intervals.

In the satellite constellation 20 formed by the satellite constellation forming system 100 according to this embodiment, satellites in the same orbital plane fly in synchronization at the same altitude, and satellites in different orbital planes also fly at a matching orbital altitude while maintaining the same satellite speeds. Therefore, by making initial settings such that the satellites in each orbital plane pass intersection points at mutually different timings in all the orbital planes, the relative timings are always maintained, so that there is an effect that a collision risk between any two satellites can be avoided in all the orbital planes.

In this embodiment, the example in which the timings are determined by equally dividing the wait time until arrival of a following satellite by the number of orbital planes has been indicated. However, there are various methods for selecting the intervals for separating the polar region passage timings and various methods for selecting the order of orbital planes.

Embodiment 6

In this embodiment, differences from or addition to Embodiment 5 will be mainly described. Components that are substantially the same as those in Embodiment 5 are denoted by the same reference signs, and description thereof may be omitted.

Figure 15:
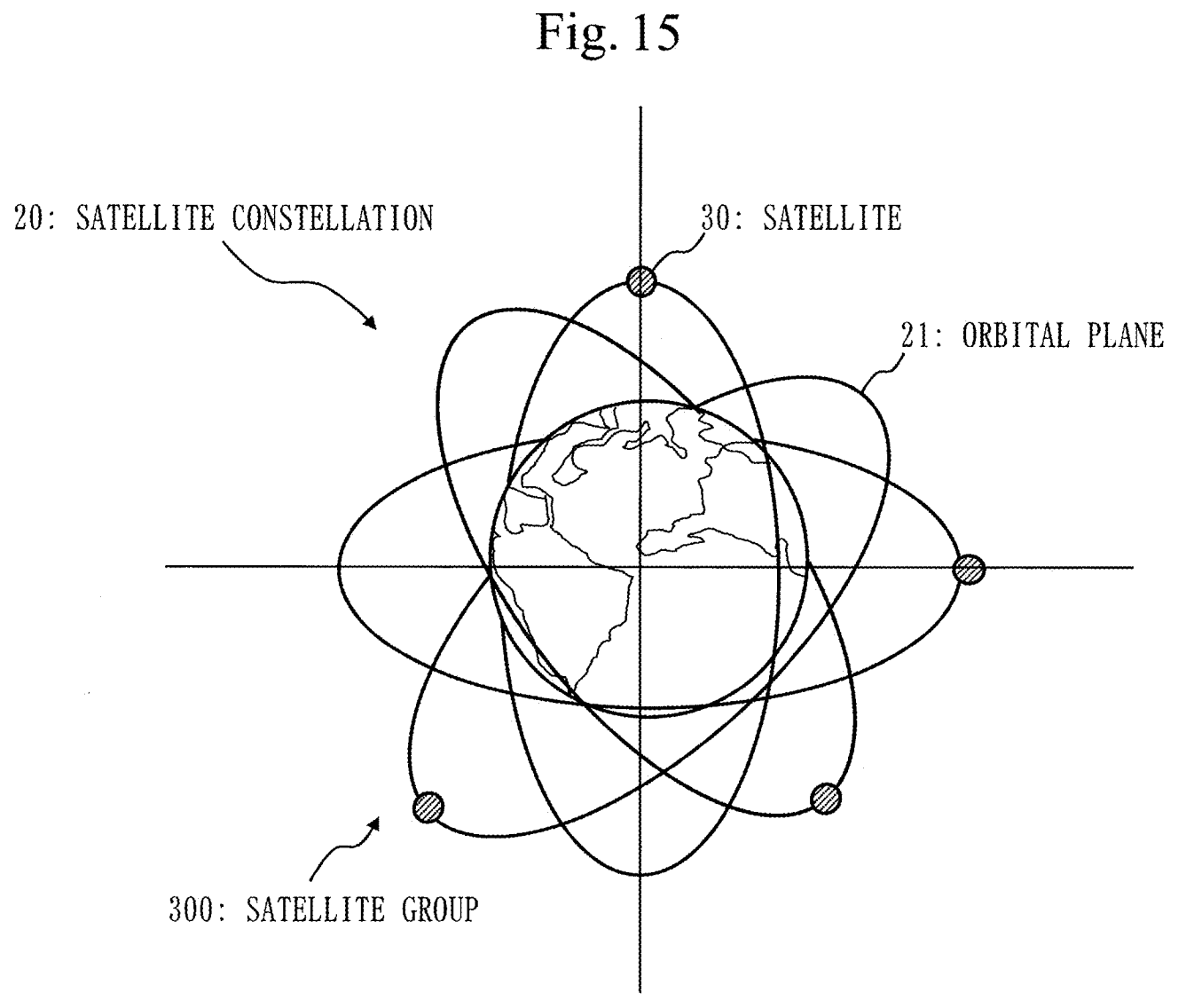
Figure 24:
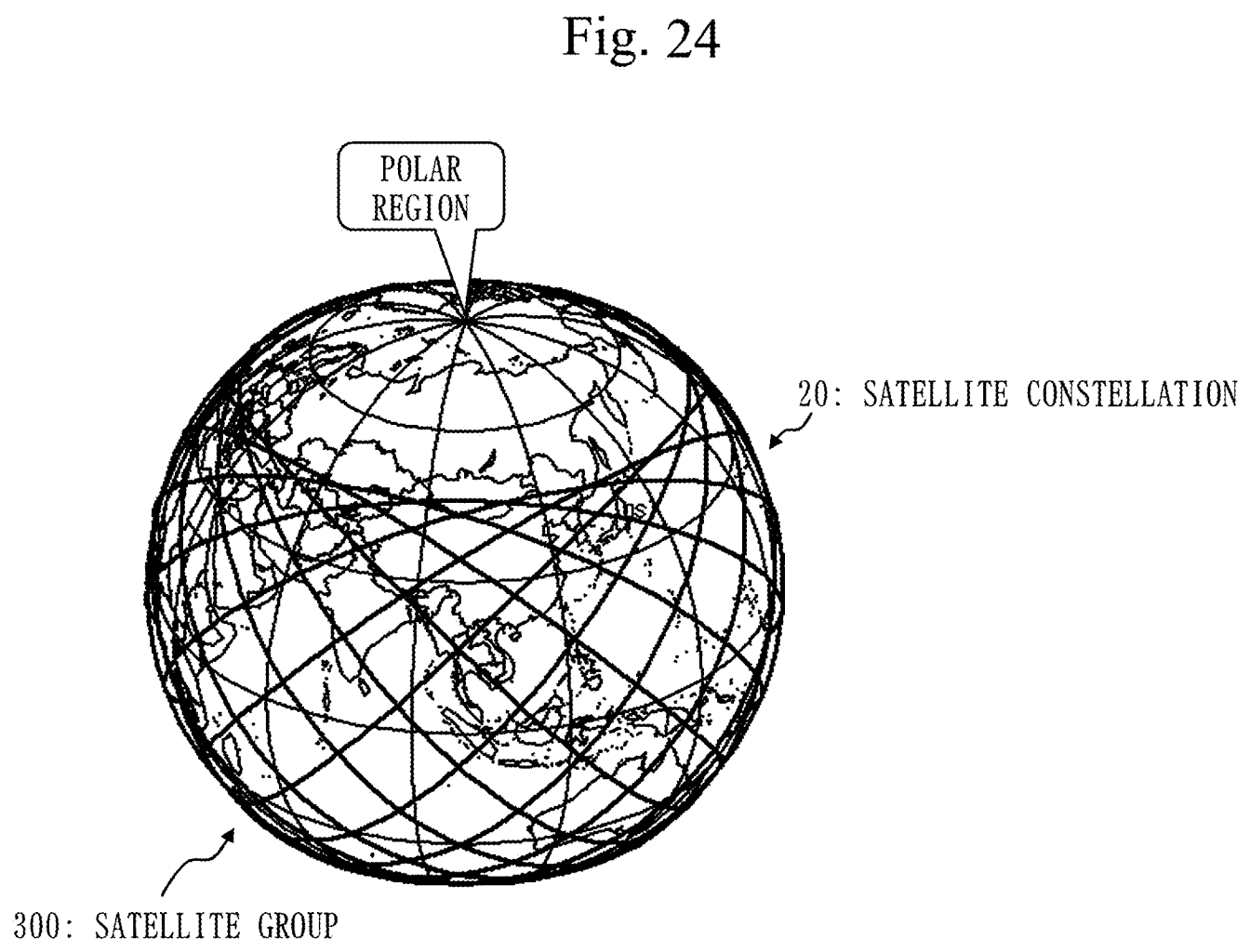

FIGS. 15 and 24 are diagrams illustrating examples of a satellite constellation 20 formed by the satellite constellation forming system 100 according to this embodiment.

In each satellite constellation 20 illustrated in FIGS. 15 and 24, the orbital inclination of each of orbital planes 21 is not about 90 degrees and the orbital planes 21 exist on mutually different planes. In this satellite constellation 20, any two orbital planes intersect at a point that is not in the polar region. Thus, the satellite constellation forming unit 110 forms the satellite constellation 20 such that a time point at which a satellite flying in each of mutually different orbital planes passes an intersection point between these orbital planes is a multiple of "wait time T1 until arrival of a next satellite/the number of orbital planes" in the same orbital plane, and no coincidence of satellite passage time points occurs at any intersection point between any two orbital planes.

As indicated in FIGS. 15 and 24, the intersection points of orbital planes with an orbital inclination greater than 90 degrees move away from the polar region commensurately with the orbital inclination. Depending on combinations of orbital planes, intersection points may occur at various locations including the vicinity of the equator. For this reason, places where collisions may occur are varied in comparison with the satellite constellation of Embodiment 5. However, this does not mean that the number of intersection points increases, so that the probability of a collision does not increase with diversification of places. When a large number of satellites fly in synchronization in the same orbital plane, if it is arranged that timings at which satellites in two specific orbital planes pass a specific intersection point do not coincide with each other in order to avoid a collision between the two specific orbital planes, no collision will occur between satellites in these two orbits. However, it should be noted that there remains a risk that a following satellite may collide with a satellite in another orbital plane. It is necessary to confirm that no coincidence of intersection point passage timings occurs for all possible combinations of orbital planes. If the timings cannot be adjusted successfully, it is necessary to change either the orbital planes or the number of satellites per orbital plane. If it can be confirmed that no collision will occur at all the intersection points, then the satellites operate in synchronization within and between all the orbital planes, so that there is an effect that a collision risk can be avoided.

In this embodiment, the example in which the timings are determined by equally dividing the wait time until arrival of a following satellite by the number of orbital planes has been indicated. However, there are various methods for selecting the intervals for separating the polar region passage timings and various methods for selecting the order of orbital planes.

As a specific example, an example of an Earth observation satellite using a sun-synchronous sub-recurrent orbit of an orbital inclination of about 98 degrees and an orbital period of about 98 minutes will be described. When a satellite constellation with a large number of satellites is constructed using this orbit, since the orbital inclination is about 98 degrees and thus is slanted, all orbital planes will not meet at the polar regions. However, there is always an intersection line between two different orbital planes and there is an intersection point at the same altitude, so that there is still a collision risk. In addition, there is a collision risk between every combination of two different orbital planes. Therefore, in this embodiment, a collision is avoided by separating satellite passage timings at an intersection point between any two planes.

Furthermore, there are also Earth observation satellites that fly with an orbital inclination of about 45 degrees, and the satellites are not sun-synchronous in this orbit. In the case of a low orbital inclination, an intersection point between two different orbital planes exists at a low latitude, and intersection points may occur at a plurality of latitudes. Depending on the combination of the number of orbital planes and the number of satellites flying in one orbital plane, it may not always be possible to avoid a collision. Thus, in the satellite constellation 20 according to this embodiment, the combination of the number of orbital planes and the number of satellites per orbital plane with which no collision will occur at all intersection points of two orbital planes is found out, and then the passage timings at each intersection point are maintained so as to avoid a collision.

If the number of satellites increases drastically, calculations for avoiding collisions in all possible combinations will become complex, so that Embodiment 1 using different orbital planes may be adopted.

Embodiment 7

In this embodiment, differences from or addition to Embodiment 5 will be mainly described. Components that are substantially the same as those in Embodiment 5 are denoted by the same reference signs, and description thereof may be omitted.

In this embodiment, an aspect of a method for shifting the wait time of satellites in the case of the satellite constellation 20 of FIG. 14, in which a plurality of orbital planes intersect in the polar regions, will be described. In this embodiment, when a plurality of orbital planes are numbered sequentially in order of placement, the wait time until arrival of a following satellite, which is a polar passage timing, is shifted by a duration of approximately half the wait time between odd-numbered orbital planes and even-numbered orbital planes. By forming the satellite constellation 20 in this way, the ground service ranges are arranged alternately between adjacent odd-numbered and even-numbered planes, so that there is an effect that the ground surface service ranges can be rationally covered.

Figure 16:
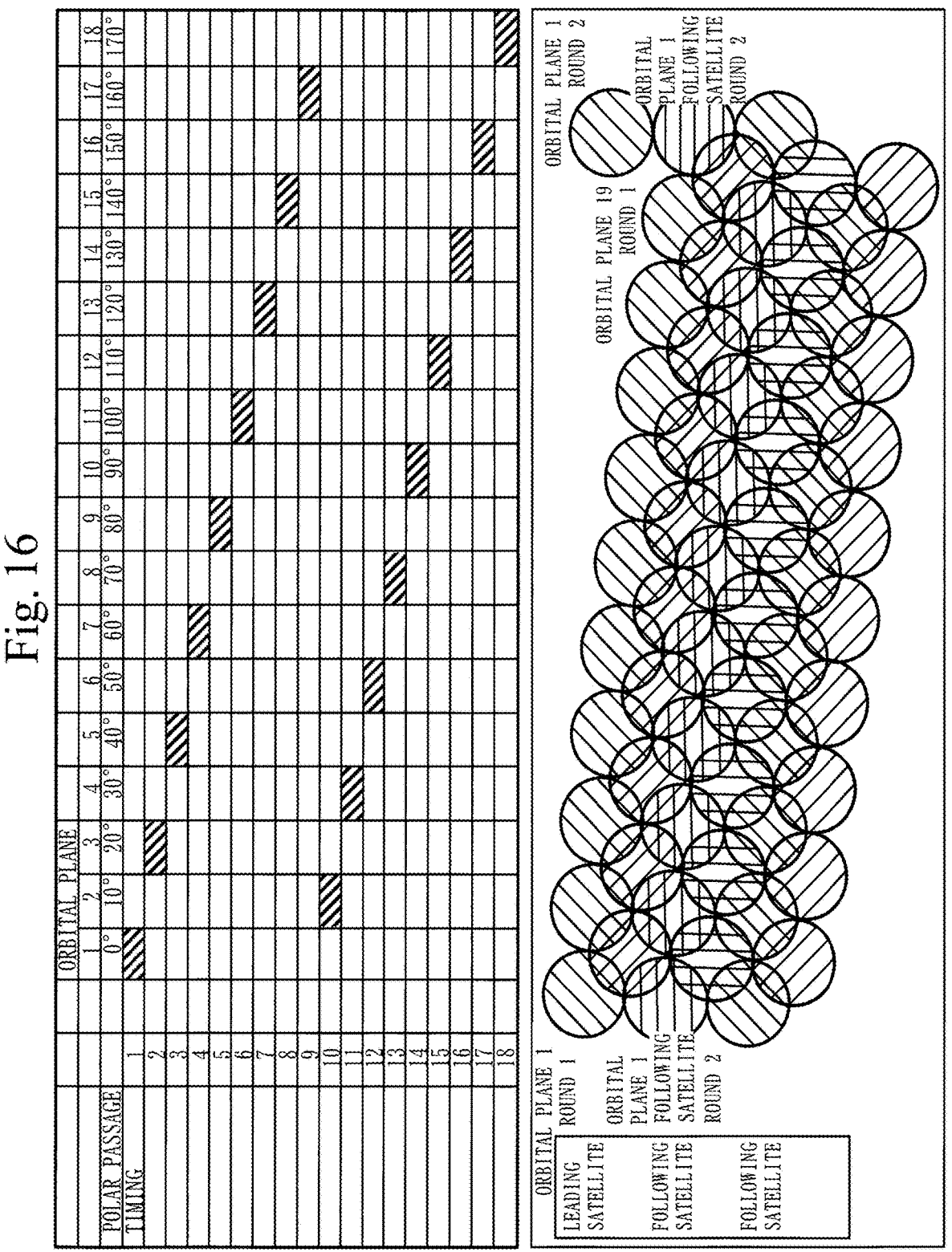
FIG. 16 is a diagram illustrating ground service ranges by a satellite constellation according to Embodiment 7.

FIG. 16 is a diagram illustrating the ground surface service ranges by the satellite constellation 20 according to this embodiment.

FIG. 16 indicates an example in which there are 18 orbital planes and the angel of each orbital plane changes relatively by 10 degrees. As polar passage timings, the wait time until arrival of a following satellite is equally divided by 18, and the passage timings are shifted sequentially from timing 1 on odd-numbered planes and from timing 10 on even-numbered planes. As a result, the ground service ranges are covered alternately by the even-numbered planes and the odd-numbered planes, so that there is an effect that the ground surface can be exhaustively covered.

Figure 17:
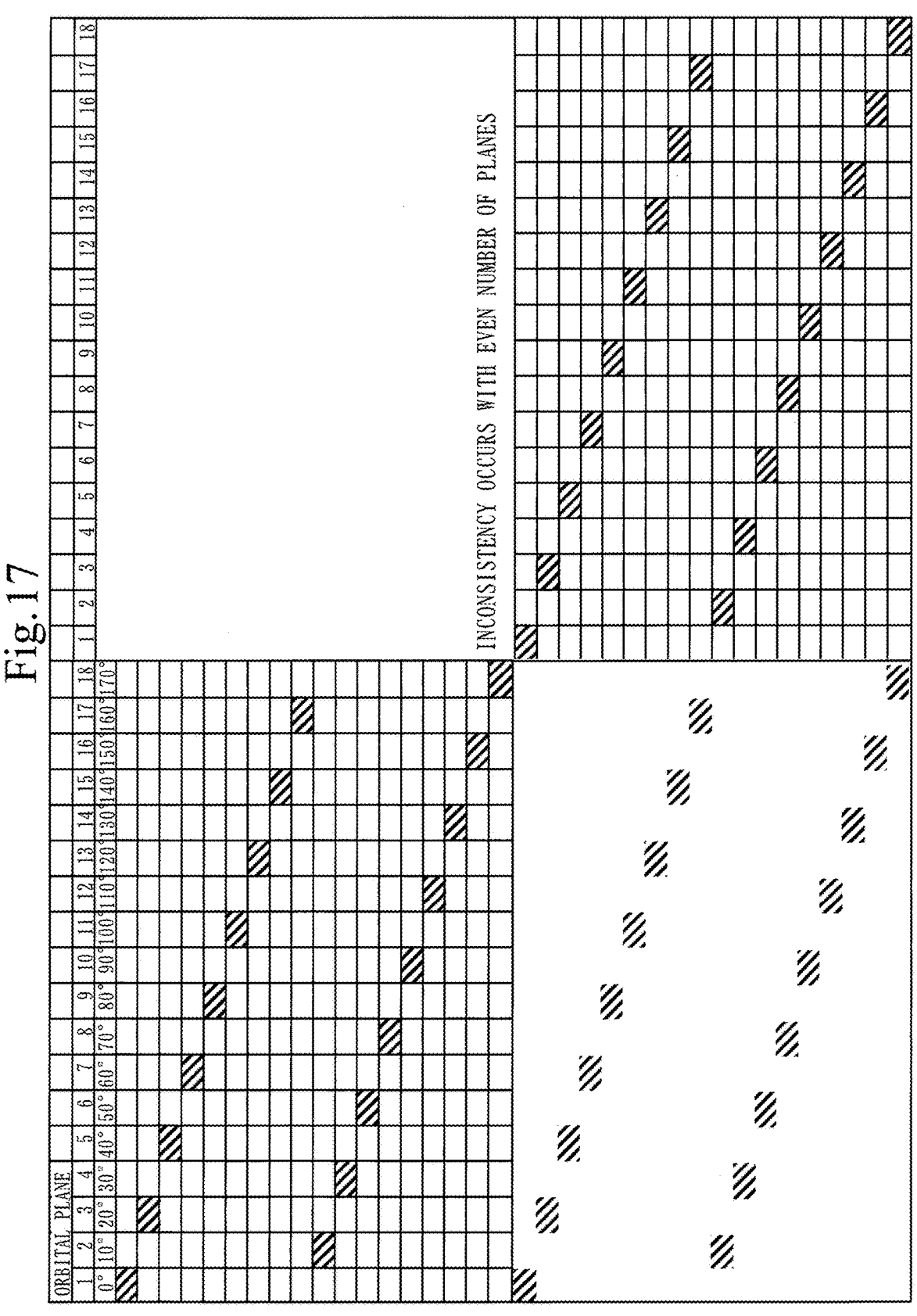
FIG. 17 is a diagram illustrating polar passage timings when there is an even number of orbital planes in a satellite constellation according to Embodiment 7.

FIG. 17 is a diagram illustrating polar passage timings when there is an even number of orbital planes in the satellite constellation 20 according to this embodiment.

Figure 18:
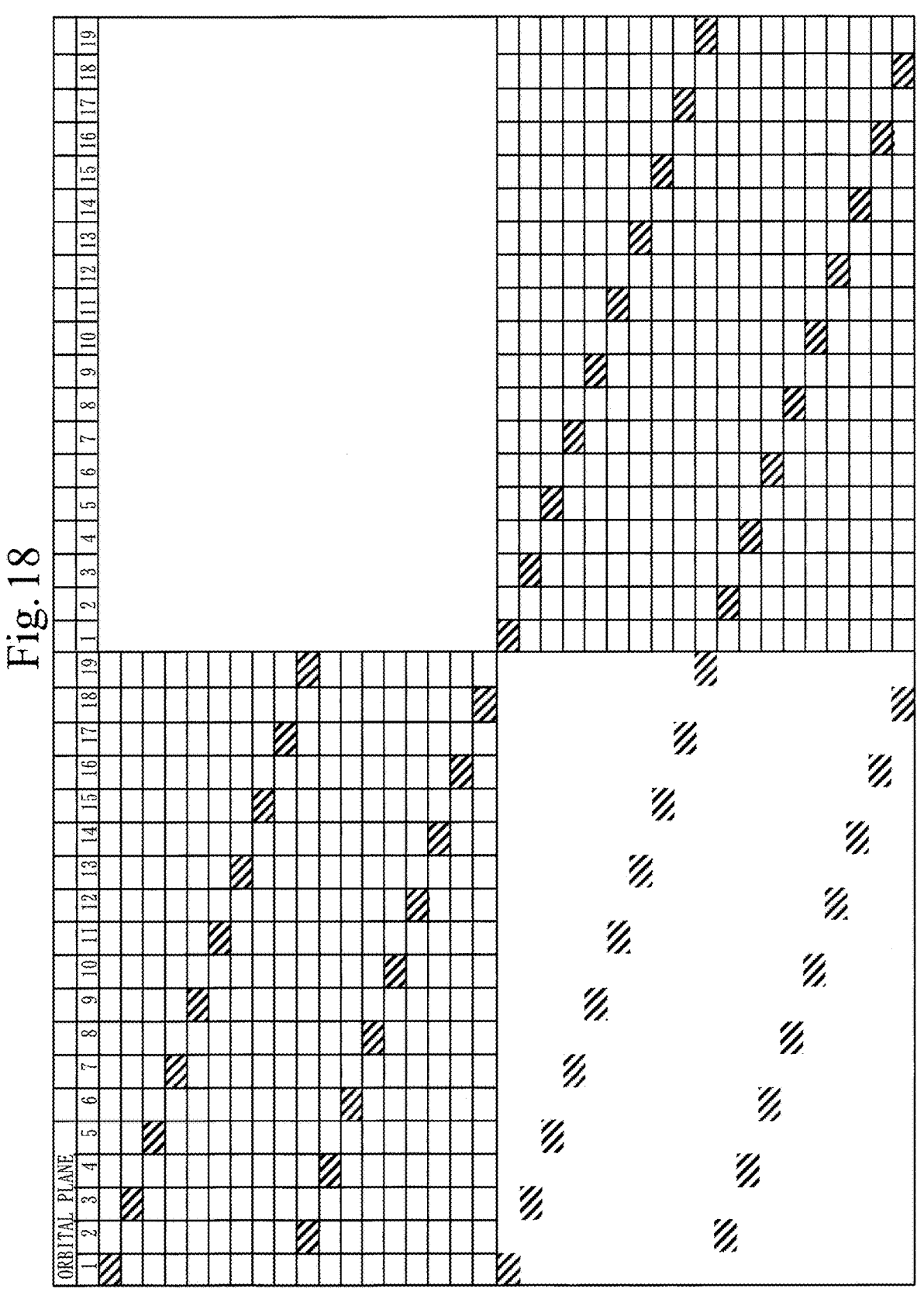
FIG. 18 is a diagram illustrating polar passage timings when there is an odd number of orbital planes in a satellite constellation according to Embodiment 7.

FIG. 18 is a diagram illustrating polar passage timings when there is an odd number of orbital planes in the satellite constellation 20 according to this embodiment.

As indicated in FIGS. 17 and 18, it is desirable in the satellite constellation 20 according to this embodiment that there are an odd number of orbital planes. In the example in FIG. 17, the service area of plane 18 and the service area of its next plane, plane 1, adjoin with each other, and this may cause inconsistency in coverage of the entire globe. Thus, by using an odd number of orbital planes as in FIG. 18, the ground service ranges of the final plane and plane 1 are placed alternately like the others, so that there is an effect that the entire globe can be rationally covered.

Embodiment 8

In this embodiment, additions to Embodiments 1 to 7 will be mainly described. Components that are substantially the same as those in Embodiments 1 to 7 are denoted by the same reference signs, and description thereof may be omitted.

In this embodiment, variations of a debris removal scheme that allows a satellite to deorbit (leave the orbit) while avoiding a collision will be described.

Figure 19:
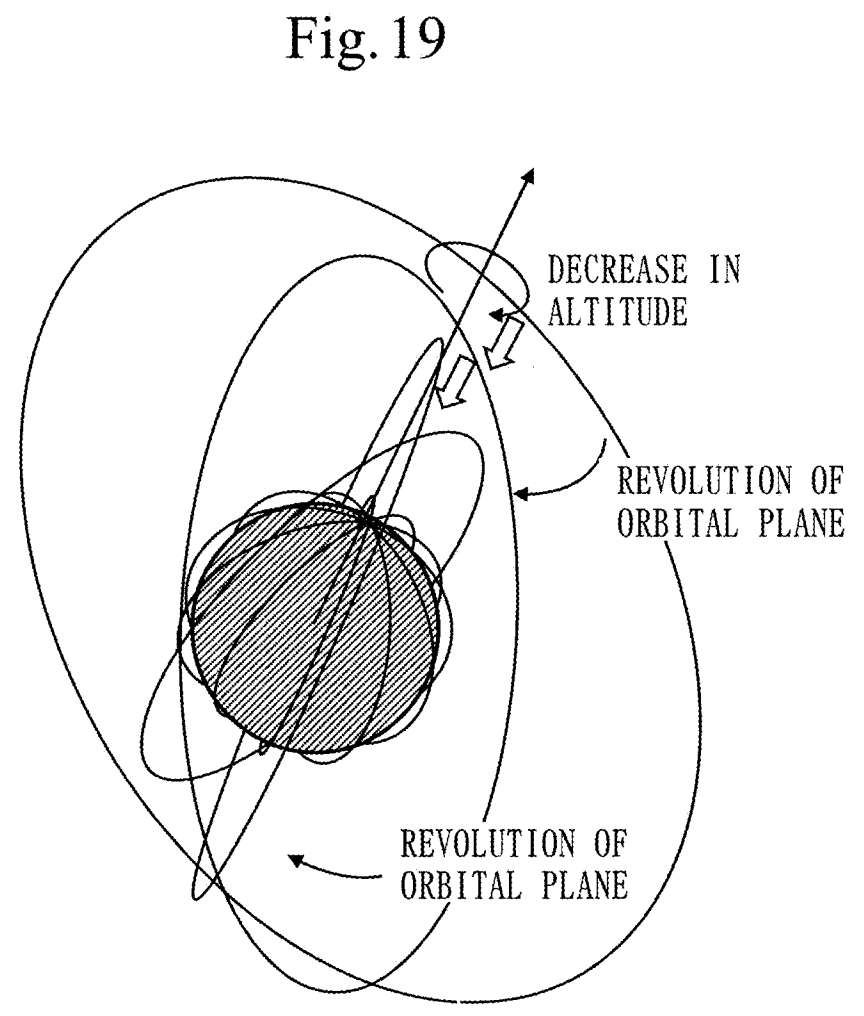

FIG. 19 is a diagram illustrating the concept of deorbit by free fall.

Figure 20:
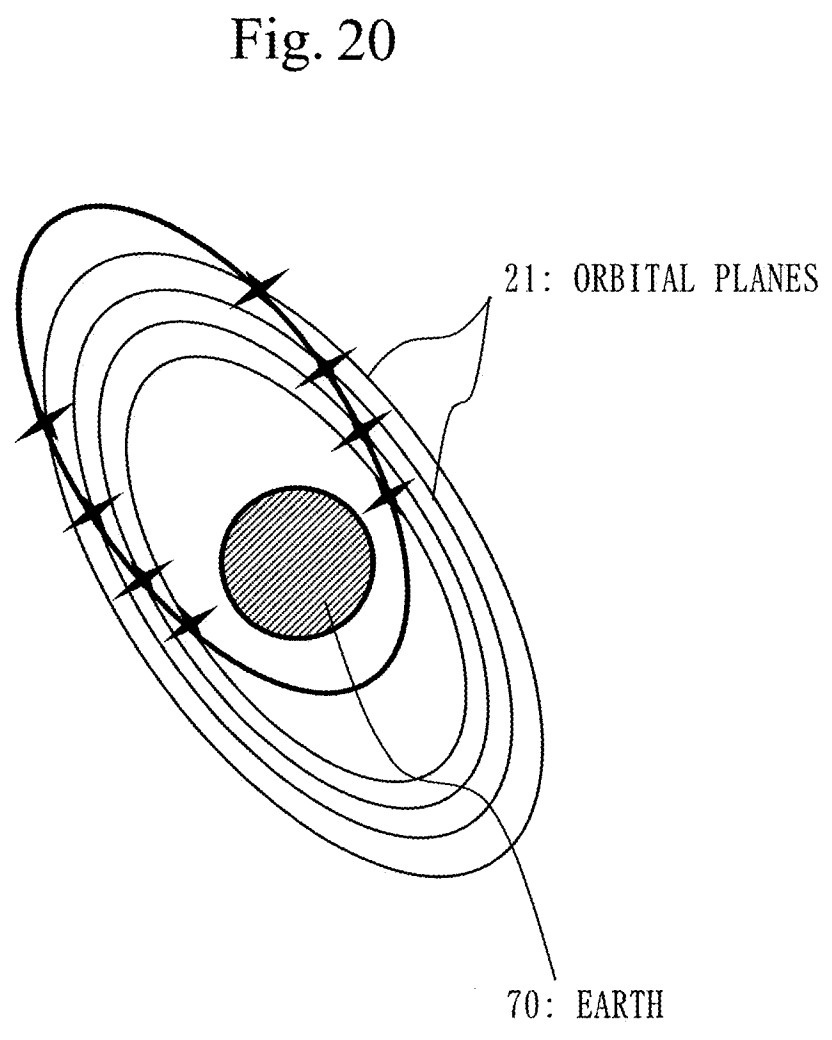

FIG. 20 is a diagram illustrating collision risks when a satellite located above the satellite constellation 20 deorbits.

Example 1 of the Debris Removal Scheme

The debris removal scheme of Example 1 according to this embodiment is provided with a capture device or an external force applying device and a propulsion device for changing the orbital plane of a failed satellite before the failed satellite, which has become uncontrollable due to a failure or the like, descends and passes an orbital plane congested with satellites. The propulsion device propels the failed satellite.

In a sun-synchronous sub-recurrent orbit of about LST 10:00 to LST 11:00, the relationship of the sunlight incidence angle and the orbital plane is suitable for imaging by an Earth observation optical sensor, and is a congested orbital plane in which a large number of Earth observation optical satellites fly. Orbital altitudes of about 500 km and 1000 km, which are suitable for high-resolution imaging and have low atmospheric drag, are congested. However, there is an example in which an ultra-low altitude satellite flies at an orbital altitude of about 200 km.

A satellite included in one of the satellite constellations 20 described in Embodiments 1 to 7 may fail and become uncontrollable. In this case, this failed satellite passes a congested orbital plane while changing the orbital altitude in the process of falling freely from a high altitude such as an orbital altitude between 1000 km and 2000 km, encountering the atmosphere, and disappearing, as indicted in FIG. 19. At that time, as illustrated in FIG. 20, there is a high risk of collision because the failed satellite may encounter satellite groups at a plurality of orbital altitudes. Thus, if the orbital plane is changed in advance by the debris removal scheme according to this embodiment so as to avoid passing a congested orbit, there is an effect that a collision in the congested orbit can be avoided.

Figure 21:
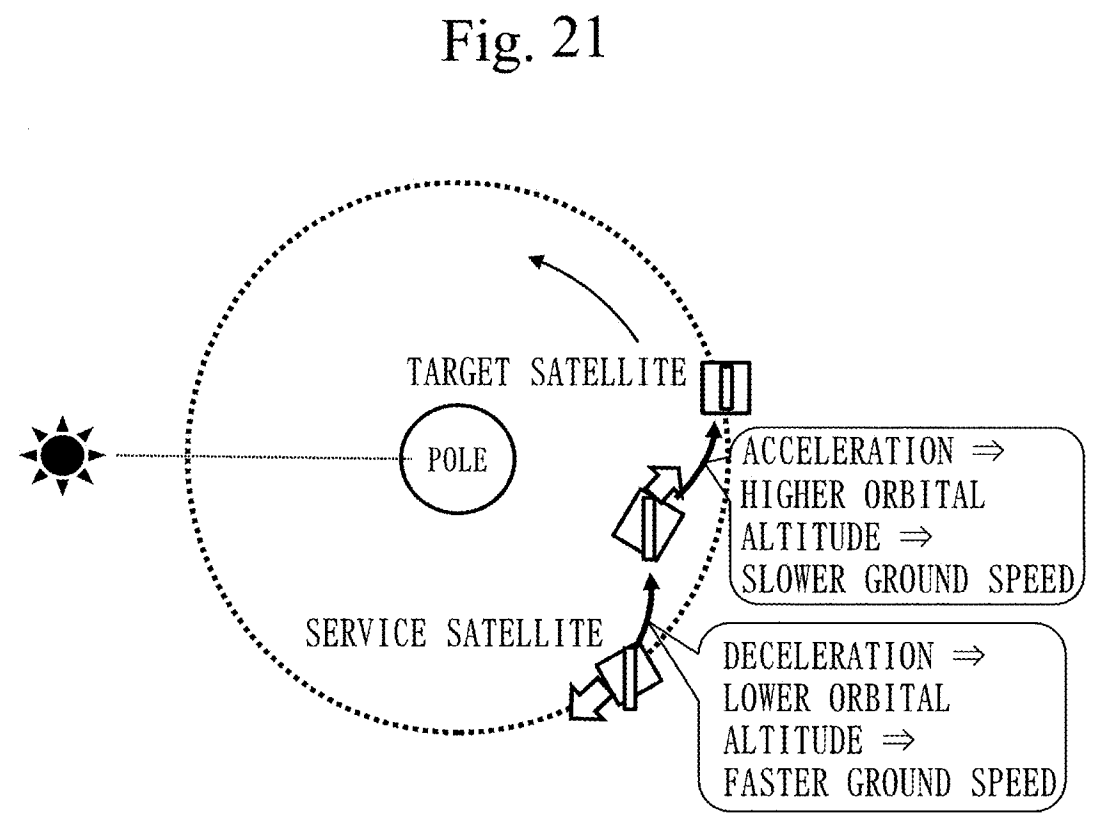

FIG. 21 is a diagram illustrating changes in orbital altitude by acceleration and deceleration of a satellite.

Figure 22:
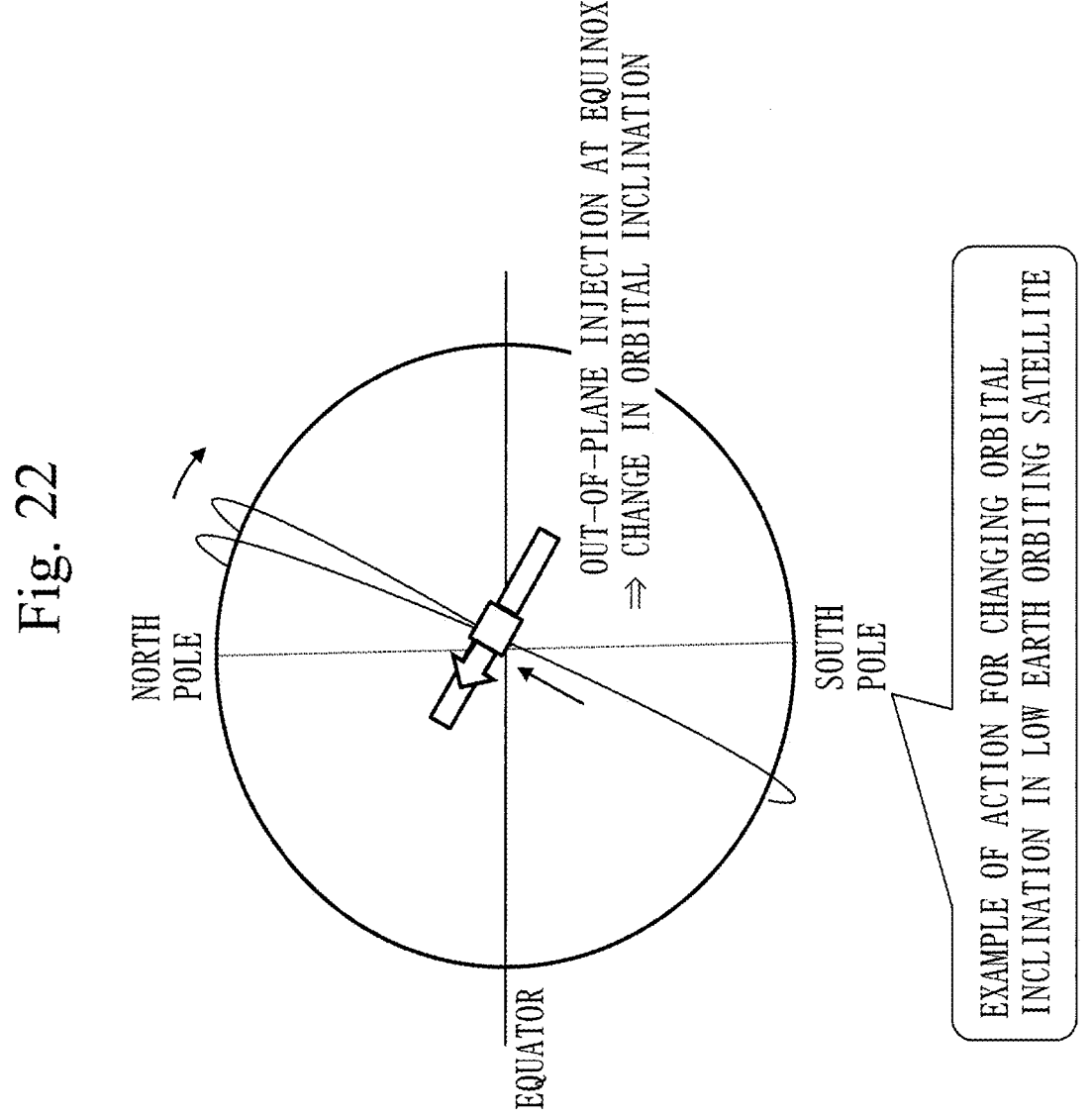
FIG. 22 is a diagram illustrating a change of an orbital inclination by injection from a propulsion device.

FIG. 22 is a diagram illustrating a change of orbital inclination by injection from a propulsion device.

A specific example of the debris removal scheme that is effective is a scheme in which a failed satellite is captured by a debris collection satellite provided with a capture device to capture another satellite and a propulsion device to apply thrust to another satellite, and the orbit is artificially changed by the propulsion device.

Acceleration in the satellite traveling direction causes the orbital altitude to rise temporarily, causing the orbital plane to rotate approximately around the axis of Earth due to perturbation with a different period from that of the congested orbit, so that the congested orbital plane can be avoided. Deceleration in the satellite traveling direction causes the orbital altitude to drop temporarily, causing the orbital plane to rotate approximately around the axis of Earth due to perturbation with a different period from that of the congested orbit, so that the congested orbital plane can be avoided. Depending on the time available until predicted passage of the failed satellite the congested orbit, the collision avoidance method can be selected from descent before encountering the congested orbit and descent after passing the congested orbit. Therefore, there is an effect that a collision can be avoided with certainty. However, a disadvantage of the method relying on perturbation is that the residence time is long. Thus, a method of actively applying injection from a propulsion device so as to rotate the orbital plane in an out-of-plane direction may also be considered. In this case, a large amount of propellant is consumed, resulting in an increased scale of the debris removal scheme, including a propulsion tank.

The collection of a satellite by the satellite itself corresponds to the collection of a so-called cooperative target. Thus, it is effective for the debris collection satellite to be pre-equipped with an attachment that conforms to the debris removal scheme so as to facilitate capture. Another effective method for the debris collection satellite is to send out information to let the position of the satellite itself or the target to be captured be known, so as to facilitate access to or coupling with the satellite itself. However, a case in which the satellite has lost control capability and is rotating or the like is an exception.

Example 2 of the Debris Removal Scheme

The debris removal scheme of Example 2 according to this embodiment is provided with a capture device or an external force applying device and a propulsion device for changing the orbital altitude of an object floating at an altitude between about 100 km to 2000 km while tracing an elliptical orbit before the object passes an orbital plane of a satellite constellation. The propulsion device applies thrust to the object. As to the external force applying device, "external force" may include not only "force" but also "torque" or "change in mass characteristics" due to coupling. The external force applying device is also referred to as a disturbance applying device.

Obstacle removal is a problem in STM. If the orbital plane of an object flying in an elliptical orbit coincides with an orbital plane in which a large number of satellites are flying in approximate circular orbit at a specific orbital altitude, resulting in the object and the satellites flying in the same plane, there is a very high risk of collision. According to the debris removal scheme of Example 2 according to this embodiment, there is an effect that an obstacle with a high collision risk can be safely removed.

A specific example of the debris removal scheme is substantially the same as <Example 1 of the debris removal scheme>. In <Example 1 of the debris removal scheme>, since the satellite captures the satellite itself, the satellite can be pre-equipped with an attachment to facilitate capture, as a so-called cooperative target. However, floating objects other than the satellite itself are so-called non-cooperative targets, and are objects that are difficult to capture, such as an object with a complex shape, a rotating object, a heavy object, and an object not having a structure suitable for being captured. For this reason, the capture device to be provided needs to be sophisticated. As specific examples, a method of holding by a robot, a method of covering the target with a device like a capture net, a method of hooking and dragging with a harpoon-shaped rod to which a wire is attached, and the like can be realized.

Embodiment 9

In this embodiment, differences from or additions to Embodiments 1 to 8 will be mainly described. Components that are substantially the same as those in Embodiments 1 to 8 are denoted by the same reference signs, and description thereof may be omitted.

In this embodiment, variations of a satellite constellation construction scheme will be described, in which the debris removal scheme described in Example 1 or Example 2 of the debris removal scheme of Embodiment 8 is applied to a satellite constellation constructed by the satellite constellation forming system described in Embodiments 1 to 7.

Example 1 of the Satellite Constellation Construction Scheme

In Example 1 of the satellite constellation construction scheme according to this embodiment, orbit insertion is made into an orbital plane that is close to and different from the orbital planes of constituent elements constituting the satellite constellation 20 and at an orbital altitude different from orbital altitudes at which satellites in nearby orbital planes are flying. Then, in Example 1 of the satellite constellation construction scheme, a constituent satellite is added by changing the orbital altitude and the angle of revolution of the orbital plane around the axis of Earth by acceleration or deceleration.

When satellites are launched sequentially to construct a predetermined satellite constellation, there is a high risk of collision in the process of inserting an additional satellite into an orbital plane into which a large number of satellites have been inserted. In Example 1 of the satellite constellation construction scheme according to this embodiment, collision risks at launch can be significantly reduced by inserting a satellite into orbit with an orbital angle slightly shifted from orbital planes into which satellites have been inserted. Furthermore, by approaching a desired orbit gradually from satellite altitudes that do not coincide with altitudes at which satellites have been inserted, collision risks in the transition stage can be reduced.

Example 2 of the Satellite Constellation Construction Scheme

Example 2 of the satellite constellation construction scheme according to this embodiment is provided with a database in which information on orbits, orbital altitudes, the number of satellites, and so on adopted by systems of other countries or similar systems has been collected in advance. In Example 2 of the satellite constellation construction scheme according to this embodiment, orbit insertion is made into an orbital plane that is different from orbital planes in which existing satellites are flying and is close to and different from the orbital planes of constituent elements, and at an orbital altitude different from those at which satellites in nearby orbital planes are flying. In Example 2 of the satellite constellation construction scheme according to this embodiment, a constituent satellite is added by changing the orbital altitude and the angle of revolution of the orbital plane around the axis of Earth by acceleration or deceleration.

According to Example 2 of the satellite constellation construction scheme of this embodiment, there is an effect that a satellite constellation can be constructed without collision risks in an environment in which the entire outer space is congested.

In Example 1 of the satellite constellation construction scheme, a device to process data on the orbit and position of the own satellite is provided on the ground.

In Example 2 of the satellite constellation construction scheme, a device to process data on the orbit and position of a flying object in outer space is provided on the ground.

Embodiment 10

In this embodiment, additions to Embodiments 1 to 9 will be mainly described. Components that are substantially the same as those in Embodiments 1 to 9 are denoted by the same reference signs, and description thereof may be omitted.

In this embodiment, variations of a ground facility 500 to transmit an orbit control command 51 to a satellite 30 that is included in a satellite constellation 20 and has reached the end of design life will be described. The orbit control command 51 is a command that causes the satellite 30 to deorbit by operating a propulsion device provided in the satellite 30.

Example 1 of the Ground Facility 500

FIG. 23 is a diagram illustrating a configuration of Example 1 of the ground facility 500 according to this embodiment.

The configuration of Example 1 of the ground facility 500 is substantially the same as Embodiment 10.

A communication device 950 transmits and receives signals for tracking and controlling a satellite 30 included in the satellite constellation 20.

An orbit control command transmission unit 510 transmits the orbit control command 51 to the satellite 30 to be deorbited because it has reached the end of design life or for another reason.

An analytical prediction unit 520 analytically predicts an orbit where the satellite 30 after receiving a deorbit command will pass.

As a specific example, a case in which the analytical prediction unit 520 has determined that the satellite 30 will pass an orbital plane of about LST 10:30 in a congested orbit in sun-synchronous orbit at an orbital altitude of between 500 km and 800 km will be described. In this case, the orbit control command transmission unit 510 transmits to the satellite 30 the orbit control command 51 to perform an active deorbit operation to avoid a collision risk by shifting the congested orbit passage timing or the orbital plane. Upon receiving the orbit control command 51, the satellite 30 raises or lowers the orbital altitude by accelerating or decelerating the satellite speed by an orbit control device provided in the satellite 30. Alternatively, the satellite 30 changes the orbital inclination by applying acceleration in the out-of-plane direction of the orbital plane by injection from a propulsor in a direction approximately perpendicular to the satellite traveling direction. In this way, the satellite 30 performs the active deorbit operation to avoid a collision risk by shifting the congested orbit passage timing or the orbital plane.

In the construction of a mega-constellation, as a measure to prevent the total amount of debris in outer space from increasing without any restriction, the need to make post-mission disposal (PMD) mandatory so as to deorbit 99% or more of satellites has been discussed. In addition, as the probability that a satellite will remain operational at end of life should be considered, the need for active debris removal (ADR) to deorbit a satellite that cannot autonomously deorbit as a result of losing functionality at end of life or due to a failure has also been debated.

However, PMD or ADR addresses only the need for a method for burning up in the atmosphere by free fall, and provides no countermeasure for passing a congested orbit during fall. In geostationary orbit satellites, there is a case in which when a debris collision risk is foreseen, predicted debris orbit information is published together with a collision warning, and a potential collision-victim satellite takes a collision avoidance action. However, with low-Earth orbiting satellites, if another satellite constellation is constructed, there is a high risk that the avoidance action of a potential collision-victim satellite may cause a secondary collision. That is, the risk is that of a collision with a preceding or following satellite among satellites arranged in file, a collision with a satellite group at a different altitude in the same plane, or the like.

If there is a high possibility that a large number of potential collision-victim satellites pass the area in a short period of time and a plurality of satellites concurrently take the avoidance action, it will be difficult to predict the behavior of nearby satellites and a derivative collision risk will occur.

There is also a risk that as a result of the avoidance action, not only the orbital altitude and the phase in the orbital plane but also LST may shift due to revolution of the orbital plane, making recovery difficult or hindering continuation of the intended service of the satellite.

Furthermore, there may be a case in which a large number of satellites such as CubeSat, which is an experimental satellite without an avoidance function, are flying.

There may also be a case in which if a free fall involves a low orbit prediction accuracy, the area and time period in which a collision warning needs to be issued is widened and collision warnings are issued frequently to potential collision-victim satellites, making it impossible to respond.

According to Example 1 of the ground facility 500 of this embodiment, orbit control during a fall is possible even during altitude descent due to deorbit, so that there is an effect that passing a congested orbits can be avoided and a collision can be avoided. There is also an effect that a collision can be avoided without any avoidance action by a potential collision-victim satellite.

Example 2 of the Ground Facility 500

In Example 2 of the ground facility 500 of this embodiment, a capture command 52 and an orbit control command 51 to cause a debris collection satellite 31 to deorbit a failed satellite that has lost the orbit control function are transmitted to the debris collection satellite 31. The debris collection satellite 31 is a satellite provided with a device to collect a satellite that has lost the orbit control function due to a failure, for example. The debris collection satellite 31 includes a capture device to capture a failed satellite and a propulsion device.

Example 2 of the ground facility 500 transmits to the debris collection satellite 31 the capture command 52 and the orbit control command 51 to cause a failed satellite to deorbit by operating the capture device and the propulsion device provided in the debris collection satellite.

The communication device 950 transmits and receives signals for tracking and controlling the debris collection satellite.

The orbit control command transmission unit 510 transmits the orbit control command 51 or the capture command 52.

The analytical prediction unit 520 analytically predicts an orbit where the debris collection satellite that has captured a failed satellite will pass.

As a specific example, a case in which the analytical prediction unit 520 has determined that the debris collection satellite 31 will pass an orbital plane of about LST 10:30 in a congested orbit in sun-synchronous orbit at an orbital altitude of between 500 km to 800 km will be described. In this case, the orbit control command transmission unit 510 transmits to the debris collection satellite 31 the orbit control command 51 to perform the active deorbit operation to avoid a collision risk by shifting the congested orbit passage timing or the orbital plane. Upon receiving the orbit control command 51, the debris collection satellite 31 raises or lowers the orbital altitude by accelerating or decelerating the satellite by an orbit control device provided in the satellite 30. Alternatively, the satellite 30 changes the orbital inclination by applying acceleration in the out-of-phase direction of the orbital plane by injection from a propulsor in a direction approximately perpendicular to the satellite traveling direction. The debris collection satellite 31 performs the active deorbit operation to avoid a collision risk by shifting the congested orbit passage timing or the orbital plane, as described above.

According to Example 2 of the ground facility 500 of this embodiment, a constituent satellite of a satellite constellation is pre-equipped with a device such as a capture attachment of the debris collection satellite. Therefore, Example 2 of the ground facility 500 according to this embodiment is effective for collecting a constituent element of a satellite constellation.

Example 3 of the Ground Facility 500

In Example 3 of the ground facility 500 according to this embodiment, the communication device 950 transmits and receives signals for tracking and controlling a debris collection satellite equipped with a device to collect rocket debris flying above a congested orbit at an orbital altitude of 800 km or more.

The orbit control command transmission unit 510 transmits to the debris collection satellite a capture command and an orbit control command to deorbit rocket debris by operating a capture device and a propulsion device provided in the debris collection satellite.

The analytical prediction unit 520 analytically predicts an orbit where the debris collection satellite that has captured rocket debris will pass.

As a specific example, a case in which the analytical prediction unit 520 has determined that the debris collection satellite will pass an orbital plane of about LST 10:30 of a congested orbit in sun-synchronous orbit at an orbital altitude of between 500 km and 800 km will be described.

In Example 3 of the ground facility 500 according to this embodiment, the orbital inclination is changed by raising or lowering the orbital altitude by accelerating or decelerating the satellite by the orbit control device provided in the satellite, or by applying acceleration in the out-of-orbit direction of the orbital plane by injection from a propulsor in a direction approximately perpendicular to the satellite traveling direction. In Example 3 of the ground facility 500 according to this embodiment, the active deorbit operation to avoid a collision risk by shifting the congested orbit passage timing or the orbital plane is performed.

Rocket debris is not normally equipped with a capture attachment of the debris collection satellite and is difficult to capture as it may spin in the orbit, so that the technical difficulty is higher than in Example 2 of the ground facility 500. In Example 3 of the ground facility 500 according to this embodiment, the capture device may use a method of wrapping with a net-like object like net casting, a method of hooking and dragging with a harpoon-shaped rod to which a wire is attached, or a method of adhering tightly to the outer surface of the target to be captured with an adhesive substance or an adhesive. Even in deorbit of a constituent satellite of a satellite constellation equipped with a capture attachment, if the satellite is made to fall freely without attitude control, the attitude will become unstable, so it is highly likely that the debris collection satellite cannot easily access the capture attachment. In such a case, the capture device of Example 3 of the ground facility 500 according to this embodiment is effective.

Example 4 of the Ground Facility 500

A case in which, as described in Examples 1 and 3 of the ground facility 500, during descent in deorbit of a satellite or deorbit due to debris collection, the analytical prediction unit 520 has determined that the satellite will pass a congested area in the polar region of another satellite constellation constructed at a low altitude will be described.

In Example 4 of the ground facility 500, the orbital inclination is changed by applying acceleration in the out-of-plane direction of the orbital plane by injection from a propulsor in a direction approximately perpendicular to the satellite traveling direction, so as to make the orbital inclination different from that of the other satellite constellation. In this way, Example 4 of the ground facility 500 performs the active deorbit operation to avoid a collision risk by changing the inclination of the orbital plane to be different from that of a congested orbit or shifting the passage timing.

In Examples 1 to 3 of the ground facility 500, it is possible to avoid not only a collision in a congested orbit of about LST 10:30 but also a collision when passing a congested area in the polar region.

Examples 1 to 4 of the ground facility 500 above may be implemented in any combination. For example, the following ground facilities may be implemented.

The ground facility includes a communication device to transmit and receive signals for tracking and controlling a satellite included in a satellite constellation, an orbit control command transmission unit to transmit an orbit control command, and an analytical prediction unit to analytically predict an orbit where the satellite that has received the deorbit command will pass. The ground facility transmits the orbit control command to cause the satellite that has reached the end of design life to deorbit by operating a propulsion device provided in the satellite.

When it is determined by analytical prediction that during descent in deorbit of the satellite or deorbit due to debris collection, the satellite will pass a congested area in the polar region or a congested orbital plane of another satellite constellation constructed at a low altitude, the ground facility performs the active deorbit operation to avoid a collision risk. Specifically, the ground facility performs the active deorbit operation to avoid a collision risk by changing the inclination of the orbital plane to be different from that of a congested orbit or shifting the passage timing by applying acceleration in the out-of-plane direction of the orbital plane by injection from a propulsor in a direction approximately perpendicular to the satellite traveling direction so that the orbital inclination becomes different from that of the other satellite constellation.

The ground facility includes a communication device to transmit and receive signals to track and control a debris collection satellite provided with a device to collect a satellite that has failed and lost an orbit control function, an orbit control command transmission unit, and an analytical prediction unit to analytically predict an orbit where the debris collection satellite that has captured rocket debris will pass. The ground facility transmits to the debris collection satellite a capture command and an orbit control command to cause the failed satellite to deorbit by operating a capture device and a propulsion device provided in the debris collection satellite.

When it has been determined by analytical prediction that during descent in deorbit of a satellite or deorbit due to debris collection, the satellite will pass a congested area in the polar region or a congested orbital plane of another constellation constructed at a low altitude, the ground facility performs the active deorbit operation to avoid a collision risk. Specifically, the ground facility performs the active deorbit operation to avoid a collision risk by changing the inclination of the orbital plane to be different from that of a congested orbit or shifting the passage timing by changing the orbital inclination by applying acceleration in the out-of-phase direction of the orbital plane by injection from a propulsor in a direction approximately perpendicular to the satellite traveling direction so that the orbital inclination becomes different from that of the other satellite constellation.

The ground facility includes a communication device to transmit and receive signals for tracking and controlling a debris collection satellite provided with a device to collect rocket debris flying above a congested orbit at an orbital altitude of 800 km or higher, an orbit control command transmission unit, and an analytical prediction unit to analytically predict an orbit where the debris collection satellite that has captured rocket debris will pass. The ground facility transmits to the debris collection satellite a capture command and an orbit control command to cause the rocket debris to deorbit by operating a capture device and a propulsion device provided in the debris collection satellite.

When it has been determined by analytical prediction that during descent in deorbit of a satellite or deorbit due to debris collection, the satellite will pass a congested area in the polar region or a congested orbital plane of another satellite constellation constructed at a low altitude, the ground facility performs the active deorbit operation to avoid a collision risk. Specifically, the ground facility performs the active deorbit operation to avoid a collision risk by changing the inclination of the orbital plane to be different from that of a congested orbit or shifting the passage timing by changing the orbital inclination by applying acceleration in the out-of-phase direction of the orbital plane by injection from a propulsor in a direction approximately perpendicular to the satellite traveling direction so that the orbital inclination becomes different from that of the other satellite constellation.

The effects of this embodiment will be described further.

A commonly-used method for deorbiting a low Earth orbit satellite is to operate a propulsor in a direction opposite to the satellite traveling direction to lower the orbital altitude and cause the satellite to burn up upon entry into the atmosphere. However, a mega satellite constellation being planned in recent years has an orbital altitude of 1000 km or more which is higher than a low Earth orbiting satellite, so that there is a risk of collision with a satellite flying at a lower orbital altitude during deorbit at end of life or due to a failure.

In a mega satellite constellation, orbital planes are arranged in various ways and a large number of satellites fly in file in each orbital plane, so that there are a wide variety of orbital routes where a deorbiting satellite passes. In particular, the probability of collision is high when there is a possibility of passing an area congested with low Earth orbit satellites, such as about LST 10:30 of sun-synchronous orbit or the polar region.

If deorbit depends on free fall, the orbital plane will rotate as the altitude is gradually lowered, so that a satellite deorbiting from any orbital plane may pass an orbit congested with sun-synchronous satellites.

If a satellite in a satellite constellation composed of orbital planes with an orbital inclination of approximately 90 degrees passing the vicinity of the polar regions is to be deorbited, the orbital inclination remains approximately the same even when the orbital altitude is lowered, so that the probability of collision with a polar orbit satellite at a lower altitude is high.

In this embodiment, in order to avoid passing a congested orbital plane, the revolution of the orbital plane is used to fall earlier before passing the congested orbit could happen or, contrarily, to fall through a non-congested orbital plane after the congested orbital plane has passed by, so as to avoid a collision. As a method for changing the timing of passing the congested orbital plane, accelerating the satellite to be deorbited raises the orbital altitude, so that the timing of fall can be delayed. Decelerating the satellite to be deorbited lowers the orbital altitude, so that the timing of fall can be advanced. The orbital plane rotates due to perturbation depending on the residence time at the orbital altitude, so that it is possible to wait until the congested orbit passes by. The orbital inclination can be changed by operating the propulsor in a direction perpendicular to the traveling direction when the satellite to be deorbited passes the ascending node or the descending node, so that the revolution of the orbital plane can also be accelerated.

In particular, in Example 4 of the ground facility 500, a collision is avoided by changing the orbital plane so as not to pass the polar region at an altitude that is congested in the polar region by intentionally changing the orbital inclination. As a method for changing the orbital inclination, the orbital inclination can be changed effectively by operating the propulsor in a direction perpendicular to the traveling direction when the satellite to be deorbited passes the ascending node or the descending node.

The effects of Embodiments 1 to 10 will be described further

In recent years, plans for a large-scale satellite constellation of thousands of satellites have been announced, but satellites flying at the same altitude have a risk of colliding with each other at two points where the satellite altitudes meet on a line of intersection between the orbital planes. In a large-scale constellation, the probability of collision is very high especially in the polar regions where all orbital planes meet with high probability.

As an example of a large number of satellites flying in the same orbital plane, geostationary orbit satellites flying above the equator at an orbital altitude of about 36000 km are famous, and about 300 satellites are flying in the same orbital plane. Since these satellites are in synchronization with the revolution of Earth, they seem to be stationary when seen from the ground, but they are flying in an approximately circular orbit at the same altitude. Thus, the geostationary orbit satellites continue to operate without colliding with each other. Two satellites in orbit are sufficiently spaced apart, although the angles are only about 1 or 2 degrees apart when seen from Earth and seem to be in close proximity.

In contrast, in low-Earth orbiting satellite constellations which are increasing in number in recent years, a single constellation has several thousand satellites and a plan with multiple satellite constellations has a total of nearly one million satellites. The orbital altitude is as low as $\frac{1}{20}$ to $\frac{1}{100}$ of that of geostationary satellites and the spacing between two satellites is also very small, so that the risk of collision is high in comparison with geostationary orbits.

Unlike geostationary orbits, different orbital planes are used simultaneously, so that there is a possibility of collision at intersection lines between two planes. In a satellite constellation with an orbital inclination of about 90 degrees, a plurality of orbital planes intersect near the axis of revolution of Earth and all satellites pass over the South and North Poles, so that there is a high possibility of collision if the orbital altitudes match.

Sun-synchronous orbits of LST 10:00 to 11:00, which are often used by Earth observation satellites, have many orbital planes congested with satellites, so that there is a high risk of collision if an object whose orbital altitude changes gradually intrudes into the same orbital plane.

In a completed satellite constellation, no collision occurs between any two satellites unless the position coordinates and time points match simultaneously, (x1, y1, z1, t1)=(x2, y2, z2, t2). Therefore, a collision can be avoided by artificially manipulating the orbital altitude, timing, phase in the orbital plane, or the like. However, in the transitional stage of constructing a satellite constellation, there is a high risk of collision in the process of adding a new satellite to the constellation.

In a case in which a satellite flying at a higher altitude than many satellite constellations falls freely due to an uncontrollable failure, if the satellite passes a congested orbital plane while changing the altitude, the satellite may encounter satellite groups at a plurality of orbital altitudes in the same orbital plane, so that there is a high risk of collision.

Even if the collision probability as an absolute value is still sufficiently small because outer space is vast, once a collision occurs, large-scale destruction may occur and a large number of scattered remains, as so-called debris, may collide again with a satellite flying in the vicinity, causing secondary damage. In the worst case, there is a concern that the entirety of a nearby orbit may be violated due to a chain reaction of collisions and destruction.

If the entirety of a nearby orbit is violated, causing a large number of pieces of debris to float, there is a risk that any satellite cannot be operated for a long period of time, adversely affecting various aspects of social life, which is increasingly dependent on space infrastructure.

The cost of a satellite itself is high, and the total costs for launch by a rocket and operation are huge, so that an occurrence of a collision will lead to a huge amount of economic loss.

Since a purpose such as a communication service, for example, is realized by cooperation of a plurality of satellites, a loss of a satellite due to a collision will lead to suspension or quality degradation in the intended service.

Embodiments 1 to 10 above provide techniques such as combining orbital planes having different altitudes, a scheme for artificially shifting intersection passage time points, a scheme for removing a failed satellite, and a scheme for launching a new satellite inro orbit, so that a collision in a satellite constellation can be avoided.

Embodiment 11

In this embodiment, additions to Embodiments 1 to 10 will be mainly described. Components that are substantially the same as those in Embodiments 1 to 10 are denoted by the same reference signs, and description thereof may be omitted.

As described in Embodiment 1, the satellite constellation forming system 100 forms a satellite constellation 20 that is composed of a satellite group 300 and provides a service through cooperation of the satellite group 300. The satellite constellation forming system 100 forms a satellite constellation 20 having a plurality of orbital planes in which a plurality of satellites fly at the same orbital altitude in each orbital plane 21.

The satellite constellation forming unit 110 according to this embodiment forms a satellite constellation 20 in which the orbital planes of the orbital planes 21 are mutually different, and each orbital plane has an orbital inclination such that the orbital periods of the orbital planes 21 are equal to each other. For example, each of the orbital planes is a sun-synchronous orbit as illustrated in FIG. 11.

In the satellite constellation forming system 100, parameters are set so that the orbital altitudes of the orbital planes 21 of the satellite constellation 20 are mutually different, and each orbital plan has an orbital inclination such that the orbital periods of the orbital planes 21 are equal to each other.

Using the set parameters, the satellite constellation forming unit 110 forms the satellite constellation 20 in which the orbital altitudes of the orbital planes 21 are mutually different, and each orbital plane has an orbital inclination such that the orbital periods of the orbital planes 21 are equal to each other.

Figure 25:
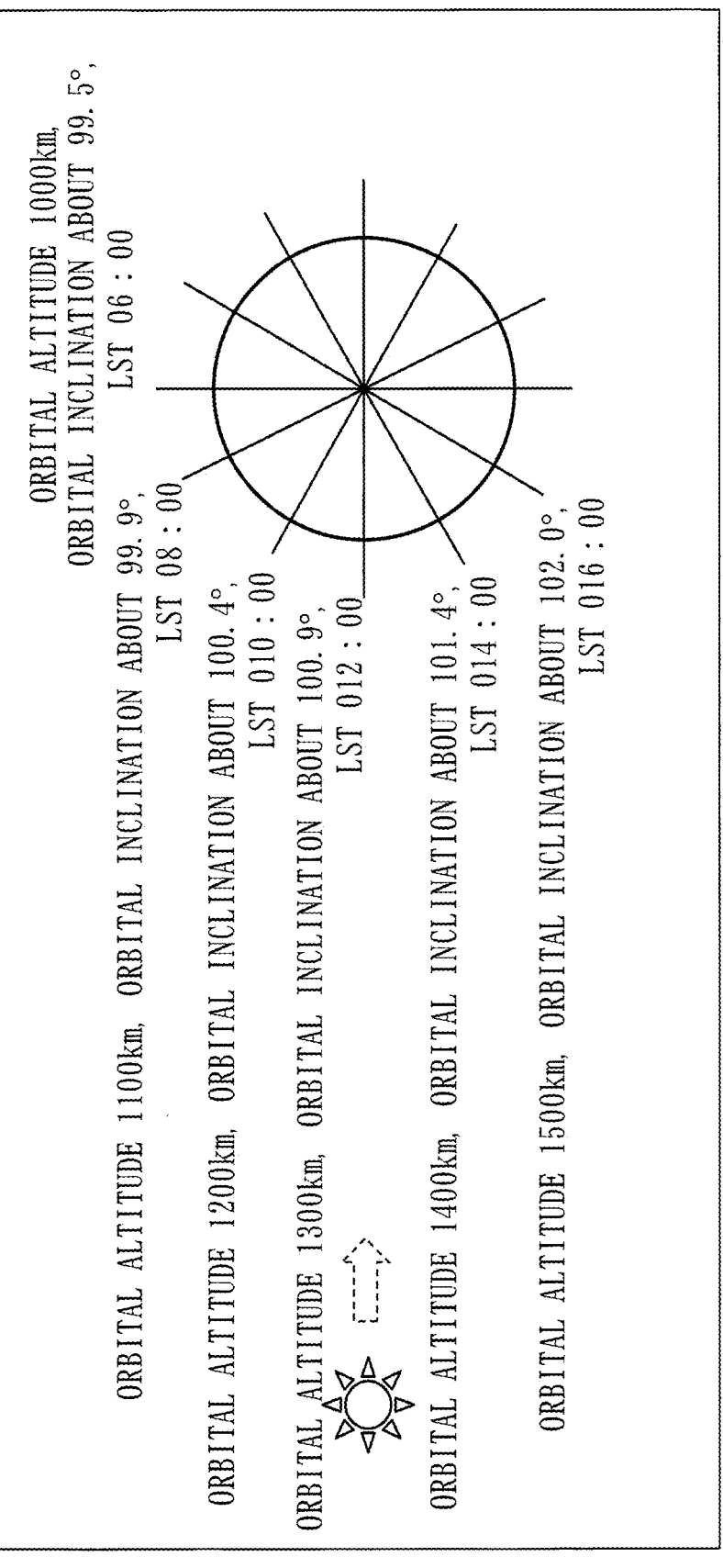
FIG. 25 is a schematic diagram illustrating a specific example of a satellite constellation 20 according to Embodiment 11.

FIG. 25 is a schematic diagram illustrating a specific example of the satellite constellation 20 according to this embodiment.

Sun-synchronous orbital planes have equal orbital periods even when their orbital altitudes are different. An example of orbital planes that have different orbital altitudes and are sun-synchronous orbits is indicated below. The constraints for sun-synchronization are generally determined by the correlation between the orbital altitude and the orbital inclination, so that a sun-synchronous orbit can be formed by appropriately setting the orbital inclination depending on the orbital altitude.

Orbital altitude 1000 km: orbital inclination about 99.5°
Orbital altitude 1100 km: orbital inclination about 99.9°
Orbital altitude 1200 km: orbital inclination about 100.4°
Orbital altitude 1300 km: orbital inclination about 100.9°
Orbital altitude 1400 km: orbital inclination about 101.4°
Orbital altitude 1500 km: orbital inclination about 102.0°

For example, by setting orbital planes of the above six types of orbital altitudes with LSTs as indicated below, a group of orbital planes having angles mutually different by approximately 30 degrees each is formed, and the relative angles between the orbital planes are always maintained. That is, six orbital planes whose orbital periods are equal are formed.

Sun-synchronous orbital plane at orbital altitude 1000 km: LST 06:00
Sun-synchronous orbital plane at orbital altitude 1100 km: LST 08:00
Sun-synchronous orbital plane at orbital altitude 1200 km: LST 10:00
Sun-synchronous orbital plane at orbital altitude 1300 km: LST 12:00
Sun-synchronous orbital plane at orbital altitude 1400 km: LST 14:00
Sun-synchronous orbital plane at orbital altitude 1500 km: LST 16:00

Sun-synchronous orbits are presented here as a typical example of achieving equal orbital periods. However, a plurality of orbital altitudes with equal orbital periods can also be similarly selected from orbits that are not sun-synchronous.

The satellite constellation forming unit 110 may form a satellite constellation 20 in which the orbital altitudes of orbital planes 21 are mutually different, and each orbital plane has an orbital inclination such that the revolutions of the orbital planes 21 are in synchronization with each other.

Next, the ground facility 500 that tracks and controls the satellite constellation 20 constructed by the satellite constellation forming system 100 according to this embodiment will be described.

The ground facility 500 according to this embodiment generates commands to adjust the altitude of each satellite so as to maintain the relative phases of a plurality of satellites in each orbital plane of a plurality of orbital planes, and to adjust the orbital altitude and orbital inclination of each orbital plane so as to maintain the relative angles between the plurality of orbital planes, and transmits the commands to each satellite in a satellite group.

Example 5 of the Ground Facility 500

FIG. 23 is a diagram illustrating a configuration of Example 5 of the ground facility 500, which is the ground facility 500 according to this embodiment.

The configuration of Example 5 of the ground facility 500 is substantially the same as that of Example 1 of the ground facility 500 of Embodiment 10.

The communication device 950 transmits and receives signals for tracking and controlling a satellite 30 included in the satellite constellation 20.

The orbit control command transmission unit 510 transmits to the satellites 30 the orbit control command 51 to adjust the altitude of each satellite so as to maintain the relative phases of a plurality of satellites in each orbital plane of a plurality of orbital planes and adjusting the orbital altitude and orbital inclination of each orbital plane so as to maintain the relative angles between the orbital planes.

Description of Effects of this Embodiment

The orbital periods of orbital planes having different orbital altitudes and equal orbital inclinations are different from each other. For this reason, the relative angle between the orbital planes changes during long-term operation. As a result, when a service is implemented by a plurality of satellites in cooperation, the arrangement of the satellites may change, which may hinder the service. When the orbital planes are adjusted using a propulsor separately in order to maintain an appropriate arrangement of orbits, it may not be possible to continue the service while adjustments are being carried out.

With the satellite constellation forming system according to this embodiment, the relative relationship of the orbital planes is maintained, so that a collision risk can be avoided while a service is being provided continuously without any problem.

Embodiment 12

In this embodiment, additions to or differences from Embodiments 1 to 11 will be mainly described. Components that are substantially the same as those in Embodiments 1 to 11 are denoted by the same reference signs, and description thereof may be omitted.

Description of Configuration

Figure 26:
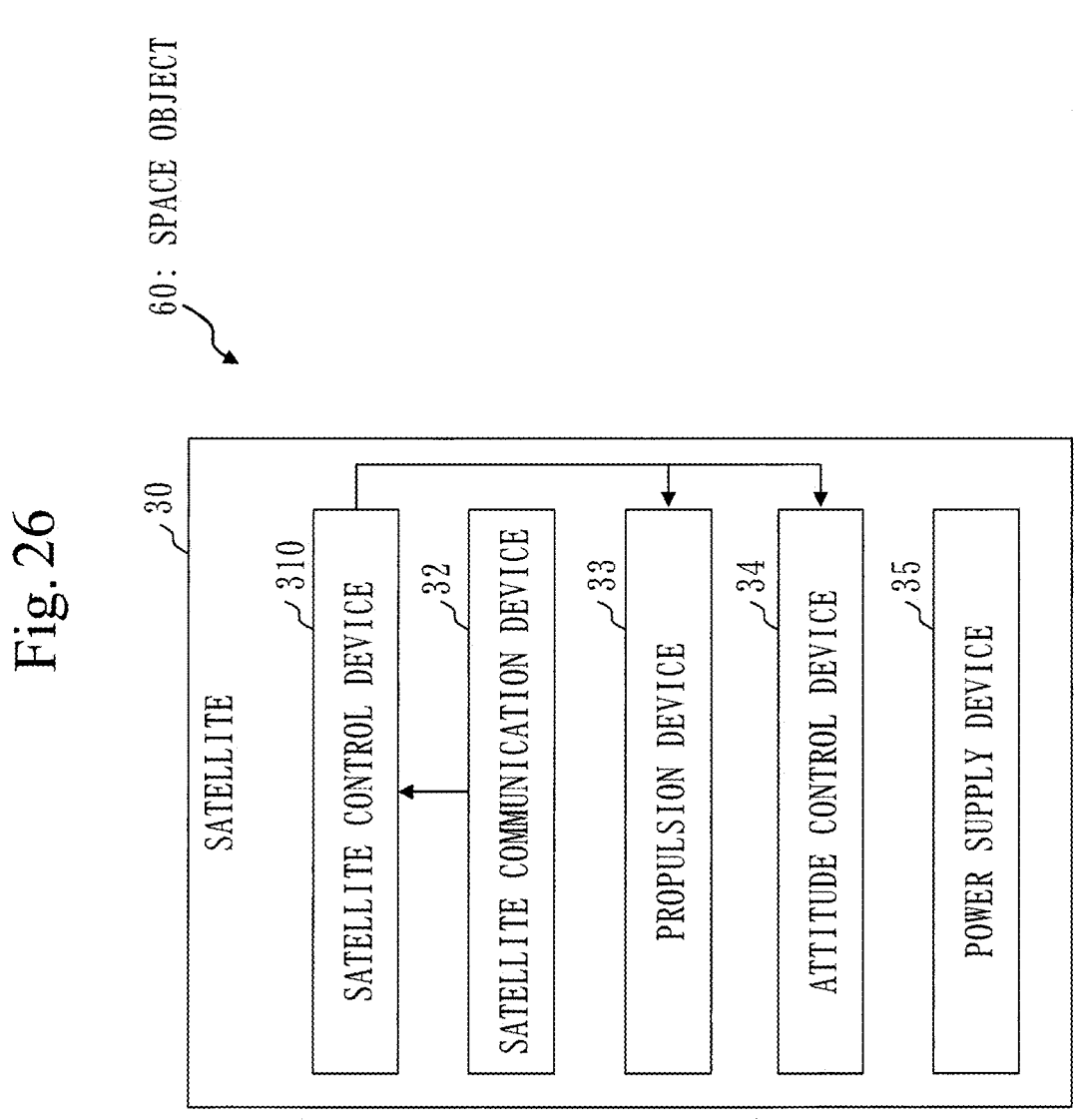
FIG. 26 is an example of a configuration of a satellite of the satellite constellation forming system.

FIG. 26 is an example of a configuration of a satellite 30 of a satellite constellation forming system 600.

The configuration of the satellite 30 that forms the satellite constellation forming system 600 will be described.

The satellite 30 includes a satellite control device 310, a satellite communication device 32, a propulsion device 33, an attitude control device 34, and a power supply device 35. In addition, constituent elements that realize various functions are included. In FIG. 26, the satellite control device 310, the satellite communication device 32, the propulsion device 33, the attitude control device 34, and the power supply device 35 will be described. The satellite 30 is an example of a space object 60.

The satellite control device 310 is a computer that controls the propulsion device 33 and the attitude control device 34, and includes a processing circuit. Specifically, the satellite control device 310 controls the propulsion device 33 and the attitude control device 34 in accordance with various commands transmitted from the ground facility 500.

The satellite communication device 32 is a device that communicates with the ground facility 500. Specifically, the satellite communication device 32 transmits various types of data regarding the satellite itself to the ground facility 500. The satellite communication device 32 receives various commands transmitted from the ground facility 500.

The propulsion device 33 is a device that provides thrust to the satellite 30 and changes the velocity of the satellite 30. Specifically, the propulsion device 33 is an apogee kick motor, a chemical propulsion device, or an electric propulsion device. An apogee kick motor (AKM) is an upper-stage propulsion device used for launching an artificial satellite into an orbit, and is also called an apogee motor (when a solid rocket motor is used) or an apogee engine (when a liquid engine is used).

A chemical propulsion device is a thruster using monopropellant or bipropellant fuel. An electric propulsion device is an ion engine or a Hall thruster. The term "apogee kick motor" is the name of a device used for obit transfer and may refer to a type of chemical propulsion device.

The attitude control device 34 is a device to control attitude elements such as the attitude of the satellite 30 and the angular velocity and line of sight of the satellite 30. The attitude control device 34 changes the orientation of each attitude element to a desired orientation. Alternatively, the attitude control device 34 maintains each attitude element in a desired orientation. The attitude control device 34 includes an attitude sensor, an actuator, and a controller. The attitude sensor is a device such as a gyroscope, an Earth sensor, a sun sensor, a star tracker, a thruster, or a magnetic sensor. The actuator is a device such as an attitude control thruster, a momentum wheel, a reaction wheel, or a control moment gyroscope. The controller controls the actuator according to measurement data of the attitude sensor or various commands from the ground facility 500.

The power supply device 35 includes equipment such as a solar cell, a battery, and an electric control device, and provides electric power to each device installed in the satellite 30.

The processing circuit included in the satellite control device 310 will be described.

The processing circuit may be dedicated hardware, or may be a processor that executes programs stored in a memory.

In the processing circuit, some functions may be realized by hardware, and the remaining functions may be realized by software or firmware. That is, the processing circuit can be realized by hardware, software, firmware, or a combination of these.

Specifically, the dedicated hardware is a single circuit, a composite circuit, a programmed processor, a parallel-programmed processor, an ASIC, an FPGA, or a combination of these.

ASIC is an abbreviation for Application Specific Integrated Circuit. FPGA is an abbreviation for Field Programmable Gate Array.

FIG. 27 is an example of a configuration of the ground facility 500 included in the satellite constellation forming system 600.

The ground facility 500 controls a large number of satellites in all orbital planes by programs. The ground facility 500 is an example of a ground device. The ground device is composed of a ground station, such as a ground antenna device, a communication device connected to a ground antenna device, or an electronic computer, and a ground facility as a server or terminal connected with the ground station via a network. The ground device may include a communication device installed on a mobile object such as an airplane, a self-driving vehicle, or a mobile terminal.

The ground facility 500 forms a satellite constellation 20 by communicating with each satellite 30. The ground facility 500 is provided in a space traffic management device 200. The ground facility 500 includes a processor 910, and also includes other hardware components such as a memory 921, an auxiliary storage device 922, an input interface 930, an output interface 940, and a communication device 950. The processor 910 is connected with other hardware components via signal lines, and controls the other hardware components. The hardware components of the ground facility 500 are substantially the same as the hardware components of the satellite constellation forming system 100 described in FIG. 6.

The ground facility 500 includes an orbit control command transmission unit 510 and an analytical prediction unit 520 as functional components. The functions of the orbit control command transmission unit 510 and the analytical prediction unit 520 are realized by hardware or software.

The communication device 950 transmits and receives signals for tracking and controlling each satellite 30 in the satellite group 300 constituting the satellite constellation 20. The communication device 950 transmits an orbit control command 55 to each satellite 30.

The analytical prediction unit 520 analytically predicts the orbit of the satellite 30.

The orbit control command transmission unit 510 generates an orbit control command 55 to be transmitted to the satellite 30.

The orbit control command transmission unit 510 and the analytical prediction unit 520 realize the functions of a satellite constellation forming unit 11. That is, the orbit control command transmission unit 510 and the analytical prediction unit 520 are examples of the satellite constellation forming unit 11.

Figure 28:
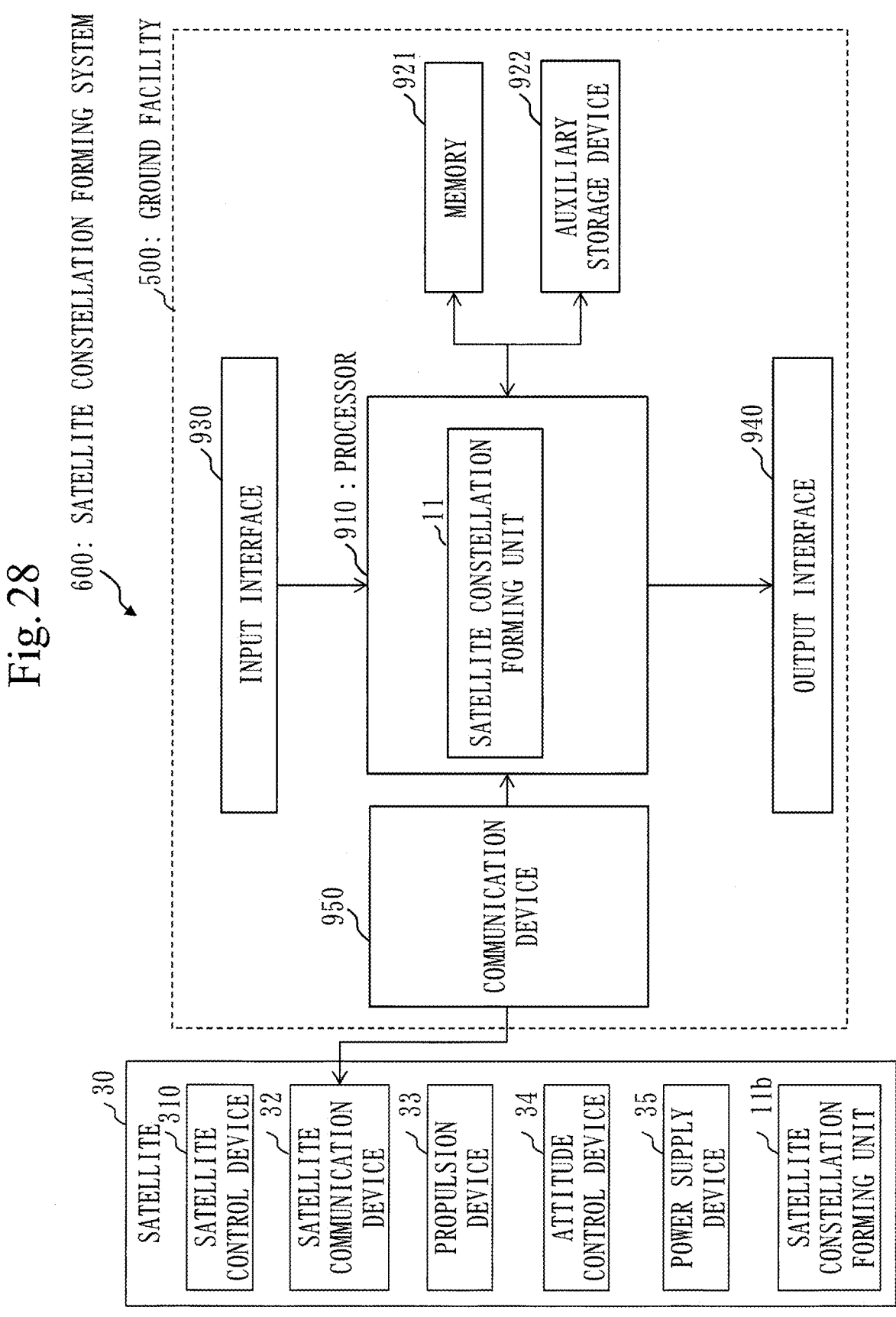
FIG. 28 is an example of a functional configuration of the satellite constellation forming system.

FIG. 28 is a diagram illustrating an example of a functional configuration of the satellite constellation forming system 600.

The satellite 30 further includes a satellite constellation forming unit 11b to form a satellite constellation 20. The satellite constellation forming unit 11b included in each satellite 30 of a plurality of satellites and the satellite constellation forming unit 11 included in each ground facility 500 cooperatively realize the functions of the satellite constellation forming system 600. The satellite constellation forming unit 11b of the satellite 30 may be provided in the satellite control device 310.

Figure 29:
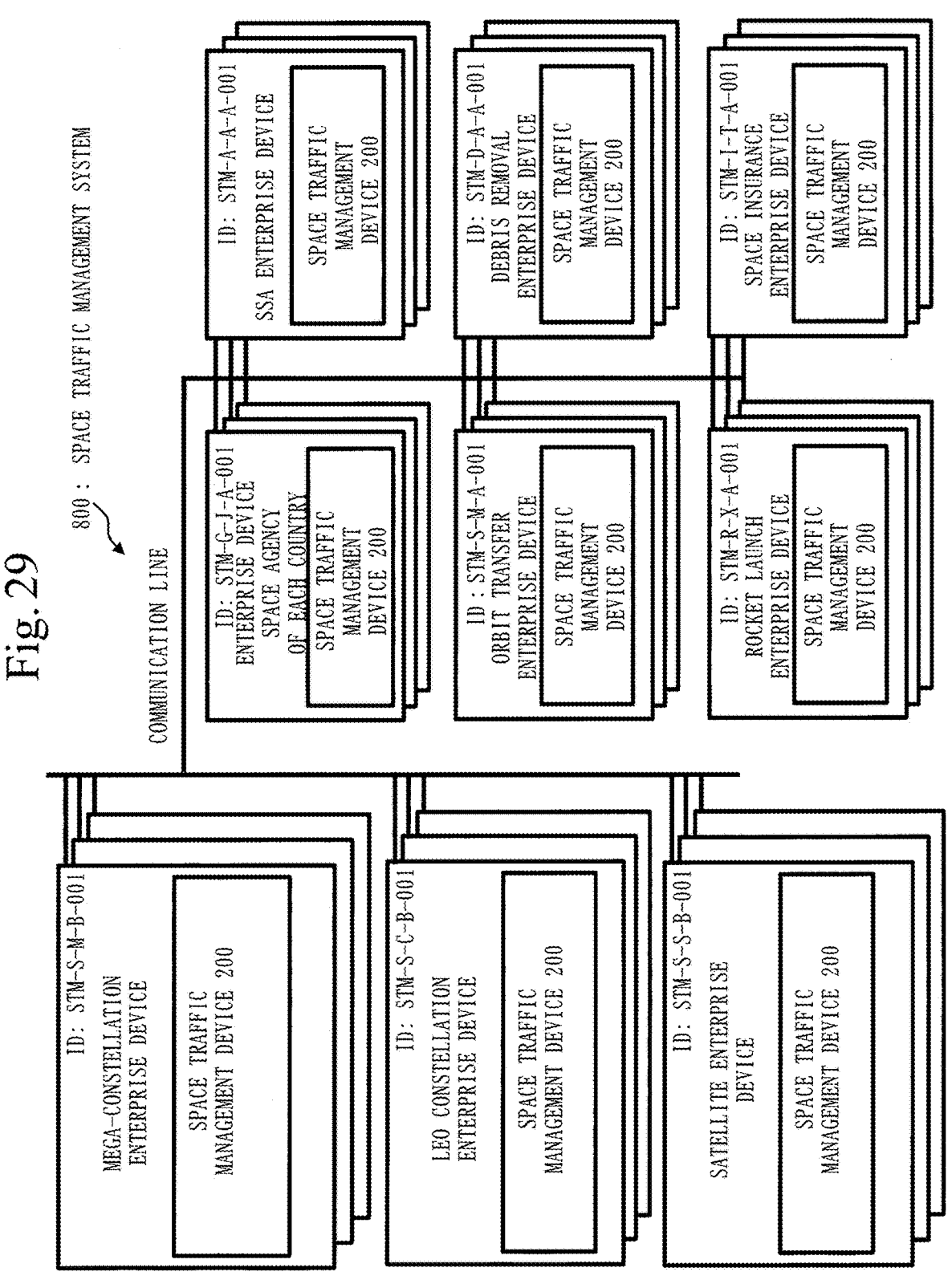
FIG. 29 is an example of an overall configuration of a space traffic management system according to Embodiment 12.

FIG. 29 is an example of an overall configuration of a space traffic management system 800 according to this embodiment.

The space traffic management system 800 includes a plurality of space traffic management devices 200.

Each of the space traffic management devices 200 is installed in each of enterprise devices 40 of operators that manage space objects 60 flying in the space. The space traffic management devices 200 are connected with one another with communication lines.

Figure 30:
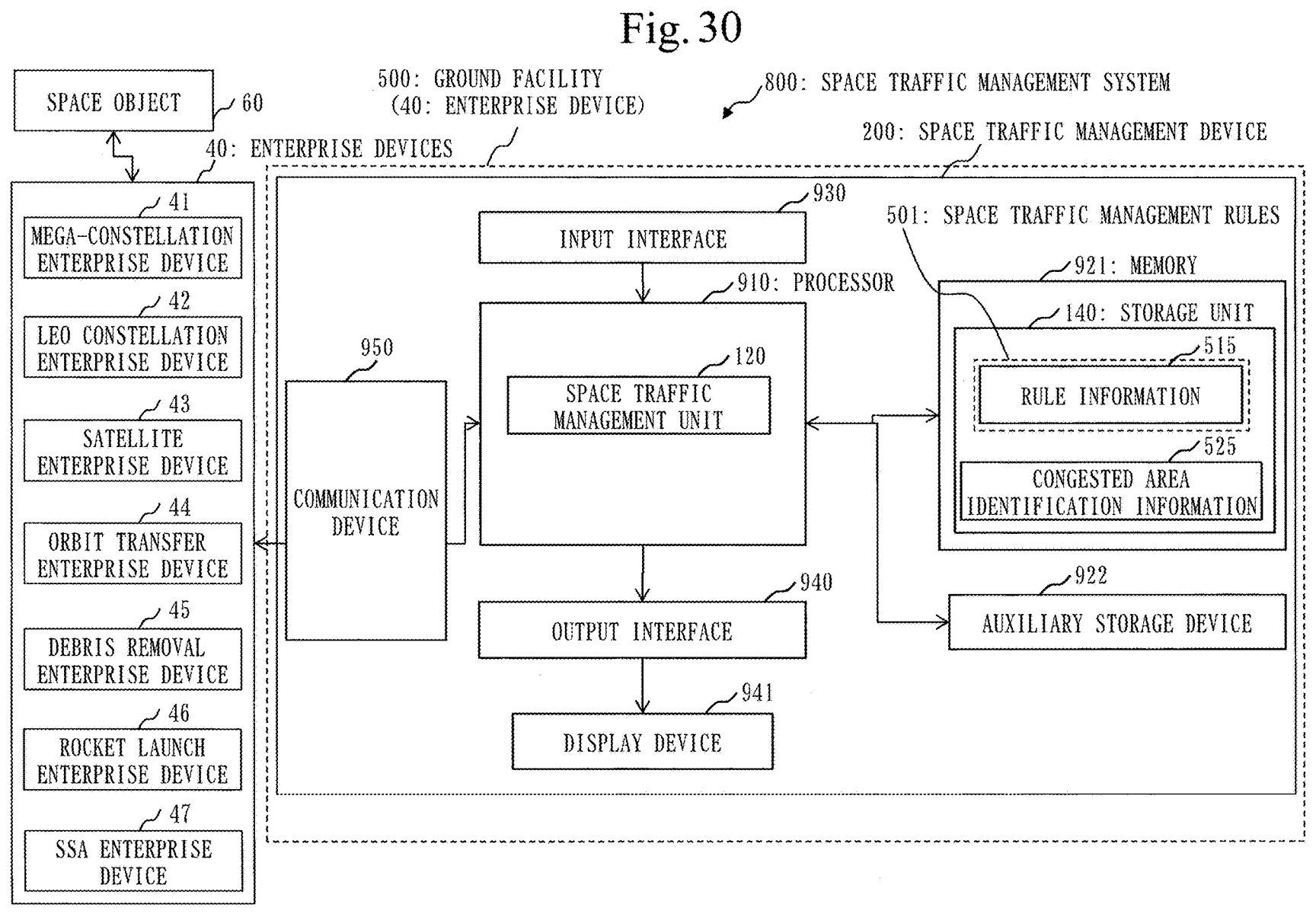

FIG. 30 is a diagram illustrating an example of a configuration of the space traffic management device 200 according to this embodiment.

The space traffic management device 200 communicates with other enterprise devices 40. The space traffic management device 200 may be installed in a ground facility 500. The space traffic management device 200 may be installed in the satellite constellation forming system 600.

The enterprise devices 40 provide information related to space objects 60 such as artificial satellites or debris. The enterprise devices 40 are computers of operators that collect information related to space objects 60 such as artificial satellites or debris.

The enterprise devices 40 include devices such as a mega-constellation enterprise device 41, an LEO constellation enterprise device 42, a satellite enterprise device 43, an orbit transfer enterprise device 44, a debris removal enterprise device 45, a rocket launch enterprise device 46, and an SSA enterprise device 47. LEO is an abbreviation for Low Earth Orbit.

The mega-constellation enterprise device 41 is a computer of a mega-constellation operator that conducts a large-scale satellite constellation, that is, mega-constellation enterprise.

The LEO constellation enterprise device 42 is a computer of an LEO constellation operator that conducts a low Earth orbit constellation, that is, LEO constellation enterprise.

The satellite enterprise device 43 is a computer of a satellite operator that handles one to several satellites.

The orbit transfer enterprise device 44 is a computer of an orbit transfer operator that conducts warning of intrusion of a space object into a satellite.

The debris removal enterprise device 45 is a computer of a debris removal operator that conducts a debris collection enterprise.

The rocket launch enterprise device 46 is a computer of a rocket launch operator that conducts a rocket launch enterprise.

The SSA enterprise device 47 is a computer of an SSA operator that conducts an SSA enterprise, that is, a space situation surveillance enterprise.

The enterprise devices 40 may be other devices, provided they are devices that collect information on space objects such as artificial satellites or debris and provide the collected information to the space traffic management system 800. When the space traffic management device 200 is installed on a public SSA server, the space traffic management device 200 may be configured to function as the public SSA server.

The space traffic management device 200 includes a processor 910, and also includes other hardware components such as a memory 921, an auxiliary storage device 922, an input interface 930, an output interface 940, and a communication device 950. The processor 910 is connected with other hardware components via signal lines, and controls the other hardware components.

The space traffic management device 200 includes a space traffic management unit 120 and a storage unit 140 as examples of functional elements. The storage unit 140 stores rule information 515 and congested area identification information 525.

The functions of the space traffic management unit 120 are realized by software. The storage unit 140 is provided in the memory 921. Alternatively, the storage unit 140 may be provided in the auxiliary storage device 922. The storage unit 140 may be divided and provided in the memory 921 and the auxiliary storage device 922.

The space traffic management unit 120 manages space objects 60 in accordance with the rule information 515, for example. Alternatively, the space traffic management unit

120 manages space objects 60 in accordance with the rule information 515, using the congested area identification information 525.

The processor 910 is a device that executes a space traffic management program. The space traffic management program is a program for realizing the functions of the constituent elements of the space traffic management device 200 and the space traffic management system 800.

The hardware components of the space traffic management device 200 are substantially the same as the hardware components of the satellite constellation forming system 100 described in FIG. 6.

The space traffic management program is read into the processor 910 and executed by the processor 910. The memory 921 stores not only the space traffic management program but also an operating system (OS). The processor 910 executes the space traffic management program while executing the OS. The space traffic management program and the OS may be stored in the auxiliary storage device 922. The space traffic management program and the OS that are stored in the auxiliary storage device 922 are loaded into the memory 921 and executed by the processor 910. Part or the entirety of the space traffic management program may be embedded in the OS.

The space traffic management device 200 may include a plurality of processors as an alternative to the processor 910. The plurality of processors share execution of programs. Each of the processors is, like the processor 910, a device that executes programs.

"Unit" of each unit of the space traffic management device may be interpreted as "process", "procedure", "means", "stage", or "step". "Process" in a passage determination process, a warning generation process, and a warning notification process may be interpreted as "program", "program product", or "computer readable recording medium recording a program". "Process", "procedure", "means", "stage", and "step" may be interpreted interchangeably.

The space traffic management program causes a computer to execute each process, each procedure, each means, each stage, or each step, where "unit" of each unit of the space traffic management system is interpreted as "process", "procedure", "means", "stage", or "step". A space traffic management method is a method performed by execution of the space traffic management program by the space traffic management device 200.

The space traffic management program may be stored and provided in a computer readable recording medium. Each program may be provided as a program product.

<Functional Overview of the Space Traffic Management System of this Embodiment>

Sun-synchronous orbits are orbits often used in Earth observation, and the following areas are particularly congested.

Area in sun-synchronous orbit of about LST 10:30 at orbital altitudes 500 km to 1000 km
　　Area in sun-synchronous orbit of about LST 13:30 at orbital altitudes 500 km to 1000 km
　　Area in sun-synchronous orbit of about LST 06:00 at orbital altitudes 500 km to 1000 km
　　Area in sun-synchronous orbit of about LST 18:00 at orbital altitudes 500 km to 1000 km Sun-synchronous orbits have an orbital inclination of about 90 degrees, so that for satellites flying at the same orbital altitude, intersection points between orbital planes are concentrated in the polar regions and there is a high risk of collision.

Therefore, if it is stipulated as a rule of space traffic management (STM) that satellites having orbital planes with different normal vectors adopt mutually different orbital altitudes so as to eliminate intersection points between orbits, the probability of collision in regular operation will become zero and collision risks will be eliminated. In reality, a collision risk occurs when non-regular operation, such as orbital insertion or deorbit, is performed. However, if the probability of collision is zero in regular operation, there is an effect that risks are reduced significantly.

There is also means of avoiding a collision by separating the polar region passage timings by artificial control. However, a large number of operators from a large number of countries are operating satellites in sun-synchronous orbits and collision risks remain if mutual cooperation is not thoroughly established.

Another problem is that there is a high risk of collision if an unexpected accident such as a collision with debris causes a situation in which artificial control is impossible.

Therefore, if the probability of collision is zero in regular operation, there is an effect that a collision accident can be avoided even when artificial control cannot be performed.

Specifically, as illustrated in FIGS. 29 and 30, the space traffic management system 800 according to this embodiment executes a space traffic management process to conduct space traffic management for space objects 60, using information such as the rule information 515 and the congested area identification information 525. That is, in the space traffic management system 800, a plurality of space traffic management devices 200 manage traffic of the space objects 60, using the rule information 515 and the congested area identification information 525 that are common in the plurality of space traffic management devices 200. The rule information 515 is also referred to as a space traffic management rule 501.

Example 1 of the Space Traffic Management Process

The space traffic management unit 120 performs the space traffic management process for space objects 60 such that satellites with orbital planes having different normal vectors adopt different orbital altitudes.

Specifically, in the rule information 515, information indicating a rule that satellites with orbital planes having different normal vectors adopt different orbital altitudes is set.

The space traffic management unit 120 manages the space objects 60 in accordance with the rule information 515.

According to Example 1 of the space traffic management process, satellites with orbital planes having different normal vectors adopt mutually different orbital altitudes, so that there is an effect that the probability of collision in the polar regions is zero and collision risks in regular operation can be eliminated.

Example 2 of the Space Traffic Management Process

The space traffic management unit 120 performs the space traffic management process for space objects 60 such that a plurality of satellites having the same normal vector and flying at the same orbital altitude fly while maintaining relative phase angles to place the satellites at approximately equal intervals.

Specifically, in the rule information 515, information indicating a rule that a plurality of satellites having the same normal vector and flying at the same orbital altitude fly while maintaining relative phase angles such that the satellites are placed at approximately equal intervals is set.

The space traffic management unit 120 manages the space objects 60 in accordance with the rule information 515.

Figure 31:
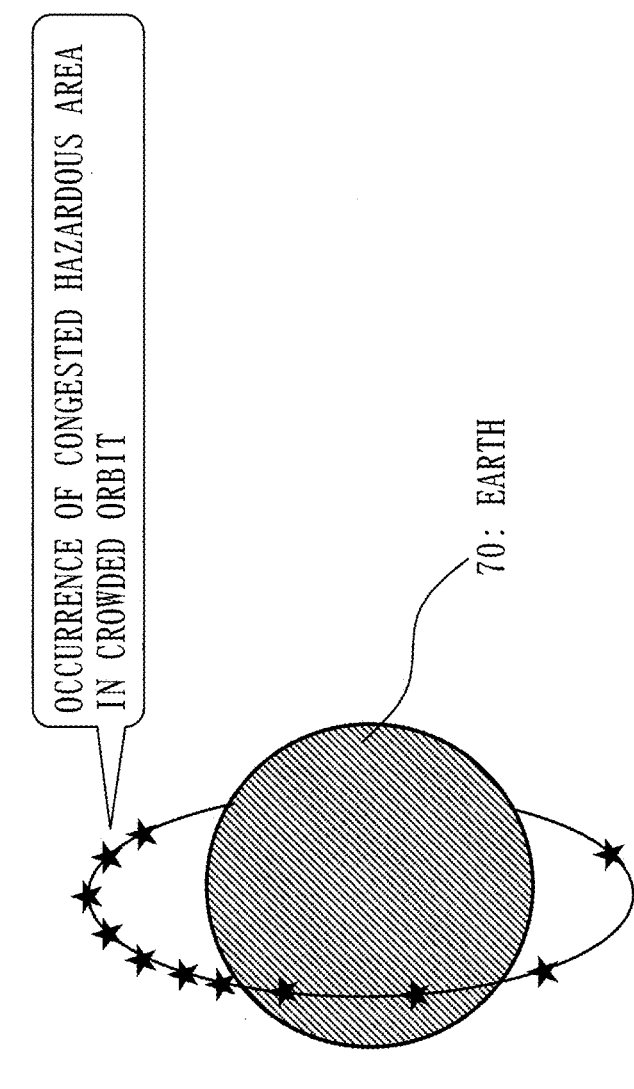
FIG. 31 is a comparison example of Example 2 of a space traffic management process, and is a diagram illustrating an arrangement of satellites in an orbital plane.

FIG. 31 is a diagram illustrating an arrangement of satellites in an orbital plane in a comparison example of Example 2 of the space traffic management process.

Figure 32:
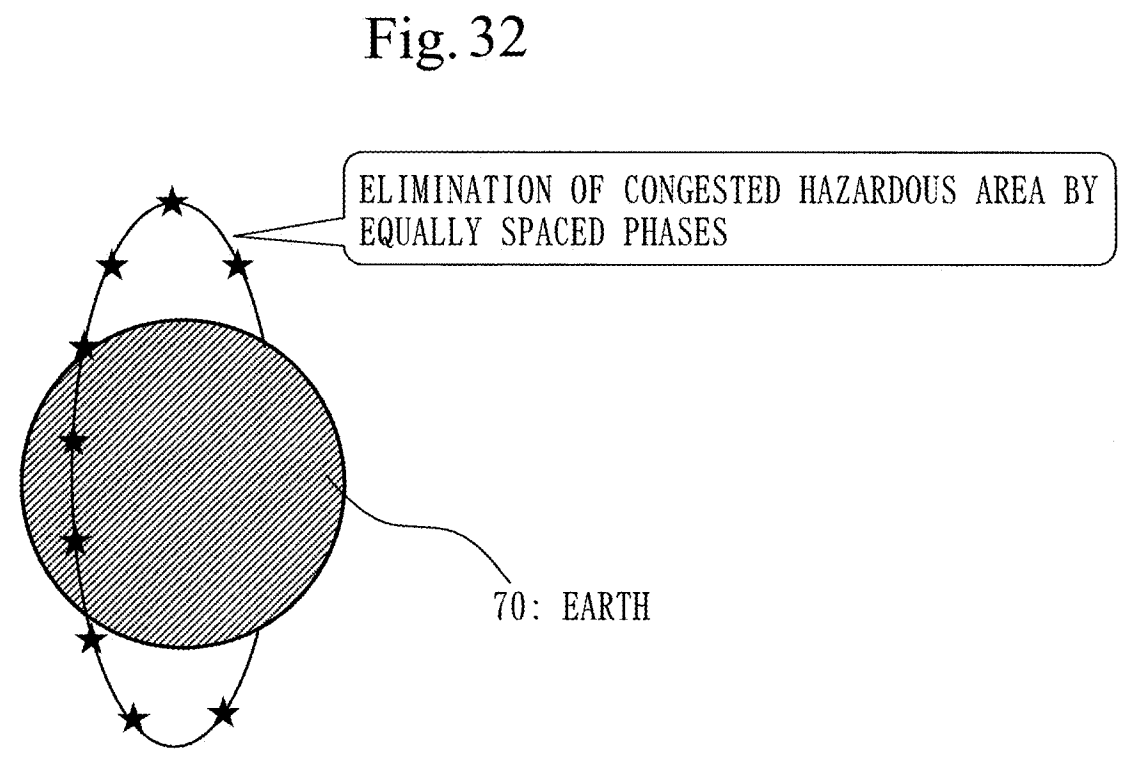

FIG. 32 is a diagram illustrating an arrangement of satellites in an orbital plane in Example 2 of the space traffic management process according to this embodiment.

Figure 33:
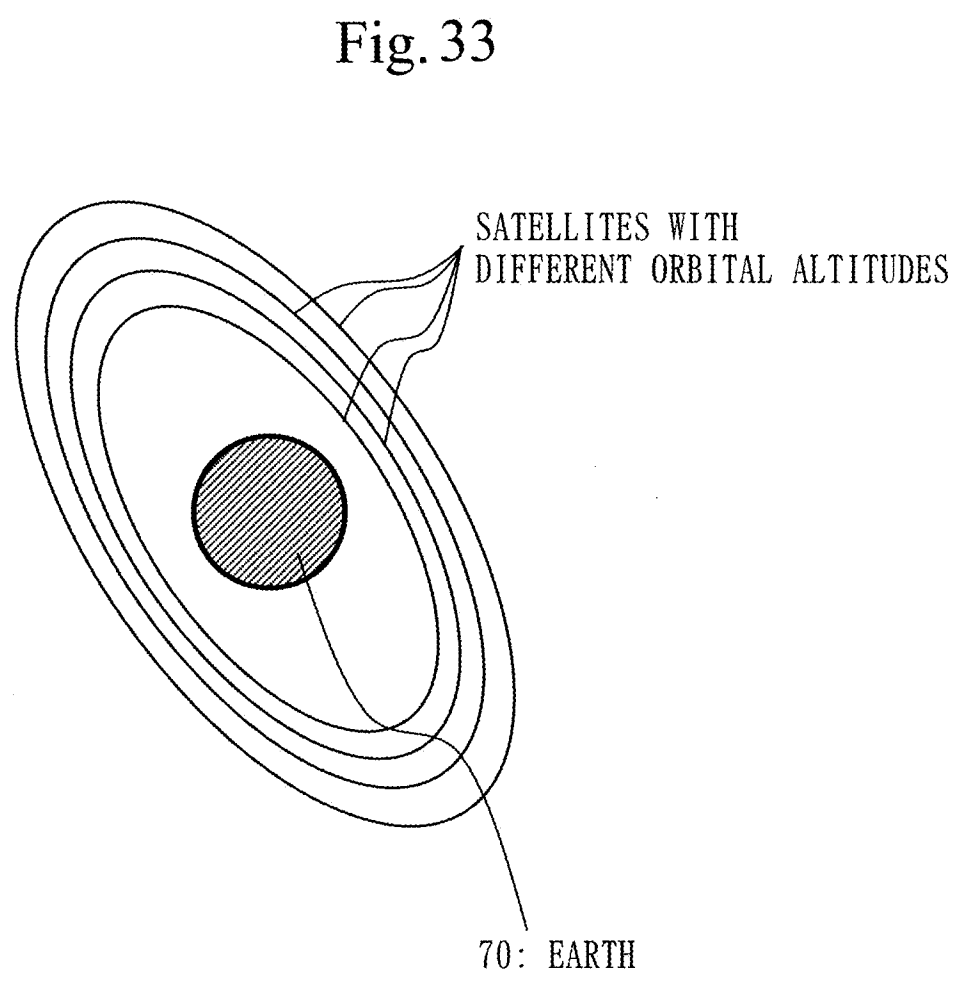

FIG. 33 is a diagram illustrating a plurality of orbital planes having the same normal vector and different orbital altitudes.

As indicated in FIGS. 31 and 32, a plurality of satellites flying in the same orbital plane at the same orbital altitude can avoid collisions by flying in synchronization. However, if a plurality of satellites managed by different operators are made to fly without managing their relative phase angles, there is a risk of collision.

According to Example 2 of the space traffic management process, the space traffic management rule 501 is used to identify a plurality of satellites flying in the same orbital plane and to cause a plurality of satellites flying at the same orbital altitude to fly while maintaining the relative phase angles such that the satellites are placed at approximately equal intervals in the orbital plane. As a result, there is an effect that collisions can be avoided.

Example 3 of the Space Traffic Management Process

The congested area identification information 525 is information that identifies the following areas as congested areas.

Area in sun-synchronous orbit of about LST 10:30 at orbital altitudes 500 km to 1000 km Area in sun-synchronous orbit of about LST 13:30 at orbital altitudes 500 km to 1000 km Area in sun-synchronous orbit of about LST 06:00 at orbital altitudes 500 km to 1000 km Area in sun-synchronous orbit of about LST 18:00 at orbital altitude 500 km to 1000 km Area at latitude 80 or more degrees north at orbital altitudes 500 km to 1000 km Area at latitude 80 or more degrees south at orbital altitudes 500 km to 1000 km Orbits of about LST 10:30 and LST 13:30 are often used by optical satellite groups or various Earth observation satellite groups called A-train. Orbits of about LST 06:00 and LST 18:00 are often used by radar satellite groups equipped with synthetic-aperture radar.

In the rule information 515, the space traffic management rule 501 indicating a rule that operators that manage satellites flying in a congested area publish satellite information is set.

Using the congested area identification information 525 and the rule information 515, the space traffic management unit 120 realizes means by which operators that manage satellites flying in the same orbital plane exchange information on flying safety measures.

In Example 3 of the space traffic management process, the space traffic management device 200 is provided with the congested area identification information 525. The space traffic management device 200 is also provided with the space traffic management rule 501 that operators that manage satellites flying in a congested area publish satellite information and means by which operators that manage satellites flying in the same orbital plane can exchange information concerning flying safety measures. As described above, since it is hazardous to fly satellites in the orbit by operators without any rules, a traffic rule that satellite orbit information be published is set so as to create an environment in which measures for securing flying safety can be arranged. Therefore, according to Example 3 of the space traffic management process, there is an effect that collisions can be avoided.

As means for exchanging information on flying safety measures, a function of allowing chat on the portal of the space traffic management system 800 may be provided, and a message for hosting an arrangement meeting may be issued.

Example 4 of the Space Traffic Management Process

Using the congested area identification information 525, the space traffic management unit 120 captures a space object 60 before it intrudes into any congested area while the space object 60 is in the process of deorbiting and entering the atmosphere, so as to realize an operation for avoiding collision during orbital descent. A method for realizing the operation for avoiding collision during orbital descent like this is referred to as an operation method for avoiding collision during orbital descent.

Specific examples of a congested area are substantially the same as those described in Example 3 of the space traffic management process.

Figure 34:
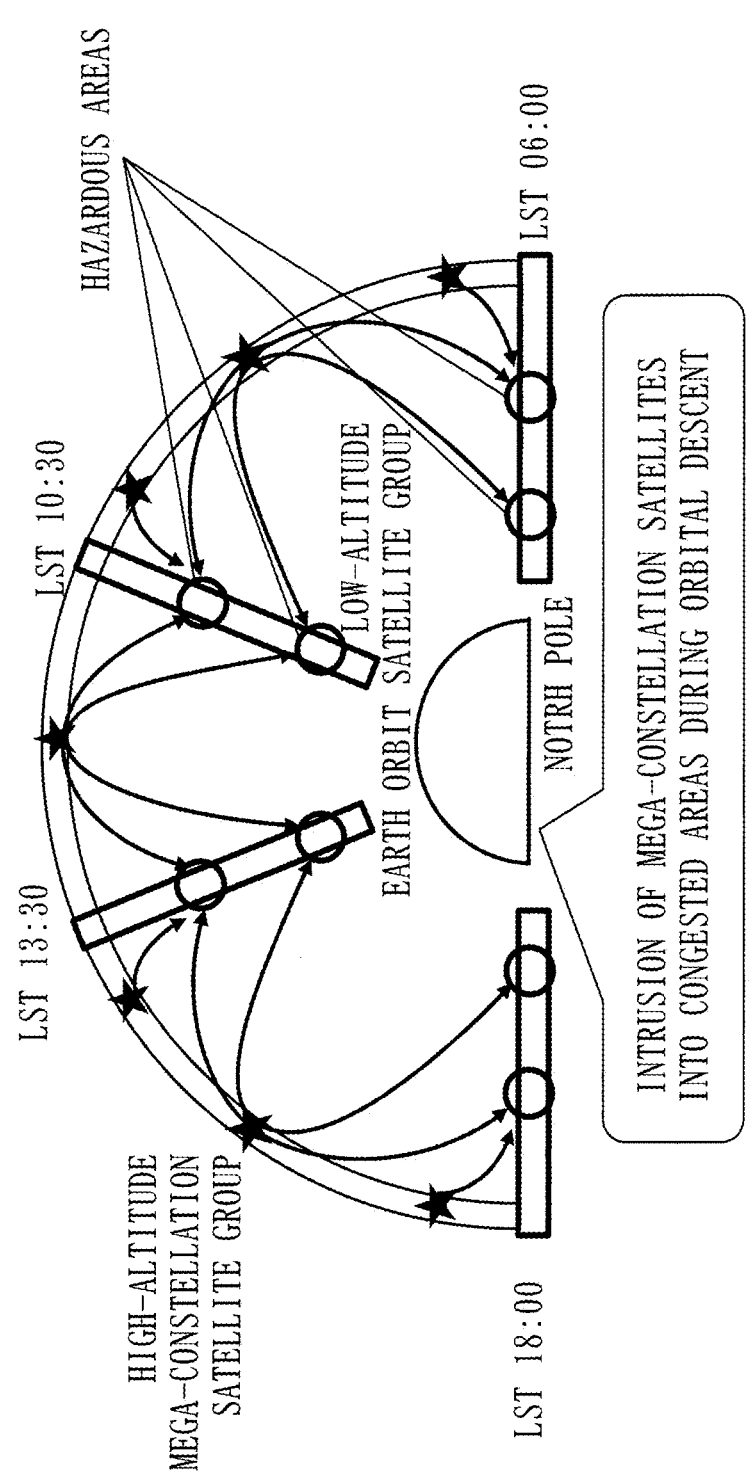
FIG. 34 is a diagram illustrating how satellites in a mega-constellation at a high altitude intrude into congested areas (hazardous areas) during orbital descent of satellites.

FIG. 34 is a diagram illustrating how mega-constellation satellites at a high altitude intrude into congested areas (hazardous areas) while the satellites are descending in orbit.

Figure 35:
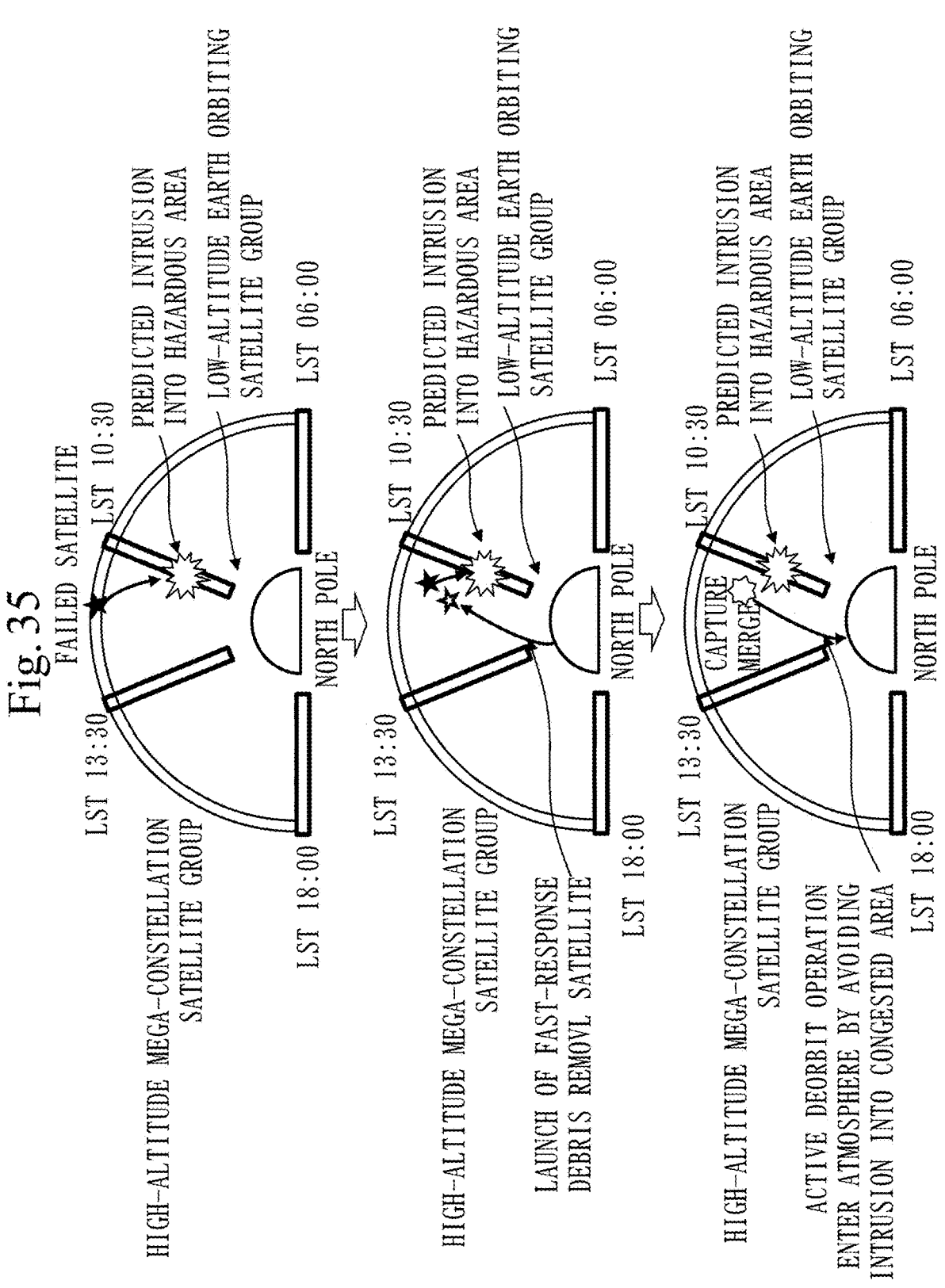
FIG. 35 is a diagram illustrating a space traffic management process for avoiding intrusion into a congested area during orbital descent of a satellite according to Embodiment 12.

FIG. 35 is a diagram illustrating a space traffic management process for avoiding intrusion into a congested area while a satellite is descending in orbit according to this embodiment.

Specifically, in the rule information 515, the space traffic management rule 501 indicating a rule that a space object 60 be captured before it intrudes into any congested area while the space object 60 is in the process of deorbiting and entering the atmosphere so as to realize the operation for avoiding collision during orbital descent. The operation for avoiding collision during orbital descent is also referred to as an active deorbit operation.

Using the congested area identification information 525 and the rule information 515, the space traffic management unit 120 captures a space object 60 before it intrudes into any congested area while the space object 60 is in the process of deorbiting and entering the atmosphere, so as to realize the operation for avoiding collision during orbital descent.

Referring to FIG. 35, this will be described specifically.

(1) The space traffic management device 200 of the mega-constellation enterprise device 41 predicts that a mega-constellation satellite at a high altitude that has become a failed satellite will intrude into a congested area (hazardous area). This intrusion prediction information is shared by all the space traffic management devices 200 in the space traffic management system 800 via communication lines.

(2) Based on the rule information 515, the space traffic management device 200 of the debris removal enterprise device 45 captures the space object 60 before it intrudes into any congested area so as to realize the operation for avoiding collision during orbital descent. Specifically, a fast-response debris removal satellite is launched.

(3) The fast-response debris removal satellite captures and unites with the failed satellite, and enters the atmosphere by avoiding congested areas. This realizes the operation for avoiding collision during orbital descent.

In Embodiments 1 to 12 above, each unit of the satellite constellation forming system and the space traffic management system has been described as an independent functional block. However, the configurations of the satellite constellation forming system and the space traffic management system may be different from the configurations in the embodiments described above. The functional blocks of the satellite constellation forming system and the space traffic management system may be arranged in any configuration, provided that the functions described in the above embodiments can be realized. The satellite constellation forming system and the space traffic management system may be one device or may be a system composed of a plurality of devices.

A plurality of portions of Embodiments 1 to 12 may be implemented in combination. Alternatively, one portion of these embodiments may be implemented. These embodiments may be implemented as a whole or partially in any combination.

That is, in Embodiments 1 to 12, each of the embodiments may be freely combined, or any constituent element of each of the embodiments may be modified, or any constituent element may be omitted in each of the embodiments.

The above embodiments are essentially preferable examples, and are not intended to limit the scope of the present invention, the scope of applications of the present invention, and the scope of uses of the present invention. Various modifications can be made to the above embodiments as necessary.

REFERENCE SIGNS LIST

11, 11*b*: satellite constellation forming unit; 20: satellite constellation; 21: orbital plane; 30: satellite; 31: debris collection satellite; 32: satellite communication device; 33: propulsion device; 34: attitude control device; 40: enterprise device; 41: mega-constellation enterprise device; 42: LEO constellation enterprise device; 43: satellite enterprise device; 44: orbit transfer enterprise device; 45: debris removal enterprise device; 46: rocket launch enterprise device; 47: SSA enterprise device; 51: orbit control command; 52: capture command; 60: space object; 70: Earth; 100: satellite constellation forming system; 200: space traffic management device; 110: satellite constellation forming unit; 120: space traffic management unit; 140: storage unit; 300: satellite group; 310: satellite control device; 500: ground facility; 501: space traffic management rule; 510: orbit control command transmission unit; 515: rule information; 525: congested area identification information; 520: analytical prediction unit; 600: satellite constellation forming system; 800: space traffic management system; 910: processor; 921: memory; 922: auxiliary storage device; 930: input interface; 940: output interface; 950: communication device

The invention claimed is:

1. A space traffic management system comprising:
space traffic management devices respectively provided in enterprise devices of a plurality of operators that manage at least an orbital plane and an orbital altitude of a plurality of space objects that form a satellite constellation by communicating with the plurality of space objects via respective communication devices, the space traffic management devices being connected with each other via communication lines,
wherein the enterprise devices are computers that collect information regarding the plurality of space objects and include at least one of a mega-constellation enterprise device, a low earth orbit (LEO) constellation enterprise device, a satellite enterprise device, an orbit transfer enterprise device, a debris removal enterprise device, a rocket launch enterprise device, and a space situational awareness (SSA) enterprise device,
wherein the plurality of space objects are satellites of a mega-constellation at orbital altitudes above 1000 km and are initially maintained at a same orbital plane and at different orbital altitudes or different orbital planes and different orbital altitudes, to avoid collision with one another,
wherein during a process of deorbiting and entering the atmosphere of one of the plurality of space objects during free fall descent, at least one of the space traffic management devices performs an operation for avoiding collision of the one of the plurality of space objects with other of the plurality of space objects by controlling a debris removal satellite to capture and unite the one of the plurality of space objects before the one of the plurality of space objects intrudes into any one of
an area in sun-synchronous orbit of about local sun time (LST) 10:30 at orbital altitudes 500 km to 1000 km,
an area in sun-synchronous orbit of about LST 13:30 at orbital altitudes 500 km to 1000 km,
an area in sun-synchronous orbit of about LST 06:00 at orbital altitudes 500 km to 1000 km, and
an area in sun-synchronous orbit of LST 18:00 at orbital altitudes 500 km to 1000 km, and
wherein the process of deorbiting and entering the atmosphere includes, by the debris removal satellite, capturing and uniting with the one of the plurality of space objects and entering the atmosphere by avoiding the congested areas by changing the inclination of the orbital plane of the one of the plurality of space objects to be different from that of the congested areas or shifting a passage timing by applying acceleration in an out-of-plane direction of the orbital plane by injection from a propulsor in a direction approximately perpendicular to a satellite traveling direction so that the inclination of the orbital plane becomes different from that of the other of the plurality of space objects, based on SSA data processed by the SSA enterprise device, and further comprising prioritizing deorbit operations for space objects at higher orbital altitudes to minimize collision risks in the congested areas based on the SSA data.

2. The space traffic management system of claim 1, wherein the one space object is a satellite, and
wherein the capturing of the one space object further includes providing access to the satellite or coupling to the satellite.

3. The space traffic management system of claim 1, wherein the space traffic management devices are installed on a public SSA server.

4. The space traffic management system of claim 1, wherein the SSA enterprise device is configured to predict potential intrusion of the one of the plurality of space objects into the any one of the areas in sun-synchronous orbit based on SSA data and to initiate the operation for avoiding collision by controlling the debris removal satellite.

5. The space traffic management system of claim 1, wherein the debris removal satellite is configured to securely capture and unite with the one of the plurality of space objects to prevent intrusion into the any one of the areas in sun-synchronous orbit.

6. An operation method for avoiding collision during orbital descent of a space traffic management system in which space traffic management devices respectively provided in enterprise devices of a plurality of operators that manage at least an orbital plane and an orbital altitude of a plurality of space objects that form a satellite constellation by communicating with the plurality of space objects via respective communication devices, the space traffic management device being connected with each other via communication lines, wherein the enterprise devices are computers that collect information regarding the plurality of space objects and include at least one of a mega-constellation enterprise device, a low earth orbit (LEO) constellation enterprise device, a satellite enterprise device, an orbit transfer enterprise device, a debris removal enterprise device, a rocket launch enterprise device, and a space situational awareness (SSA) enterprise device, the operation method for avoiding collision during orbital descent comprising:

initially maintaining the plurality of space objects, which are satellites of a mega-constellation at orbital altitudes above 1000 km, at a same orbital plane and at different orbital altitudes or different orbital planes and different orbital altitudes, to avoid collision with one another, performing, by at least one of the space traffic management devices, a process of deorbiting and entering the atmosphere of one of the plurality of space objects during free fall descent including an operation for avoiding collision of the one of the plurality of space objects with other of the plurality of space objects by controlling a debris removal satellite to capture and unite the one of the plurality of space objects before the one of the plurality of space objects intrudes into any one of an area in sun-synchronous orbit of about local sun time (LST) 10:30 at orbital altitudes 500 km to 1000 km, an area in sun-synchronous orbit of about LST 13:30 at orbital altitudes 500 km to 1000 km, an area in sun-synchronous orbit of about LST 06:00 at orbital altitudes 500 km to 1000 km, an area in sun-synchronous orbit of LST 18:00 at orbital altitudes 500 km to 1000 km, wherein the process of deorbiting and entering the atmosphere includes, by the debris removal satellite, capturing and uniting with the one of the plurality of space objects and entering the atmosphere by avoiding the congested areas by changing the inclination of the orbital plane of the one of the plurality of space objects to be different from that of the congested areas or shifting a passage timing by applying acceleration in an out-of-plane direction of the orbital plane by injection from a propulsor in a direction approximately perpendicular to a satellite traveling direction so that the inclination of the orbital plane becomes different from that of the other of the plurality of space objects, based on SSA data processed by the SSA enterprise device, and further comprising prioritizing deorbit operations for space objects at higher orbital altitudes to minimize collision risks in the congested areas based on the SSA data.

7. The operation method for avoiding collision of claim 6, wherein the one space object is a satellite, and wherein the capturing of the one space object further includes providing access to the satellite or coupling to the satellite.

8. The operation method for avoiding collision of claim 6, wherein the space traffic management devices are installed on a public SSA server.

9. The operation method for avoiding collision of claim 6, wherein the at least one of the space traffic management devices transmits SSA data to the debris removal satellite to adjust a trajectory of the debris removal satellite and prevent intrusion of the one of the plurality of space objects into the any one of the areas in sun-synchronous orbit.

10. A space traffic management device that manages at least an orbital plane and an orbital altitude of a plurality of space objects that form a satellite constellation by communicating with the plurality of space objects, wherein the plurality of space objects are satellites of a mega-constellation at orbital altitudes above 1000 km and are initially maintained at a same orbital plane and at different orbital altitudes or different orbital planes and different orbital altitudes, to avoid collision with one another, and wherein during a process of deorbiting and entering the atmosphere of one of the plurality of space objects during free fall descent, the space traffic management device performs an operation by using a congested area identification information for avoiding collision of the one of the plurality of space objects with other of the plurality of space objects by controlling a debris removal satellite to capture and unite the one of the plurality of space objects before the one of the plurality of space objects intrudes into the congested area that is identified by the congested area identification information, wherein the process of deorbiting and entering the atmosphere includes, by the debris removal satellite, capturing and uniting with the one of the plurality of space objects and entering the atmosphere by avoiding the congested areas by changing the inclination of the orbital plane of the one of the plurality of space objects to be different from that of the congested areas or shifting a passage timing by applying acceleration in an out-of-plane direction of the orbital plane by injection from a propulsor in a direction approximately perpendicular to a satellite traveling direction so that the inclination of the orbital plane becomes different from that of the other of the plurality of space objects, based on space situational awareness (SSA) data processed by a SSA enterprise device, and further comprising prioritizing deorbit operations for space objects at higher orbital altitudes to minimize collision risks in the congested areas based on the SSA data.

11. The space traffic management device of claim 10, wherein the congested area identification information indicates that the congested area is any one of an area in sun-synchronous orbit of about local sun time (LST) 10:30 at orbital altitudes 500 km to 1000 km, an area in sun-synchronous orbit of about LST 13:30 at orbital altitudes 500 km to 1000 km, an area in sun-synchronous orbit of about LST 06:00 at orbital altitudes 500 km to 1000 km, and an area in sun-synchronous orbit of LST 18:00 at orbital altitudes 500 km to 1000 km.

12. The space traffic management device of claim 10, wherein the debris removal satellite includes a grappling mechanism and the propulsor, the grappling mechanism being configured to capture the one of the plurality of space objects, and the propulsor being configured to adjust a trajectory of the debris removal satellite to avoid intrusion into the congested area based on SSA data.

13. The space traffic management device of claim 10, wherein the space traffic management device is configured to process SSA data to generate a collision-free deorbit path for the one of the plurality of space objects and communicate the collision-free deorbit path to the debris removal satellite to avoid intrusion into the congested area.

14. A ground facility that transmits commands to adjust the altitude of each satellite so as to maintain the relative phases of a plurality of satellites in each orbital plane of a plurality of orbital planes, wherein the plurality of space objects are satellites of a mega-constellation at orbital altitudes above 1000 km and are initially maintained at a same orbital plane and at different orbital altitudes or different orbital planes and different orbital altitudes, to avoid collision with one another, wherein during a process of deorbiting and entering the atmosphere of one of the plurality of space objects during free fall descent, the ground facility transmits a capture command and an orbit control command to a debris removal satellite by using a congested area identification information for avoiding collision of the one of the plurality of space objects with other of the plurality of space objects by controlling the debris removal satellite to capture and unite the one of the plurality of space objects before the one of the plurality of space objects intrudes into the congested area that is identified by the congested area identification information, and wherein the process of deorbiting and entering the atmosphere includes, by the debris removal satellite, capturing and uniting with the one of the plurality of space objects and entering the atmosphere by avoiding the congested areas by changing the inclination of the orbital plane of the one of the plurality of space objects to be different from that of the congested areas or shifting a passage timing by applying acceleration in an out-of-plane direction of the orbital plane by injection from a propulsor in a direction approximately perpendicular to a satellite traveling direction so that the inclination of the orbital plane becomes different from that of the other of the plurality of space objects, based on space situational awareness (SSA) data processed by a SSA enterprise device, and further comprising prioritizing deorbit operations for space objects at higher orbital altitudes to minimize collision risks in the congested areas based on the SSA data.

\* \* \* \* \*